(12) United States Patent
Haruki et al.

(10) Patent No.: US 7,110,574 B2
(45) Date of Patent: Sep. 19, 2006

(54) EXTENSION DEVICE PROVIDING SECURITY FUNCTION

(75) Inventors: Kenichi Haruki, Kawasaki (JP);
Taisuke Inoue, Kawasaki (JP);
Hidehiko Fuchida, Kawasaki (JP);
Katsuhito Kanbe, Kawasaki (JP);
Tsuyoshi Niwata, Kawasaki (JP);
Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/678,225

(22) Filed: Oct. 6, 2003

(65) Prior Publication Data

US 2004/0066954 A1 Apr. 8, 2004

Related U.S. Application Data

(62) Division of application No. 09/639,098, filed on Aug. 16, 2000.

(30) Foreign Application Priority Data

Aug. 18, 1999 (JP) .................................. 11-231957
Jul. 31, 2000 (JP) ............................. 2000-232303

(51) Int. Cl.
*G06K 9/00* (2006.01)
(52) U.S. Cl. ..................................................... 382/115
(58) Field of Classification Search ................. 382/115
See application file for complete search history.

(56) References Cited

U.S. PATENT DOCUMENTS

| 5,477,418 | A |   | 12/1995 | MacGregor et al. |     |
|---|---|---|---|---|---|
| 5,559,504 | A | * | 9/1996 | Itsumi et al. | 340/5.53 |
| 5,625,534 | A |   | 4/1997 | Okaya et al. |     |
| 5,841,628 | A |   | 11/1998 | Alpert et al. |     |
| 5,867,218 | A | * | 2/1999 | Matsuzaki et al. | 348/373 |
| 5,978,495 | A | * | 11/1999 | Thomopoulos et al. | 382/124 |
| 6,118,485 | A | * | 9/2000 | Hinoue et al. | 348/373 |
| 6,173,405 | B1 | * | 1/2001 | Nagel | 713/200 |
| 6,213,403 | B1 | * | 4/2001 | Bates, III | 235/492 |
| 6,234,389 | B1 | * | 5/2001 | Valliani et al. | 235/380 |
| 6,330,151 | B1 | * | 12/2001 | Bates, III | 361/686 |
| 6,357,663 | B1 | * | 3/2002 | Takahashi et al. | 235/486 |
| 6,525,932 | B1 | * | 2/2003 | Ohnishi et al. | 361/686 |
| 6,592,031 | B1 | * | 7/2003 | Klatt | 235/382 |
| 6,628,814 | B1 | * | 9/2003 | Shapiro | 382/127 |
| 6,631,201 | B1 | * | 10/2003 | Dickinson et al. | 382/124 |

FOREIGN PATENT DOCUMENTS

| DE | 298 21 644 U | 2/1999 |
| EP | 0 864 996 A2 | 9/1998 |
| EP | 0901319 A | 3/1999 |
| JP | 63-231762 | 9/1988 |
| JP | 3-164953 | 7/1991 |
| JP | 6-76127 | 3/1994 |
| JP | 6-251049 | 9/1994 |

(Continued)

OTHER PUBLICATIONS http://www.zdnet.co.jp/news/9905/13/nec.html—published May 13, 1999.

(Continued)

*Primary Examiner*—Matthew C. Bella
*Assistant Examiner*—Sath V. Perungavoor
(74) *Attorney, Agent, or Firm*—Westerman, Hattori, Daniels & Adrian, LLP.

(57) ABSTRACT

An extension device has such a configuration as to be mounted in an extension bay of an information processing device, and includes an identification-information-acquisition unit.

6 Claims, 34 Drawing Sheets

FOREIGN PATENT DOCUMENTS

| | | | |
|---|---|---|---|
| JP | 3002964 | | 11/1994 |
| JP | 08-078114 | | 3/1996 |
| JP | 08-138300 | | 5/1996 |
| JP | 10-149446 | | 6/1998 |
| JP | 10-211191 | | 8/1998 |
| JP | 10-312459 | | 11/1998 |
| JP | 11-39483 | | 2/1999 |
| JP | 11-110533 | | 4/1999 |
| JP | 2000293688 A | * | 10/2000 |
| JP | 2001069391 A | * | 3/2001 |
| WO | WO 97 39418 A | | 10/1997 |

OTHER PUBLICATIONS http://www.nec.co.jp/japanese/today/newsrel/9905/1301.html—published May 13, 1999.

http://www.pc98.nec.co.jp/Product/ext/extend/fp001—published Mar. 27, 2000.

http://www.sw.nec.co.jp/pid/pk-fp001.html—published May 1999.

http://www.nec.co.jp/japanese/today/newsrel/9911/2901.html—published Nov. 29, 1999.

http://www.pc98.nec.co.jp/Product/mg/730-ol.html—published Nov. 29, 1999.

http://www.indentix.com/itsecurity/rpoducts/Biotough.html—published approx. Mar. 27, 2000.

Bio Logan 2.0 Product Suite Finger Print Identification Technology—Mar. 2000.

Secure Vision by Fujitsu—Nov. 1998.

Fingerpass Card FPI-550—Nov. 1998.

FPI-550 Fingerprint Authentication Device Instruction Manual—Sep. 1998.

* cited by examiner

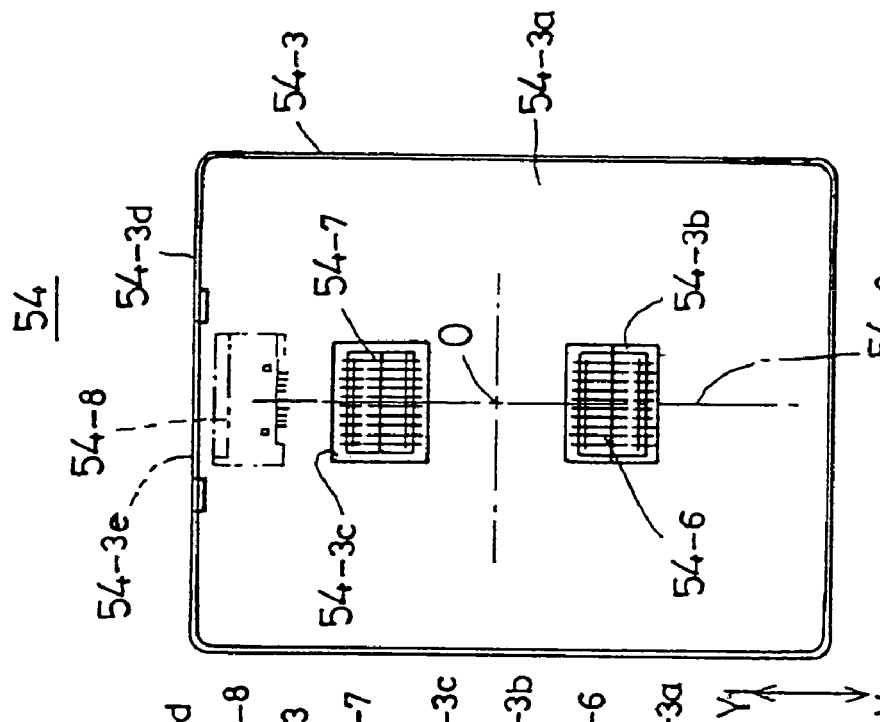
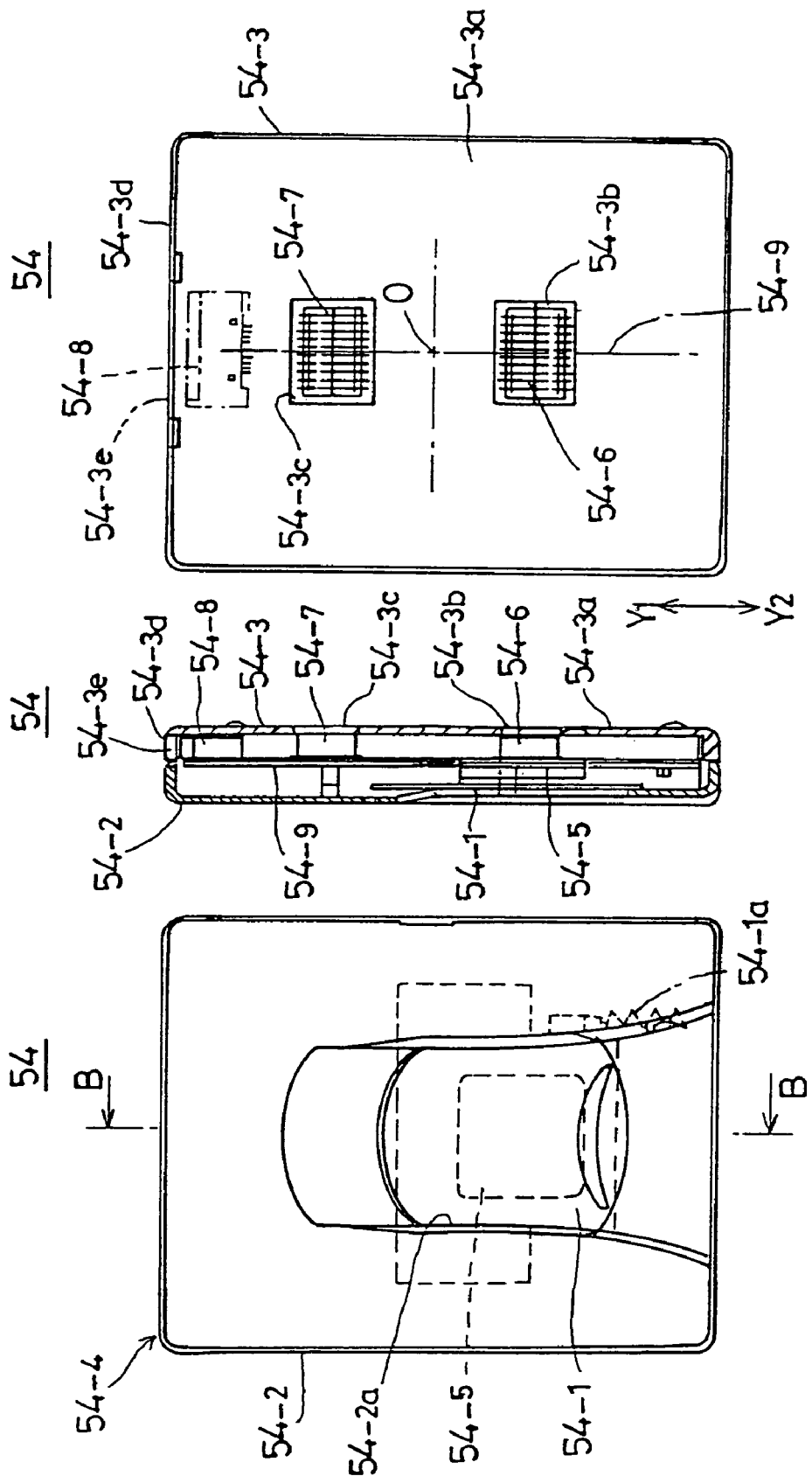

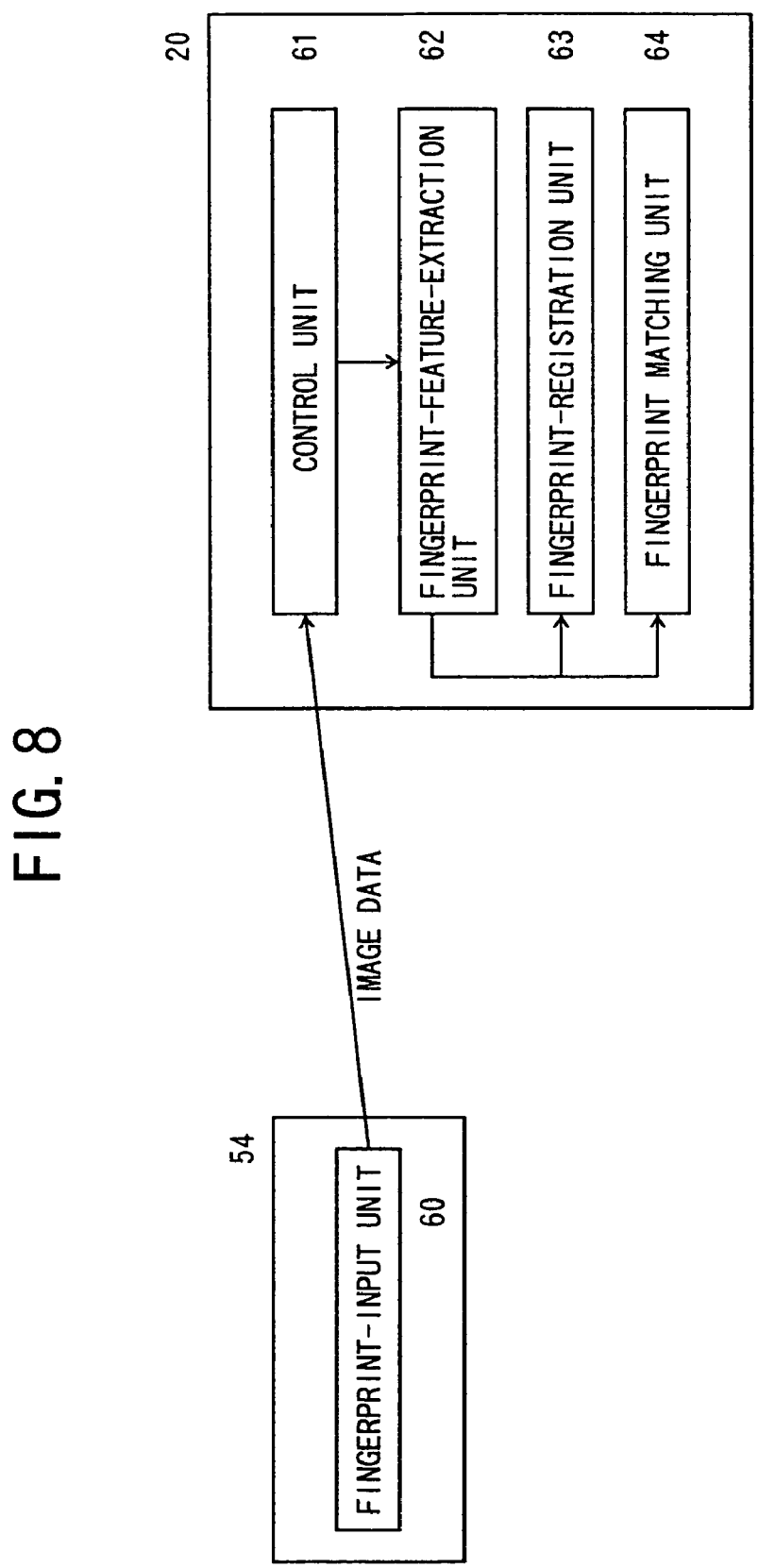

EXTENSION DEVICE PROVIDING SECURITY FUNCTION

This application is a divisional of prior application Ser. No. 09/639,098 filed Aug. 16, 2000.

BACKGROUND OF THE INVENTION

1. Field of the Invention

The present invention relates to an extension device providing a security function or an identification-information-acquisition function for an information processing device or an electronic device.

As a result of recent development of open network technologies in this information age, more investments than ever are made in information infrastructures, resulting in widespread use of networks and the Internet. Against this background, mobile information processing devices such as notebook personal computers, laptop personal computers, and mobile terminals are used in many different settings, and so are installed-type information processing devices such as desktop personal computers. In such an environment, an importance for security is heightened in order to prevent private information stored in the device from being exposed to unauthorized users.

In prior art, owners or authorized users of information processing devices used passwords, IDs, personal-identification-number (PIN) codes for identification purposes. The use of passwords, IDs, PIN codes, however, is cumbersome since it requires users to remember them and to enter them whenever they are required. Further, use of passwords, IDs, and PIN codes always carries a risk of having them stolen.

As an alternative to passwords, IDs, and PIN codes, biological information unique to each individual such as fingerprints is used in some devices.

2. Description of the Related Art

FIGS. 1A and 1B show illustrative drawings showing a card-type fingerprint identification device 1 that is commercialized by FUJITSU DENSO LIMITED. FIG. 1A shows the card-type fingerprint identification device 1, and FIG. 1B shows a notebook personal computer 10 (or a portable-information-processing device, hereinafter referred to as a notebook-type personal computer) that has the card-type fingerprint identification device 1 inserted therein.

The card-type fingerprint identification device 1 includes a fingerprint identification unit 2 for identifying a fingerprint and a PCMCIA (personal computer memory card international association) card 3. As shown in FIG. 1B, the card-type fingerprint identification device 1 is used while the PCMCIA card 3 thereof is inserted into a PCMCIA-card slot 11, which is provided in the side panel of the notebook personal computer 10. The fingerprint identification unit 2 sticks out from the side panel of the notebook personal computer 10.

When a user needs to carry an notebook personal computer 10 outside the office, the fingerprint identification unit 2 sticking out from the side panel is too much encumbrance. Because of this, the card-type fingerprint identification device 1 needs to be detached from the notebook personal computer 10 and be carried separately from the notebook personal computer 10. This is inconvenient.

Accordingly, there is a need for an extension device which provides an identification-information-acquisition function or a security function for an information processing device without sacrificing portability of the device.

SUMMARY OF THE INVENTION

It is a general object of the present invention to provide an extension device that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an extension device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an extension device having such a configuration as to be mounted in an extension bay of an information processing device and including an identification-information-acquisition unit.

The extension device described above is mounted in the extension bay of the information processing device such that the extension device can be carried with the information processing device as an integral part of the information processing device. If the extension device is so configured as not to stick out from the information processing device, portability is further improved. This configuration is particularly advantageous if the information processing device is of a portable type. Further, in the case where the extension bay of the information processing device is configured to store therein any one of a plurality of different types of extension devices, the identification-information-acquisition unit mounted in the extension bay is freely exchangeable with other extension devices, thereby helping to achieve compactness and expandability of the information processing device. As the identification-information-acquisition unit, various types of units can be employed, such units including a fingerprint-detection (fingerprint-input) unit, a voice (voice-pattern) input unit, a retinal-pattern-input unit, a handwriting-input unit (such as a pen-input device or a touch pad), and a facial-image/feature input unit (such as a CCD camera acquiring an image of a user face), all of which utilize biological information as identification information. Further, the identification-information-acquisition unit may be a key-input unit which allows an individual ID, a per-sonal-identification-number code, or a password to be entered through typing of keys. Further, a unit may be provided for the purpose of reading an ID card such as a magnetic card or an IC card. The present invention is not limited to use of a particular type of identification information.

According to one aspect of the present invention, the identification-information-acquisition unit includes a biological-information-acquisition unit for acquiring biological information. As previously described, the biological information used in the present invention may include voice (voice pattern), retinal patterns, handwritings, facial images or features, etc. In such a case, the acquisition unit may be a voice (voice-pattern) input unit, a retinal-pattern-input unit, a handwriting-input unit (such as a pen-input device or a touch pad), or a facial-image/feature input unit (such as a CCD camera acquiring an image of a user face). Biological information is unique to individuals, and carries a smaller risk of unauthorized use or forgery than in the case where identification is checked based on an ID card such as a magnetic card or a personal-identification-number code. An ID card may be stolen, and a PIN code may be illegally accessed by others, resulting in unauthorized use thereof. Use of biological information thus heightens security. Further, providing the biological-information-acquisition unit in the extension device can improve security of the information processing device having an extension bay.

According to another aspect of the present invention, the identification-information-acquisition unit includes an ID-card-reader unit for reading an ID card. Provision of the ID-card-reader unit in the extension device makes it possible to carry the ID-card reader together with the information processing device as an integral part thereof. Since the ID-card-reader unit does not stick out from the information processing device, the configuration described above provides better portability.

According to another aspect of the present invention, the identification-information-acquisition unit includes a personal-identification-number-entry unit for receiving a personal-identification-number code. The extension device can be mounted in the extension bay of the information processing device such that the extension device can be carried with the information processing device as an integral part of the information processing device. If the extension device is so configured as not to stick out from the information processing device, portability is further improved. This configuration is particularly advantageous if the information processing device is of a portable type.

According to another aspect of the invention, the biological information includes one of fingerprints, retinal patterns, voice, handwritings, and facial features. Such biological information is unique to individual users, and is not easy to steal or forge. Difficulty of forgery heightens security. When entering biological information in the information processing device, a user does not need to carry with him/her a special device such as a card, and does not have to remember a PIN code or the like. This frees the user from encumbrance of entry of identification information.

According to another aspect of the present invention, the identification-information-acquisition unit is provided on a side panel of the extension device that is exposed when the extension device is mounted in the extension bay. The location of the identification-information-acquisition unit on the side panel of the extension device provides easy access to the unit while the extension device is mounted in the extension bay, thereby providing ease of use. Further, since the unit is exposed on the side panel, no part of the unit sticks out from the information processing device, thereby providing ease of use.

According to another aspect of the present invention, the extension device includes a matching unit which matches identification information entered in the identification-information-acquisition unit with registered identification information. This configuration makes it possible for the extension device to check identification.

According to another aspect of the present invention, an extension device having such a configuration as to be mounted in a container portion of an information processing device includes an identification-information-acquisition unit which receives identification information, and a carrier unit which carries the identification-information-acquisition unit from a position where the identification-information-acquisition unit is encased in the container portion to a position where the identification-information-acquisition unit is situated outside the container portion so as to permit entry of identification information. An example of the container portion is an extension bay. When the extension device is stored in the container portion (e.g., extension bay), the extension device is carried together with the information processing device as an integral part thereof, thereby providing better portability. When the identification-information-acquisition unit is not used, it is stored and encased in the container portion, making it easy to carry the information processing device. This configuration is particularly advantageous when the information processing device is of a portable type. Further, in the case where the extension bay of the information processing device is configured to store therein any one of a plurality of different types of extension devices, the identification-information-acquisition unit mounted in the extension bay is freely exchangeable with other extension devices, thereby helping to achieve compactness and expandability of the information processing device. As the identification-information-acquisition unit, various types of units can be employed, such units including a fingerprint-detection (fingerprint-input) unit, a voice (voice-pattern) input unit, a retinal-pattern-input unit, a handwriting-input unit (such as a pen-input device or a touch pad), and a facial-image/feature input unit (such as a CCD camera acquiring an image of a user face), all of which utilize biological information as identification information. Further, the identification-information-acquisition unit may be a key-input unit which allows an individual ID, a personal-identification-number code, or a password to be entered through typing of keys. Further, a unit may be provided for the purpose of reading an ID card such as a magnetic card or an IC card. The present invention is not limited to use of a particular type of identification information.

According to another aspect of the present invention, the identification-information-acquisition unit includes a biological-information-acquisition unit for acquiring biological information. As previously described, the biological information used in the present invention may include voice (voice pattern), retinal patterns, handwritings, facial images or features, etc. In such a case, the acquisition unit may be a voice (voice-pattern) input unit, a retinal-pattern-input unit, a handwriting-input unit (such as a pen-input device or a touch pad), or a facial-image/feature input unit (such as a CCD camera acquiring an image of a user face). Biological information is unique to individuals, and carries a smaller risk of unauthorized use or forgery than in the case where identification is checked based on an ID card such as a magnetic card or a personal-identification-number code. Use of biological information thus heightens security.

According to another aspect of the present invention, the biological information includes one of fingerprints, retinal patterns, voice, handwritings, and facial features. Such biological information is unique to individual users, and is not easy to steal or forge. Difficulty of forgery heightens security. When entering biological information in the information processing device, a user does not need to carry with him/her a special device such as a card, and does not have to remember a PIN code or the like. This frees the user from encumbrance of entry of identification information.

According to another aspect of the present invention, the identification-information-acquisition unit is configured to be detachable from the carrier unit. In this manner, it is possible to use the identification-information-acquisition unit while it is being detached from the carrier unit.

According to another aspect of the present invention, the identification-information-acquisition unit is connectable to the information processing device through a cable when the identification-information-acquisition unit is detached from the carrier unit. This cable preferably connects the identification-information-acquisition unit to the information processing unit electrically or optically such as to achieve data transfer. Since the identification-information-acquisition unit is usable through the cable connection while it is being detached from the information processing device, there is no need to let the identification-information-acquisition unit slide out from the information processing device each time the unit is to be used while the device is placed on a desk or the like. This ensures ease of use of the device.

According to another aspect of the present invention, the identification-information-acquisition unit includes a left-hand-side connector which is to be connected to the extension device when the extension device is mounted in a left-hand side of the information processing device, and a right-hand-side connector which is to be connected to the extension device when the extension device is mounted in a right-hand side of the information processing device. Because of this configuration, the identification-information-acquisition unit will be usable with an extension device that would be available in the future and mountable to the right-hand side of an information processing device.

According to another aspect of the present invention, the identification-information-acquisition unit includes a front-side connector which is to be connected to the extension device when the extension device is mounted in a front side of the information processing device. Because of this configuration, the identification-information-acquisition unit can be used with an extension device that is mounted in a front side of an information processing device.

According to another aspect of the present invention, the identification-information-acquisition unit includes a cable having a connector provided at a tip thereof, the identification-information-acquisition unit being connectable to a connector of the extension device via the cable when the identification-information-acquisition unit is attached to the carrier unit, and being connectable to the information processing device via the cable when the identification-information-acquisition unit is detached from the carrier unit. Since the identification-information-acquisition unit is usable via the cable connection while it is being detached from the information processing device, there is no need to let the identification-information-acquisition unit slide out from the information processing device each time the unit is to be used while the device is placed on a desk or the like. This ensures ease of use of the device. Further, the use of the cable extending from the identification-information-acquisition unit eliminates a need to secure a separate storage for the cable.

According to another aspect of the present invention, the extension device includes an operation unit which prompts the carrier unit to engage in first motion to situate the identification-information-acquisition unit at a position that is barely sufficient for identification information to be entered in the identification-information-acquisition unit, and prompts the carrier unit to engage in second motion to expose an entirety of the identification-information-acquisition unit outside the container portion. When properly operated, the operation unit exposes the entirety of the identification-information-acquisition unit outside the container portion, so that it is easy to take the identification-information-acquisition unit out of the container portion.

According to another aspect of the present invention, an identification-information-acquisition device to be detachably mounted in an extension device which has such a configuration as to be mounted in a container portion of an information processing device, and which includes a carrier unit that moves from a position where the carrier unit is encased in the container portion to a position where the carrier unit is situated outside the container portion, includes an identification-information-acquisition unit which receives identification information, wherein the carrier unit moves the identification-information-acquisition unit from an encased position to a position where the identification information can be entered in the identification-information-acquisition unit when the identification-information-acquisition device is mounted on the carrier unit. An example of the container portion is an extension bay. Since the identification-information-acquisition unit can be detached from the carrier unit, the user can use the identification-information-acquisition unit while it is detached, and can also use the identification-information-acquisition unit while it is placed in the encased position. When the information processing device is to be carried, the identification-information-acquisition unit can be stored in the container portion, thereby providing better portability. In the case where the container portion (e.g., extension bay) of the information processing device is configured to store therein any one of a plurality of different types of extension devices, the identification-information-acquisition unit mounted in the extension bay is freely exchangeable with other extension devices, thereby helping to achieve compactness and expandability of the information processing device. As the identification-information-acquisition unit, various types of units can be employed, such units including a fingerprint-detection (fingerprint-input) unit, a voice (voice-pattern) input unit, a retinal-pattern-input unit, a handwriting-input unit (such as a pen-input device or a touch pad), and a facial-image/feature input unit (such as a CCD camera acquiring an image of a user face), all of which utilize biological information as identification information. Further, the identification-information-acquisition unit may be a key-input unit which allows an individual ID, a personal-identification-number code, or a password to be entered through typing of keys. Further, a unit may be provided for the purpose of reading an ID card such as a magnetic card or an IC card. The present invention is not limited to use of a particular type of identification information.

According to another aspect of the present invention, the identification-information-acquisition unit includes a biological-information-acquisition unit for acquiring biological information. As previously described, the biological information used in the present invention may include voice (voice pattern), retinal patterns, handwritings, facial images or features, etc. In such a case, the acquisition unit may be a voice (voice-pattern) input unit, a retinal-pattern-input unit, a handwriting-input unit (such as a pen-input device or a touch pad), or a facial-image/feature input unit (such as a CCD camera acquiring an image of a user face). Biological information is unique to individual users, and carries a smaller risk of unauthorized use or forgery than in the case where identification is checked based on an ID card such as a magnetic card or a personal-identification-number code. Use of biological information thus heightens security.

According to another aspect of the present invention, the biological information includes one of fingerprints, retinal patterns, voice, handwritings, and facial features. Such biological information is unique to individual users, and is not easy to steal or forge. Difficulty of forgery heightens security. When entering biological information in the information processing device, a user does not need to carry with him/her a special device such as a card, and does not have to remember a PIN code or the like. This frees the user from encumbrance of entry of identification information.

According to another aspect of the present invention, an information processing device includes a case, an identification-information-acquisition unit which receives identification information, a container unit which is provided in association with the case, and stores the identification-information-acquisition unit therein, and a carrier unit which carries the identification-information-acquisition unit from a position where the identification-information-acquisition unit is encased in the container unit to a position where the identification-information-acquisition unit is situated outside the container unit. The carrier unit makes it possible to store the identification-information-acquisition unit in the container unit of the information processing device. When the information processing device is to be carried, the identification-information-acquisition unit can be stored in the container unit, thereby providing better portability. As the identification-information-acquisition unit, various types of units can be employed, such units including a fingerprint-detection (fingerprint-input) unit, a voice (voice-pattern) input unit, a retinal-pattern-input unit, a handwriting-input unit (such as a pen-input device or a touch pad), and a facial-image/feature input unit (such as a CCD camera acquiring an image of a user face), all of which utilize biological information as identification information. Further, the identification-information-acquisition unit may be a key-input unit which allows an individual ID, a personal-identification-number code, or a password to be entered through typing of keys. Further, a unit may be provided for the purpose of reading an ID card such as a magnetic card or an IC card. The present invention is not limited to use of a particular type of identification information.

According to another aspect of the present invention, the identification-information-acquisition unit includes a biological-information-acquisition unit for acquiring biological information. As previously described, the biological information used in the present invention may include voice (voice pattern), retinal patterns, handwritings, facial images or features, etc. In such a case, the acquisition unit may be a voice (voice-pattern) input unit, a retinal-pattern-input unit, a handwriting-input unit (such as a pen-input device or a touch pad), or a facial-image/feature input unit (such as a CCD camera acquiring an image of a user face). Biological information is unique to individual users, and carries a smaller risk of unauthorized use or forgery than in the case where identification is checked based on an ID card such as a magnetic card or a personal-identification-number code. Use of biological information thus heightens security.

According to another aspect of the present invention, the biological information includes one of fingerprints, retinal patterns, voice, handwritings, and facial features. Such biological information is unique to individual users, and is not easy to steal or forge. Difficulty of forgery heightens security. When entering biological information in the information processing device, a user does not need to carry with him/her a special device such as a card, and does not have to remember a PIN code or the like. This frees the user from encumbrance of entry of identification information.

According to another aspect of the present invention, the identification-information-acquisition unit is configured to be detachable from the carrier unit. In this configuration, it is possible to use the identification-information-acquisition unit while it is being detached from the carrier unit.

According to another aspect of the present invention, an identification-information-acquisition device to be detachably mounted in an information processing device which includes a carrier unit that moves from a position where the carrier unit is encased in the information processing device to a position where the carrier unit is exposed outside the information processing device, includes an identification-information-acquisition unit which receives identification information, wherein the carrier unit moves the identification-information-acquisition unit from an encased position to a position where the identification information can be entered in the identification-information-acquisition unit when the identification-information-acquisition device is mounted on the carrier unit. Since the identification-information-acquisition unit can be detached from the carrier unit, the user can use the identification-information-acquisition unit while it is detached, and can also use the identification-information-acquisition unit while it is placed in the encased position. When the information processing device is to be carried, the identification-information-acquisition unit can be stored and encased in the information processing device, thereby providing better portability. As the identification-information-acquisition unit, various types of units can be employed, such units including a fingerprint-detection (fingerprint-input) unit, a voice (voice-pattern) input unit, a retinal-pattern-input unit, a handwriting-input unit (such as a pen-input device or a touch pad), and a facial-image/feature input unit (such as a CCD camera acquiring an image of a user face), all of which utilize biological information as identification information. Further, the identification-information-acquisition unit may be a key-input unit which allows an individual ID, a personal-identification-number code, or a password to be entered through typing of keys. Further, a unit may be provided for the purpose of reading an ID card such as a magnetic card or an IC card. The present invention is not limited to use of a particular type of identification information.

According to another aspect of the present invention, the identification-information-acquisition unit includes a biological-information-acquisition unit for acquiring biological information. As previously described, the biological information used in the present invention may include voice (voice pattern), retinal patterns, handwritings, facial images or features, etc. In such a case, the acquisition unit may be a voice (voice-pattern) input unit, a retinal-pattern-input unit, a handwriting-input unit (such as a pen-input device or a touch pad), or a facial-image/feature input unit (such as a CCD camera acquiring an image of a user face). Biological information is unique to individual users, and carries a smaller risk of unauthorized use or forgery than in the case where identification is checked based on an ID card such as a magnetic card or a personal-identification-number code. Use of biological information thus heightens security.

According to another aspect of the present invention, the biological information includes one of fingerprints, retinal patterns, voice, handwritings, and facial features. Such biological information is unique to individual users, and is not easy to steal or forge. Difficulty of forgery heightens security. When entering biological information in the information processing device, a user does not need to carry with him/her a special device such as a card, and does not have to remember a PIN code or the like. This frees the user from encumbrance of entry of identification information.

According to another aspect of the present invention, the identification-information-acquisition unit is configured to be detachable from the carrier unit. In this configuration, it is possible to use the identification-information-acquisition unit while it is detached from the carrier unit.

According to another aspect of the present invention, an extension device has such a configuration as to be mounted in an extension bay of an information processing device, and provides a security function.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type.

According to another aspect of the present invention, an extension device has such a configuration as to be mounted in an extension bay of an information processing device, and provides a function to detect a fingerprint.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type.

According to another aspect of the present invention, an extension device has such a configuration as to be mounted in an extension bay of an information processing device, and includes a fingerprint-reading unit for detecting a fingerprint, and a carrier unit for carrying the fingerprint-reading unit from an encased position to an exposed position where a fingerprint can be detected When mounted in the extension bay of the information processing device, the device as described above can be carried together with the information processing device as an integral part thereof, and does not stick out from the information processing device, thereby providing better portability. Further, since the carrier unit makes the fingerprint-reading unit slide out to the exposed position where a fingerprint can be detected, it is easy to prepare appropriate positioning for fingerprint detection, thereby providing ease of use.

According to another aspect of the present invention, the fingerprint-reading unit is detachable from the carrier unit.

In this configuration, it is possible to use the fingerprint-reading unit while it is detached from the carrier unit.

According to another aspect of the present invention, the fingerprint-reading unit is configured to be electrically connected to the information processing device through a cable while it is detached from the carrier unit.

Since it is possible to use the detached fingerprint-reading unit through the cable connection, there is no need to let the fingerprint-reading unit slide out from the information processing device each time the unit is to be used while the device is placed on a desk or the like. This ensures ease of use of the device.

According to another aspect of the present invention, the fingerprint-reading unit includes a left-hand-side connector which is to be connected to the extension device when the extension device is mounted in a left-hand side of the information processing device, and a right-hand-side connector which is to be connected to the extension device when the extension device is mounted in a right-hand side of the information processing device.

Because of this configuration, the fingerprint-reading unit will be usable with an extension device that would be available in the future and mountable to the right-hand side of an information processing device.

According to another aspect of the present invention, the fingerprint-reading unit includes a cable having a connector provided at a tip thereof, the fingerprint-reading unit being connectable to a connector of the extension device via the cable when the fingerprint-reading unit is attached to the carrier unit, and being connectable to the information processing device via the cable when the fingerprint-reading unit is detached from the carrier unit.

Since the fingerprint-reading unit is usable via the cable connection while it is being detached from the information processing device, there is no need to let the fingerprint-reading unit slide out from the information processing device each time the unit is to be used while the device is placed on a desk or the like. This ensures ease of use of the device. Further, the use of the cable extending from the fingerprint-reading unit eliminates a need to secure a separate storage for the cable.

According to another aspect of the present invention, the fingerprint-reading unit is detachable from the tray, and includes a housing, wherein an operation unit for letting the carrier unit slide out is provided. The operation unit slides out the fingerprint-reading unit from the information processing device to a position where a fingerprint can be detected, or slides out the fingerprint-reading unit such that the entirety of the unit is exposed outside the information processing unit.

Use of the operation unit makes it possible to expose the entirety of the fingerprint-reading unit outside the information processing device. It is thus easy to remove the fingerprint-reading unit from the carrier unit.

According to another aspect of the present invention, an extension device is configured to be mountable in an extension bay of an information processing device, and has a fingerprint-identification function which matches a detected fingerprint with a registered fingerprint.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type.

According to another aspect of the present invention, an extension device is configured to be mountable in an extension bay of an information processing device, and includes a fingerprint-identification unit having a function to check identification by a fingerprint, and a carrier unit for sliding out the fingerprint-identification unit from an encased position to a position where a fingerprint can be detected.

When mounted in the extension bay of the information processing device, the device as described above can be carried together with the information processing device as an integral part thereof, and does not stick out from the information processing device, thereby providing better portability. Since the carrier unit makes the fingerprint-identification unit slide out to the exposed position where a fingerprint can be detected, it is easy to prepare appropriate positioning for fingerprint detection, thereby securing ease of use.

According to another aspect of the present invention, the fingerprint-identification unit is detachable from the carrier unit.

In this configuration, it is possible to use the fingerprint-identification unit while it is detached from the carrier unit.

According to another aspect of the present invention, the fingerprint-identification unit is configured to be electrically connected to the information processing device through a cable while it is detached from the carrier unit.

Since it is possible to use the detached fingerprint-identification unit through the cable connection, there is no need to let the fingerprint-identification unit slide out from the information processing device each time the unit is to be used while the device is placed on a desk or the like. This ensures ease of use of the device.

According to another aspect of the present invention, the fingerprint-identification unit includes a left-hand-side connector which is to be connected to the extension device when the extension device is mounted in a left-hand side of the information processing device, and a right-hand-side connector which is to be connected to the extension device when the extension device is mounted in a right-hand side of the information processing device.

Because of this configuration, the fingerprint-identification unit will be usable with an extension device that would be available in the future and mountable to the right-hand side of an information processing device.

According to another aspect of the present invention, the fingerprint-identification unit includes a front-side connector which is to be connected to the extension device when the extension device is mounted in a front side of the information processing device. Because of this configuration, the fingerprint-identification unit can be used with an extension device that is mounted in a front side of an information processing device.

According to another aspect of the present invention, the fingerprint-identification unit includes a cable having a connector provided at a tip thereof, the fingerprint-identification unit being connectable to a connector of the extension device via the cable when the fingerprint-identification unit is attached to the carrier unit, and being connectable to the information processing device via the cable when the fingerprint-identification unit is detached from the carrier unit.

Since the fingerprint-identification unit is usable via the cable connection while it is being detached from the information processing device, there is no need to let the fingerprint-identification unit slide out from the information processing device each time the unit is to be used while the device is placed on a desk or the like. This ensures ease of use of the device. Further, the use of the cable extending from the fingerprint-identification unit eliminates a need to secure a separate storage for the cable.

According to another aspect of the present invention, the fingerprint-identification unit is detachable from the carrier unit, and the extension device includes an operation unit which prompts the carrier unit to engage in first motion to situate the fingerprint-identification unit at a position that is barely sufficient for identification information to be entered in the fingerprint-identification unit, and prompts the carrier unit to engage in second motion to expose an entirety of the fingerprint-identification unit outside the information processing device.

When properly operated, the operation unit exposes the entirety of the fingerprint-identification unit outside the information processing device, so that it is easy to take the fingerprint-identification unit out of the carrier unit.

According to another aspect of the present invention, a fingerprint-reading unit is equipped with a connector, and has generally a box shape and a fingerprint-detection function.

The fingerprint-reading unit described above can be used with an extension device, or can be used alone.

According to another aspect of the present invention, a fingerprint-reading unit is equipped with a cable having a connector provided at a tip thereof, and has generally a box shape and a fingerprint-detection function.

The fingerprint-reading unit described above can be used with an extension device, or can be used alone. When used alone, the unit does not need an extra cable since it has the cable already attached thereto.

According to another aspect of the present invention, a fingerprint-identification-check unit is equipped with a connector, and has generally a box shape and a fingerprint-identification-check function.

The fingerprint-identification-check unit described above can be used with an extension device, or can be used alone.

According to another aspect of the present invention, a fingerprint-identification-check unit is equipped with a cable having a connector provided at a tip thereof, and has generally a box shape and a fingerprint-identification-check function.

The fingerprint-reading unit described above can be used with an extension device, or can be used alone. When used alone, the unit does not need an extra cable since it has the cable already attached thereto.

According to another aspect of the present invention, an extension device has such a configuration as to be mounted in an extension bay of an information processing device, and has a fingerprint-detection function.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type.

According to another aspect of the present invention, an extension device has such a configuration as to be mounted in an extension bay of an information processing device, and has a fingerprint-detection function implemented on a side panel of the extension device that is exposed when the extension device is mounted in the extension bay.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type. Further, since the fingerprint-detection function is provided on the side panel that is exposed when the extension device is mounted in the extension bay, it is easy to access the fingerprint-detection function, providing ease of use of the extension device.

According to another aspect of the present invention, an extension device has such a configuration as to be mounted in an extension bay of an information processing device, and has an ID-card-reader unit.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type.

According to another aspect of the present invention, an extension device has such a configuration as to be mounted in an extension bay of an information processing device, and has an ID-card-reader unit implemented on a side panel of the extension device that is exposed when the extension device is mounted in the extension bay.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type. Further, since the ID-card-reader unit is provided on the side panel that is exposed when the extension device is mounted in the extension bay, it is easy to access the ID-card-reader unit, providing ease of use of the extension device.

According to another aspect of the present invention, an extension device has such a configuration as to be mounted in an extension bay of an information processing device, and has a PIN-code-input unit.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type.

According to another aspect of the present invention, an extension device has such a configuration as to be mounted in an extension bay of an information processing device, and has an PIN-code-input unit implemented on a side panel of the extension device that is exposed when the extension device is mounted in the extension bay.

When mounted in the extension bay of the information processing device, the device as described above can be carried together with the information processing device as an integral part thereof, and does not stick out from the information processing device, thereby providing better portability. This configuration is particularly advantageous when the information processing device is of a portable type. Further, since the PIN-code-input unit is provided on the side panel that is exposed when the extension device is mounted in the extension bay, it is easy to access the PIN-code-input unit, providing ease of use of the extension device.

BRIEF DESCRIPTION OF THE DRAWINGS

FIGS. 7A through 7C are illustrative drawings showing the fingerprint-reading unit;

FIG. 8 is a block diagram showing functions of the fingerprint-reading unit and a notebook personal computer;

DESCRIPTION OF THE PREFERRED EMBODIMENTS

In the following, embodiments of the present invention will be described with reference to the accompanying drawings.

To facilitate the understanding of the present invention, a description will be first given with regard to relation between an identification-information-acquisition device or an instrument of security function (for example, a fingerprint-reading extension device) and other extension devices such as a floppy drive as well as with regard to relation between the fingerprint-reading extension device and a notebook personal computer.

In the following description of embodiments, for the sake of convenience, the information processing device will be simply referred to as a notebook personal computer. The information processing device of the present invention, however, includes any portable-type device such as a portable information processing device or a mobile terminal. Further, the term "computer" is used to refer to a device equipped with a processor, a device that performs any kind of information processing, or a device that performs any act (storing of data, communication, etc.) that relates to information processing.

Figure 2:
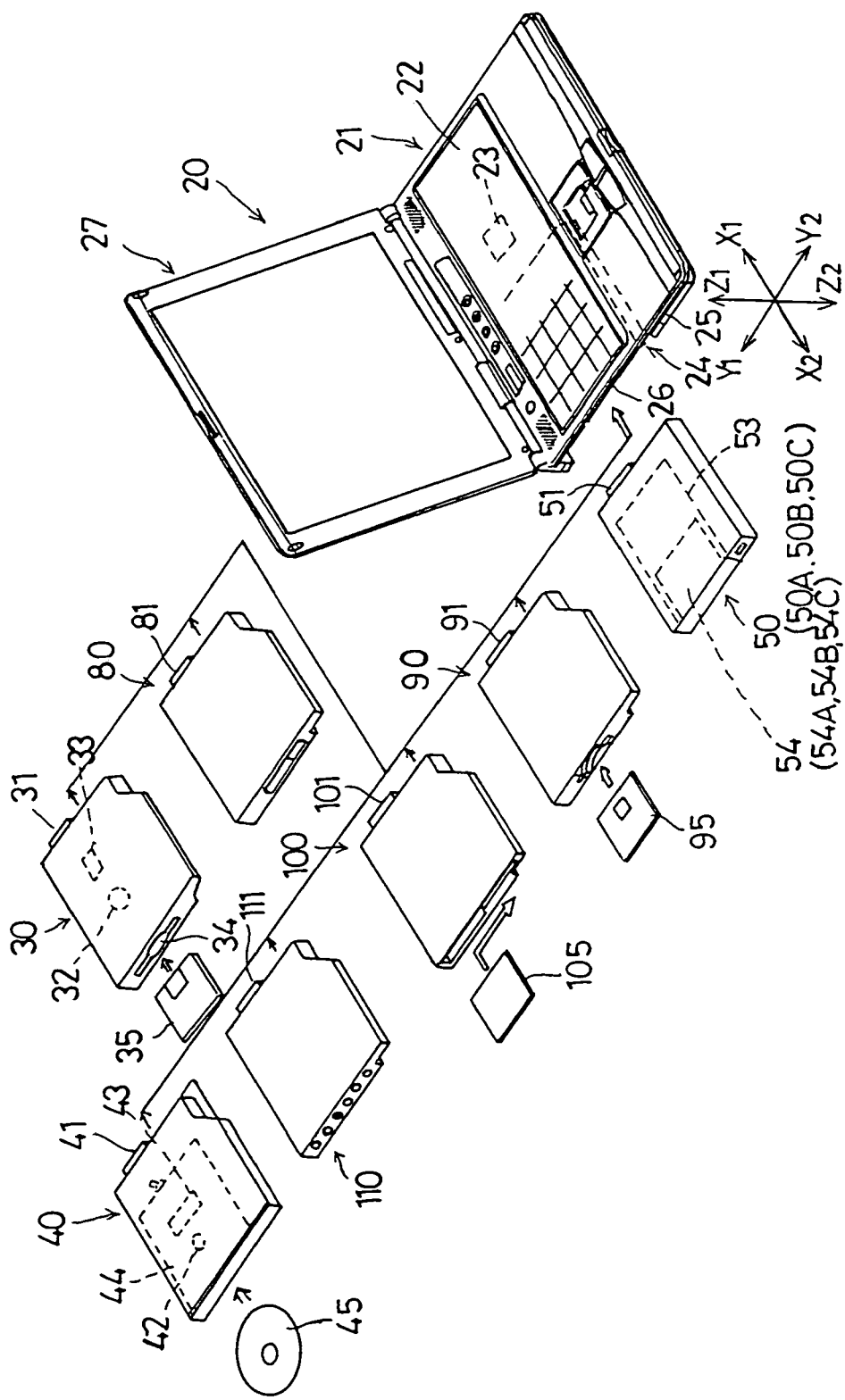
FIG. 2 is an illustrative drawing showing an extension device of the present invention in relation with a notebook personal computer.

FIG. 2 is an illustrative drawing showing an extension device of the present invention in relation with a notebook personal computer.

A notebook personal computer 20 includes a computer body 21 exemplifying a case or housing, and further includes a liquid-crystal-display unit 27 serving as a display unit that can be swung open to show a display screen. A direction X1–X2 corresponds to the width of the notebook personal computer 20. A direction Y1–Y2 corresponds to the depth of the notebook personal computer 20, and a direction Z1–Z2 corresponds to the height of the notebook personal computer 20. The computer body 21 has a keyboard portion 22 provided on an upper surface thereof and serving as an input unit, and has a CPU 23 or a processor contained therein. Further, the computer body 21 has an extension bay 24 that serves as a container. The extension bay 24 occupies about half the extension of the computer body 21 in the direction X1–X2, and is provided on the left-hand side so as to have an opening 26 in a side panel 25 of the computer body 21.

The notebook personal computer 20 can be used with various extension devices such as an extension floppy drive 30, an extension CD-ROM drive 40, extension devices having an identification-information-acquisition function or providing a security function (for example, fingerprint-reading extension devices 50, 50A, 50B, 50C, and 50D) corresponding to first through fourth embodiments of the present invention, a fingerprint-reading extension device 80 (or fingerprint-identification device) corresponding to a fifth embodiment, an IC-card-reader extension device 90 (or IC-card-identification extension device) of a sixth embodiment, a magnetic-card-reader extension device 100 (or magnetic-card-identification extension device) of a seventh embodiment, and a PIN-input extension device 110 (or PIN-identification extension device) of an eighth embodiment.

These extension devices have a flat shape that can fit in the extension bay 24 through the opening 26, and have respective connectors 31, 41, 51, 81, 91, 101, 111 at the same position on the back side.

The core circuit 30 includes a turn table 32 and a magnetic-head device 33, and has an slit opening 34 in a front panel facing the direction X2. The extension CD-ROM drive 40 includes a turn table 42 and an optical-head device 43 provided on a drawer unit 44.

When the notebook personal computer 20 is to be used with a floppy disk, the extension floppy drive 30 is inserted and set in place in the extension bay 24. A floppy disk 35 is inserted into the slit opening 34 to be mounted in the extension floppy drive 30.

When the notebook personal computer 20 is to be used with a CD-ROM, the extension CD-ROM drive 40 is inserted and set in place in the extension bay 24. A CD-ROM 45 is placed on the turn table 42 after sliding out the drawer unit 44. When the drawer unit 45 is pushed in into its place, information recorded on the CD-ROM 45 will be read.

Other extension devices 50, 50A, 50B, 50C, 50D, 80, 90, 100, and 110 may be mounted in the extension bay 24 when the notebook personal computer 20 is taken out of office. The manner in which these extension devices are mounted in the extension bay 24 is basically the same as the manner in which the extension floppy drive 30 or the extension CD-ROM drive 40 is mounted.

The extension bay 24 exemplifying a container unit of the present invention is referred to by many different names. Those names include a bay, an extension bay slot, a multi bay, a multipurpose bay, etc.

First Embodiment

In what follows, an extension device having an identification-information-acquisition function or providing a security function (for example, the fingerprint-reading extension device 50) of the first embodiment will be described.

Figure 3:
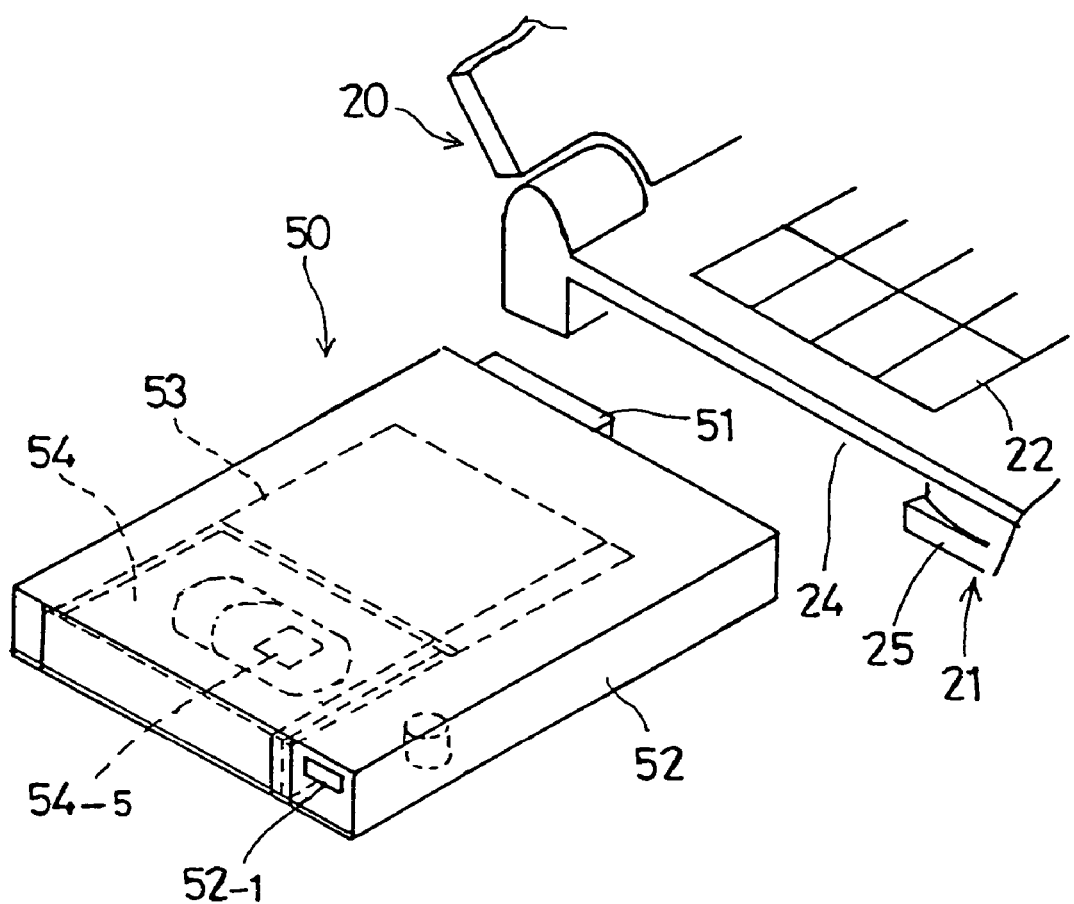
FIG. 3 is an illustrative drawing showing a fingerprint-reading extension device of a first embodiment of the present invention in relation with an extension bay of a notebook personal computer.
Figure 4:
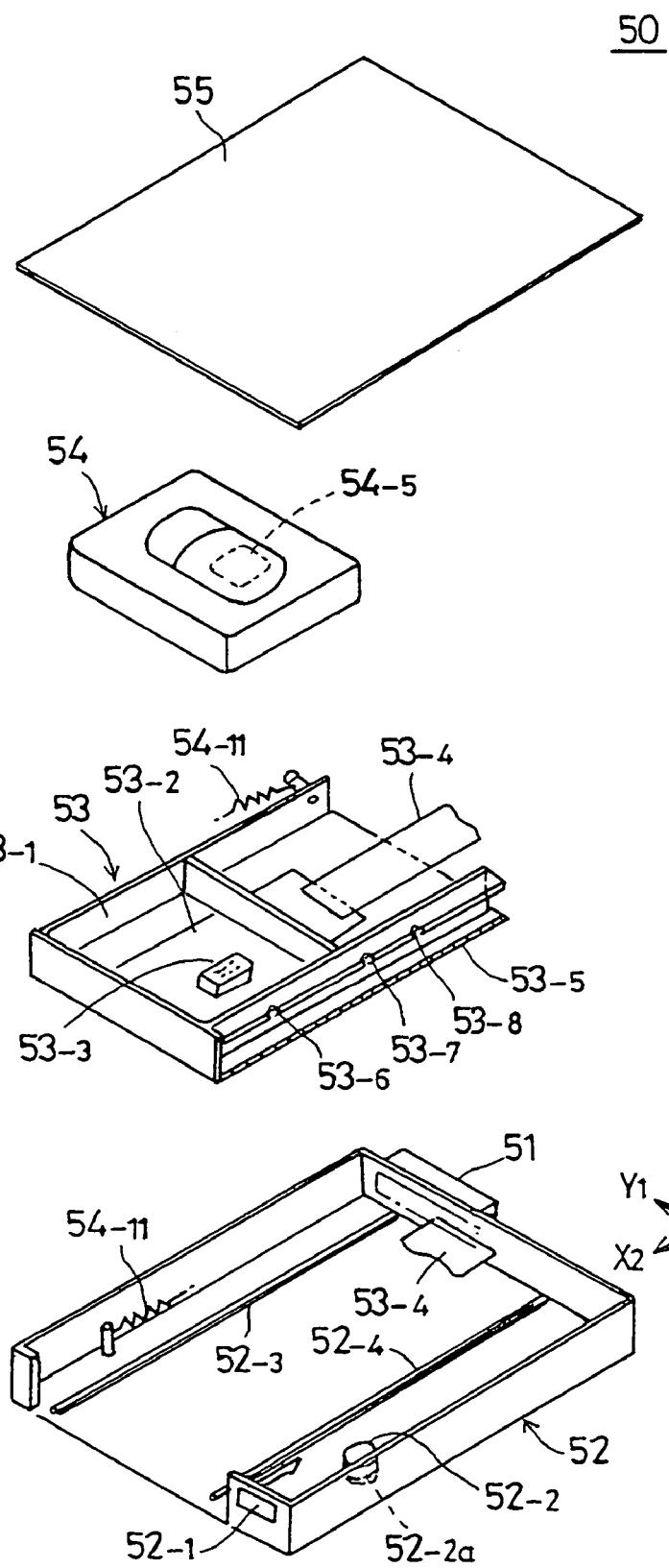
FIG. 4 is an exploded view of the fingerprint-reading extension device of FIG. 3.
Figure 5:
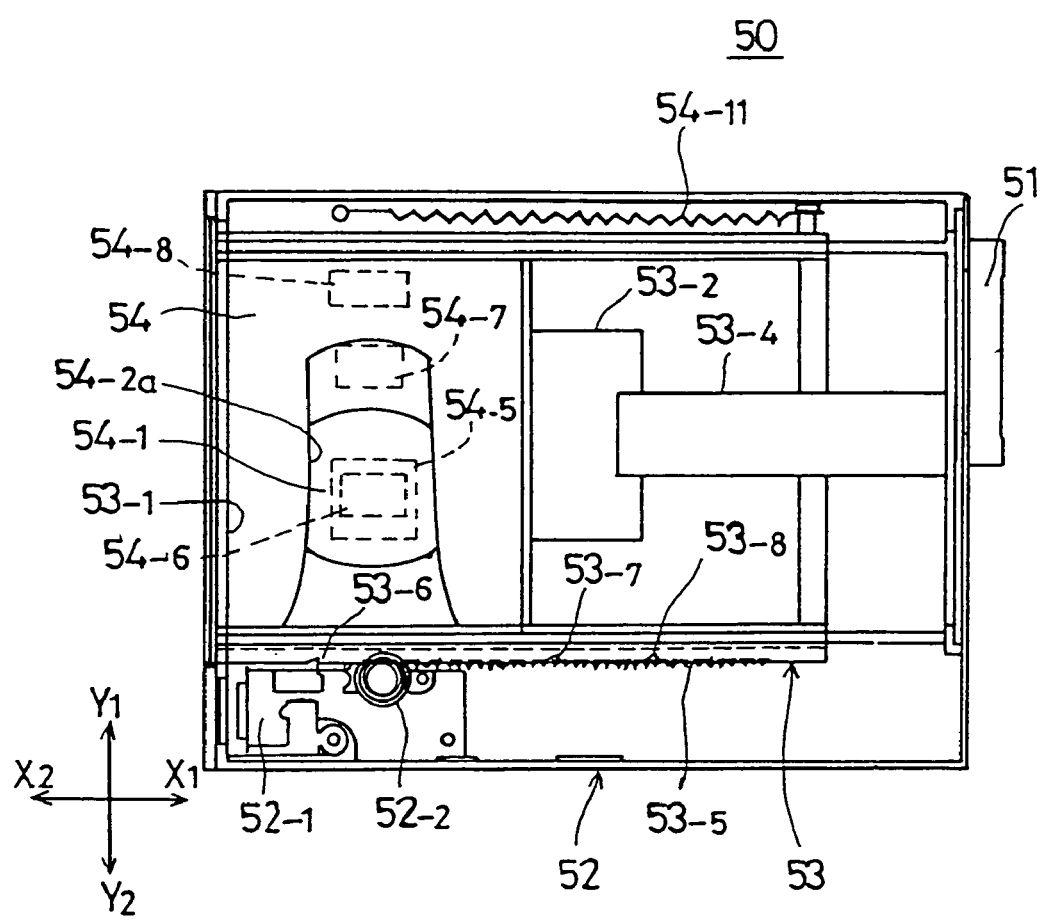
FIG. 5 is a plan view of the fingerprint-reading extension device with a cover thereof removed.

FIG. 3 is an illustrative drawing showing the fingerprint-reading extension device 50 of the first embodiment in relation with the extension bay of a notebook personal computer. FIG. 4 is an exploded view of the fingerprint-reading extension device 50. FIG. 5 is a plan view of the fingerprint-reading extension device with a cover thereof removed.

As shown in FIG. 3 through FIG. 5, the fingerprint-reading extension device 50 includes a housing 52, a tray 53 provided movably in the direction X1–X2 inside the housing 52, a fingerprint-reading unit 54 exemplifying an identification-information-acquisition unit, and a cover 55 covering the tray 53 and fixed to the housing 52. In FIG. 3, fingerprints are used as an example of biological information serving as an example of identification information.

The housing 52 is a box shape, and has a connector 51 attached to the back side thereof. Further, the housing 52 includes an operation button mechanism 52-1 and a damper 52-2.

The tray 53 is movable in the direction X1–X2 as it is guided through guide rails 52-3 and 52-4. The tray 53 sticks out from the housing 52 toward the direction X2 as it is slid out, and can maintain either one of the two sliding positions. The tray 53 has a fingerprint-detection-unit container unit 53-1 that is a box shape having a size suitable for accommodating the fingerprint-reading unit 54. Inside the fingerprint-detection-unit container unit 53-1 is provided a connector 53-3, which is implemented on a print circuit board 53-2.

The print circuit board 53-2 is connected to the connector 51 via a flexible cable 53-4 having a sufficient extension. The tray 53 has a rack 53-5 formed on a side facing the direction Y2 and extending in the direction X1–X2. Further, the tray 53 has a first notch 53-6, a second notch 53-7, and a third notch 53-8 formed at different positions along the direction X1–X2 on the side facing the direction Y2.

The rack 53-5 engages gears 52-2a of the damper 52-2.

The operation button mechanism 52-1 exemplifying an operation unit selectively engages one of the first notch 53-6, the second notch 53-7, and the third notch 53-8. When the button is pressed while the mechanism is engaged in a notch, the operation button mechanism 52-1 disengages from the notch.

Figure 10:
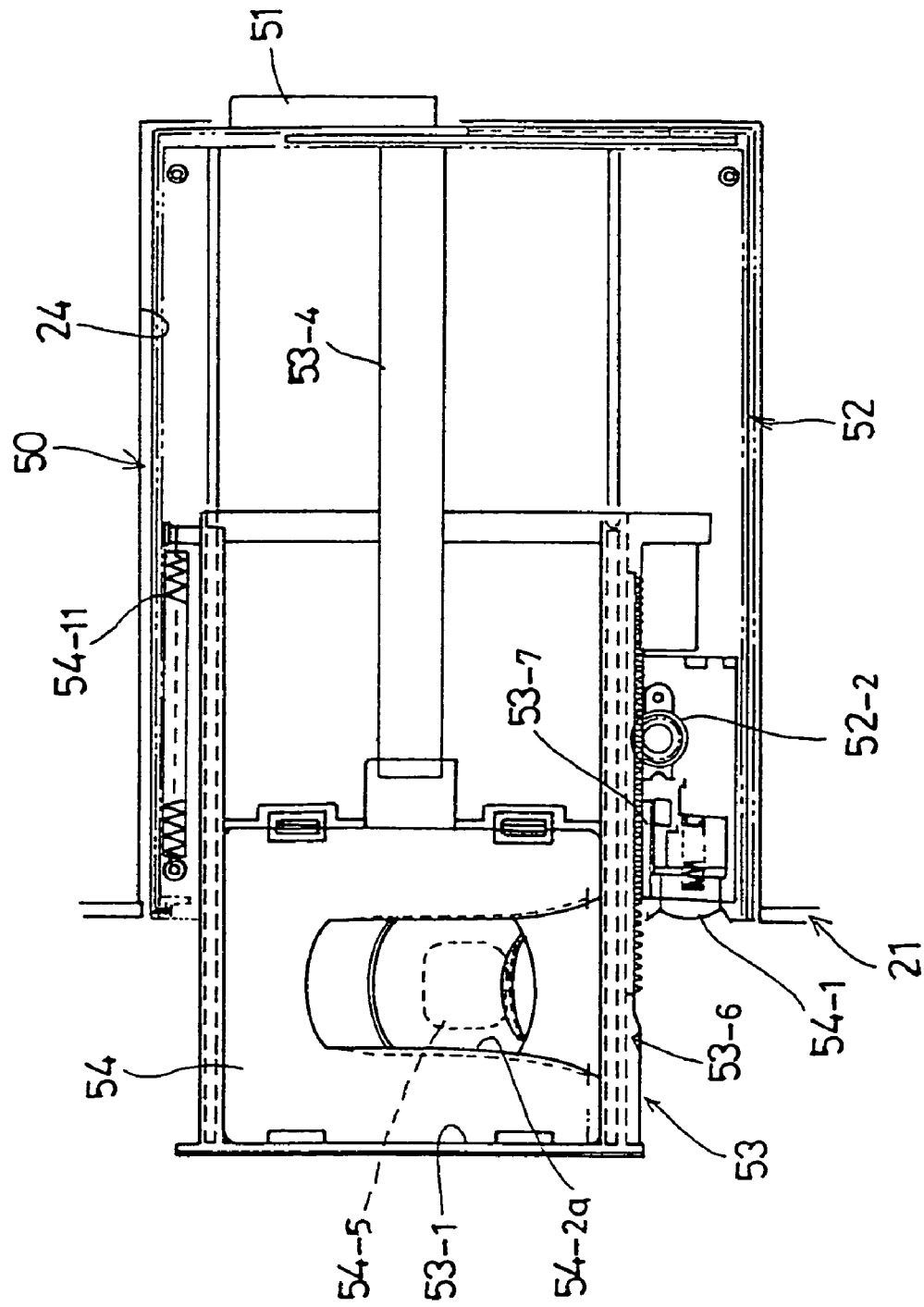
FIG. 10 is a plan view of the fingerprint-reading unit for showing the way the fingerprint-reading unit is partly slid out from the notebook personal computer.

The operation button mechanism 52-1 and the three notches 53-6 through 53-8 are spatially arranged as follows. When the operation button mechanism 52-1 engages the first notch 53-6, the entirety of the tray 53 is encased in the housing 52 as shown in FIG. 5. When the operation button mechanism 52-1 engages the second notch 53-7, a portion of the tray 53 sticks out from the housing 52 so as to barely show a full view of an opening 54-2a of the fingerprint-reading unit 54, as shown in FIG. 10. When the operation button mechanism 52-1 engages the third notch 53-8, the fingerprint-reading unit 54 is fully exposed to the outside of the housing 52.

Figure 6A:
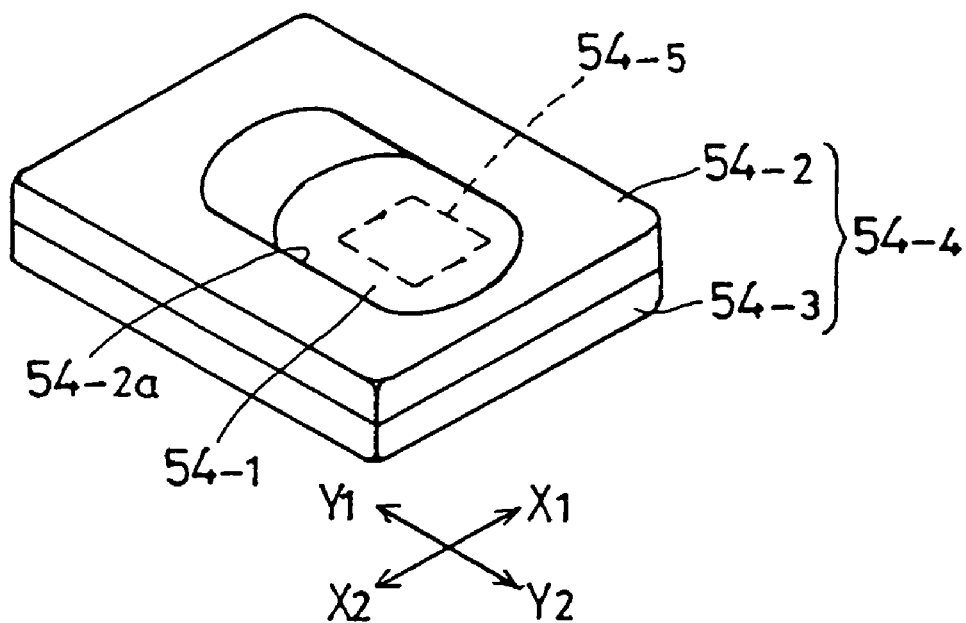
FIGS. 6A and 6B are illustrative drawings showing a fingerprint-reading unit of FIG. 4.

As shown in FIG. 6A as well as in FIGS. 7A through 7C, The fingerprint-reading unit 54 exemplifying an identification-information-acquisition unit includes a capacitance-based fingerprint sensor 54-5 (which is an example of an identification-information-acquisition means) stored in a box 54-4, which is comprised of an upper half 54-2 and a lower half 54-3. The capacitance-based fingerprint sensor 54-5 is positioned in the upper half 54-2. In the lower half 54-3, a left-hand-side connector 54-6, a right-hand-side connector 54-7, and a cable connector 54-8 are implemented on a print circuit board 54-9. The capacitance-based fingerprint sensor 54-5 faces the opening 54-2a formed in the upper half 54-2 where the opening 54-2a is usually closed by a shutter 54-1. When the shutter 54-1 is slid toward the direction Y1, the capacitance-based fingerprint sensor 54-5 is exposed through the opening 54-2a. The shutter 54-1 is provided on an inner wall of the upper half 54-2, and is shut automatically by a spring 54-1a.

The capacitance-based fingerprint sensor 54-5 may be FPS100 Solid-State Fingerprint Sensor manufactured by Veridicom.

As shown in FIG. 7C, the connectors 54-6, 54-7, and 54-8 are positioned along a line 54-9 extending in the direction Y1–Y2 passing through a center O of the fingerprint-reading unit 54. The connectors 54-6 and 54-7 are identical, and are situated at symmetrical positions relative to the center O. The connectors 54-6 and 54-7 are exposed through respective openings 54-3b and 54-3c formed in a bottom plate 54-3a. The connector 54-8 is positioned on a backside of the fingerprint-reading unit 54, and is exposed through an opening 54-3e formed in a side panel 54-3d of the lower half 54-3.

The fingerprint-reading extension device 50 is such that the fingerprint-reading unit 54 is contained in the fingerprint-detection-unit container unit 53-1 with the left-hand-side connector 54-6 thereof connected to the connector 53-3, and such that the tray 53 is slid toward the direction X1 as far as it can go so as to have the fingerprint-reading unit 54 fully encased in the fingerprint-reading extension device 50. The tray 53 is urged toward the direction X2 by a spring coil 54-11 when the operation button mechanism 52-1 engages the first notch 53-6 to restrict movement in the direction X2. The fingerprint-reading unit 54 is removable from the fingerprint-detection-unit container unit 53-1.

In the following, relation between the fingerprint-reading unit 54 and the notebook personal computer 20 will be described.

As shown in FIG. 8, the fingerprint-reading unit 54 includes a fingerprint input unit 60. The notebook personal computer 20 includes a fingerprint-feature-extraction unit 62, a fingerprint-registration unit 63, and a fingerprint matching unit 64. The fingerprint-feature-extraction unit 62 extracts fingerprint features from image data supplied form the fingerprint input-unit 60. The fingerprint-registration unit 63 stores therein registered fingerprint data of an index finger of a user's left hand. The fingerprint matching unit 64 matches fingerprint data supplied from the fingerprint-feature-extraction unit 62 with the fingerprint data of the fingerprint-registration unit 63. In this configuration, the fingerprint-reading unit 54 reads fingerprints, which is all that it does. Then, the notebook personal computer 20 attends to data processing to check identification.

In what follows, usage of the fingerprint-reading extension device 50 will be described.

1) Carrying of Notebook Personal Computer To Outside Office

When a user takes the notebook personal computer 20 with him/her to outside the office, the fingerprint-reading extension device 50 is inserted into the extension bay 24 of the computer body 21, and the connector 51 is connected to the connector provided on the back wall of the extension bay 24.

Figure 1B:
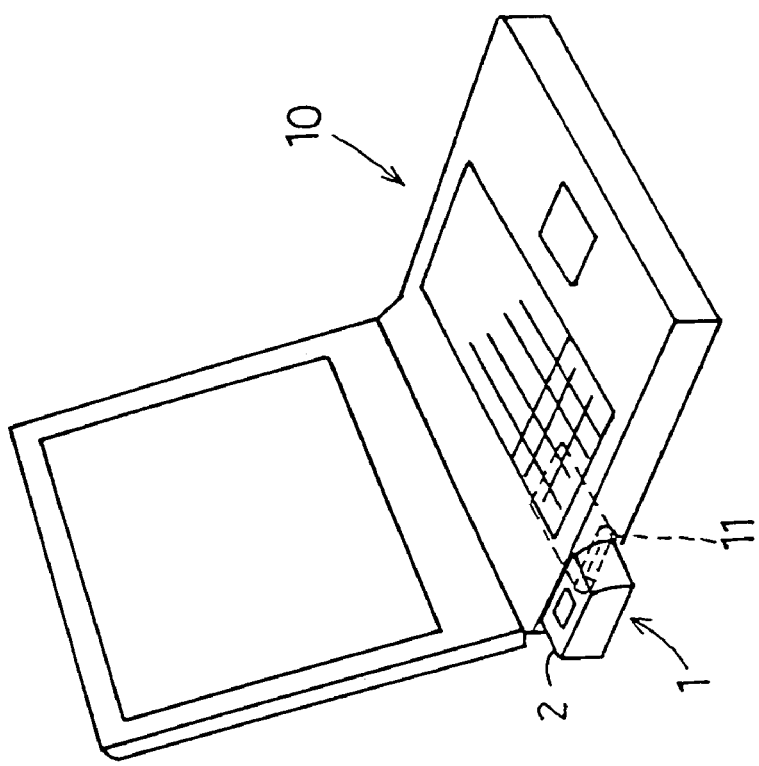
FIGS. 1A and 1B show illustrative drawings showing a related-art card-type fingerprint identification device.
Figure 1A:
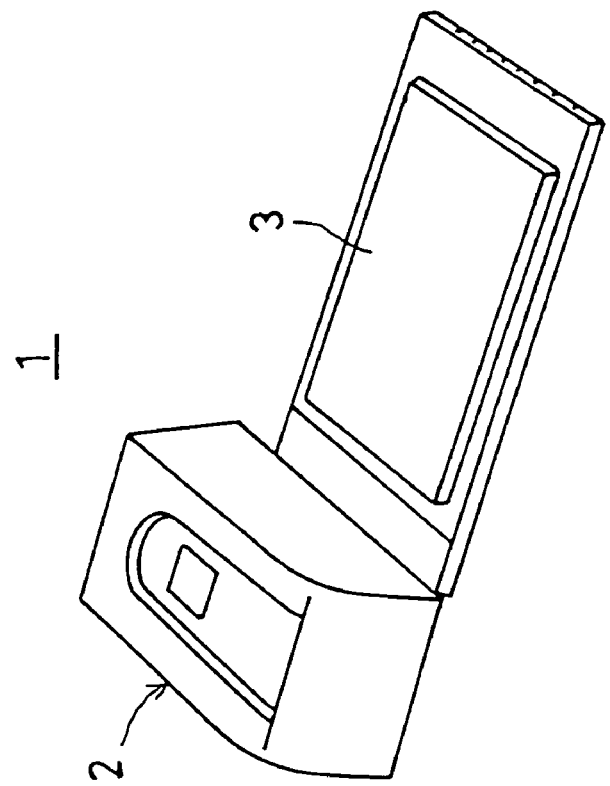

In this arrangement, the fingerprint-reading extension device 50 is encased in the computer body 21, so that the fingerprint-reading unit 54 is now an integral part of the notebook personal computer 20. All that needs to be done is to carry the notebook personal computer 20, with no need to carry a separate fingerprint-reading unit. This provides better portability compared with the configuration of FIG. 1 in which the card-type fingerprint identification device 1 has to be carried separately from the notebook personal computer 10.

When the fingerprint-reading extension device 50 is mounted in the extension bay 24 of the computer body 21, the fingerprint-reading unit 54 is electrically connected to the CPU 61 inside the computer body 21 via the connector 53-3, the flexible cable 53-4, and the connector 51.

2) Use of Notebook Personal Computer Outside Office.

When the notebook personal computer 20 is to be operated outside office, the operation button mechanism 52-1 needs to be pressed first.

Figure 9:
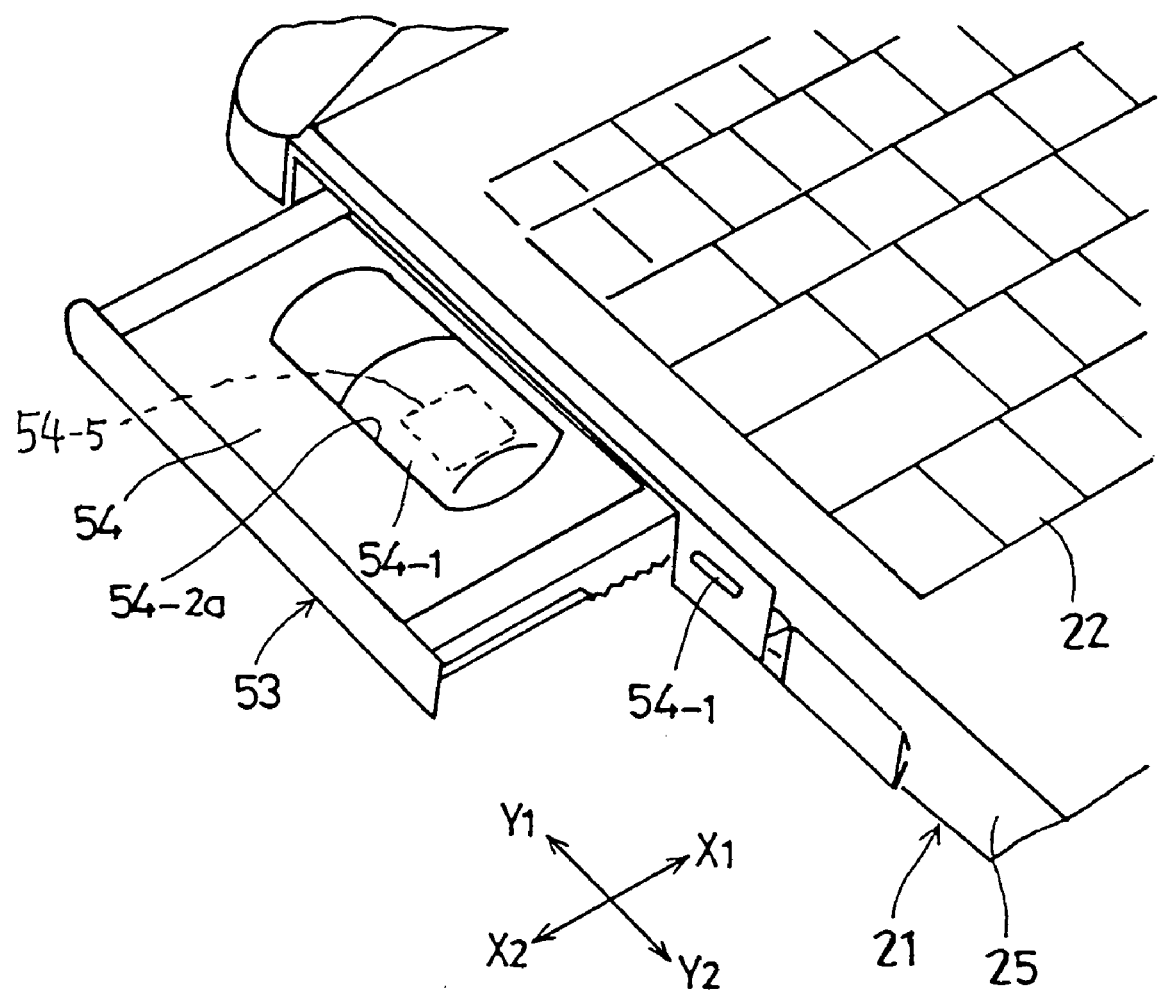
FIG. 9 is an illustrative drawing showing the way the fingerprint-reading unit is partly slid out from the notebook personal computer.

In response, the first notch 53-6 is disengaged, so that the tray 53 moves toward the direction X2 by force of the spring coil 54-11, resulting in the tray 53 sticking out from the side of the computer body 21. The tray 53 stops when the operation button mechanism 52-1 engages the second notch 53-7. As a result, as shown in FIG. 9 and FIG. 10, the opening 54-2a of the fingerprint-reading unit 54 is exposed outside the extension bay 24, allowing the shutter 54-1 to be open manually.

A user opens the shutter 54-1 by sliding it in the direction Y1 with the left-hand index finger, and places the index finger on the capacitance-based fingerprint sensor 54-5.

The capacitance-based fingerprint sensor 54-5 reads the fingerprint of the index finger. The fingerprint data is then sent to the computer body 21 via the connector 53-3, the flexible cable 53-4, and the connector 51. The computer body 21 extracts features of the fingerprint, and matches the extracted fingerprint features with registered fingerprint data so as to check identification.

If the user is authorized, the notebook personal computer 20 is activated. If the user is not authorized, the user cannot activate the notebook personal computer 20 even if he/she tries to do so. Alternatively, the notebook personal computer 20 may be activated, but the operation system does not run. This ensures security.

After the notebook personal computer 20 is activated, the tray 53 is slid in the direction X1 to be stored inside the notebook personal computer 20. In this stored position, the fingerprint-reading unit 54 does not encumber handling of the notebook personal computer 20.

When the shutter 54-1 is opened by an index finger of a left hand, the fingerprint-reading unit 54 is partly covered by the cover 55 so as to expose barely the opening 54-2a and cover the remaining part of the fingerprint-reading unit 54 on the direction-X1 side. This insures that the fingerprint-reading unit 54 pops out from the fingerprint-detection-unit container unit 53-1.

3) Use of Notebook Personal Computer on Office Desk

Figure 12:
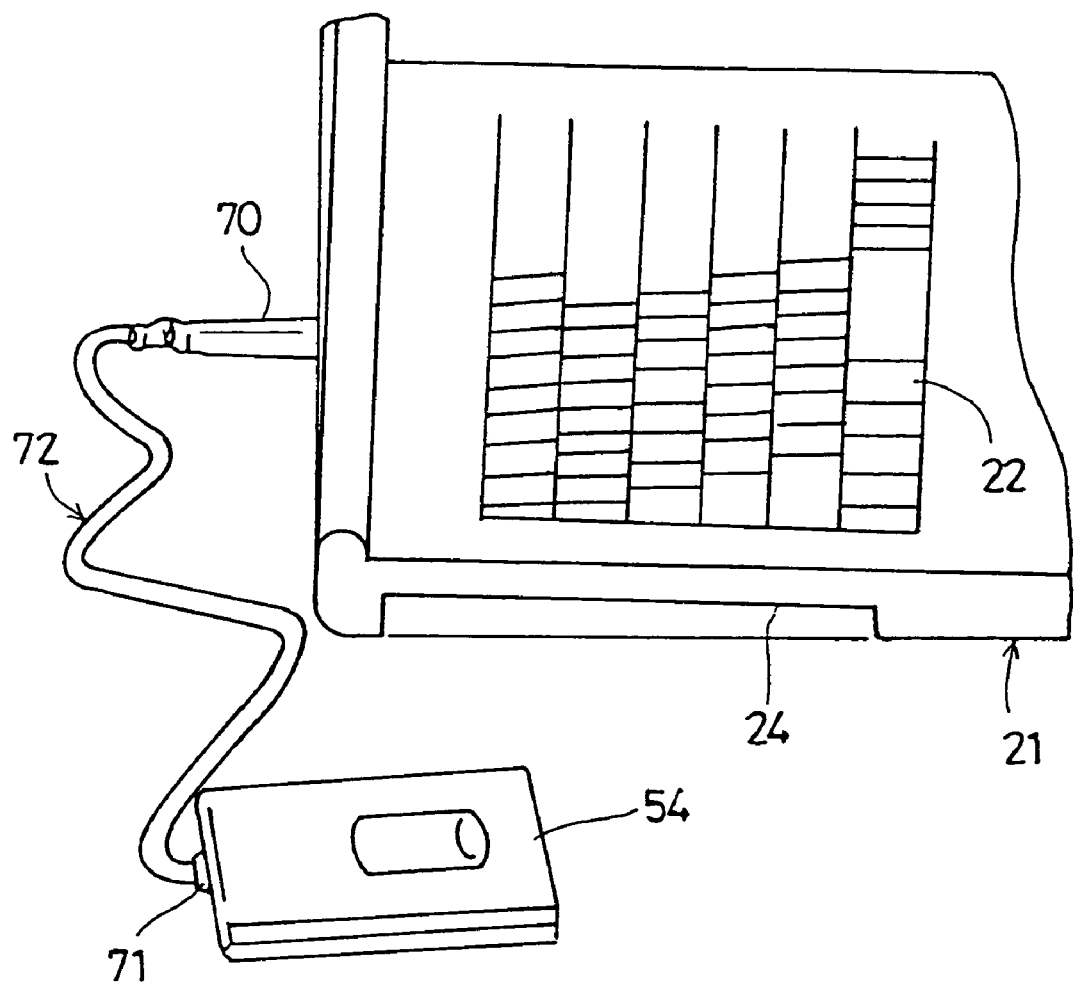
FIG. 12 is an illustrative drawing showing the fingerprint-reading unit connected to the notebook personal computer via a cable.

When the notebook personal computer 20 is used on the user's office desk, it would be cumbersome to operate the fingerprint-reading unit 54 to have it stick out each time the user starts using the notebook personal computer 20. As shown in FIG. 12, therefore, the fingerprint-reading unit 54 is kept in a disengaged position.

Figure 11:
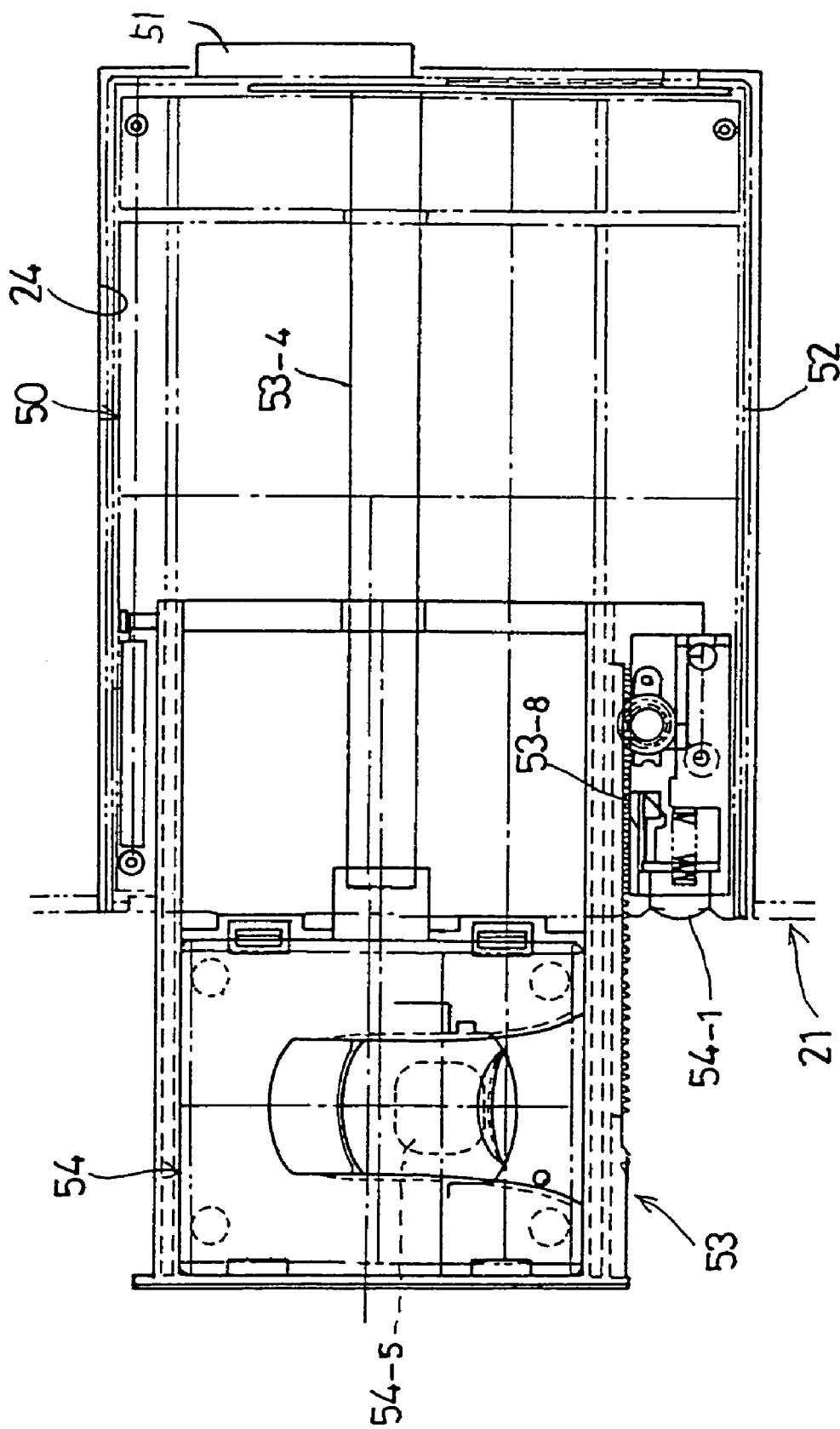
FIG. 11 is a plan view of the fingerprint-reading unit for showing the way the fingerprint-reading unit is fully slid out from the notebook personal computer.

While the fingerprint-reading extension device 50 is encased in the extension bay 24 of the notebook personal computer 20, or while the fingerprint-reading extension device 50 is placed outside the extension bay 24 of the notebook personal computer 20, a push of the operation button mechanism 52-1 results in a condition as shown in FIG. 9 or FIG. 10. If the operation button mechanism 52-1 is pressed once again, the engagement of the second notch 53-7 is lost, so that the tray 53 is slid further out in the direction X2 by the spring coil 54-11, and stops when the operation button mechanism 52-1 engages the third notch 53-8. This condition is shown in FIG. 11. As shown in FIG. 11, the entirety of the fingerprint-reading unit 54 is exposed outside the extension bay 24, so that the fingerprint-reading unit 54 can be taken out of the fingerprint-detection-unit container unit 53-1.

The fingerprint-reading unit 54 is taken out of the fingerprint-detection-unit container unit 53-1, and the tray 53 is slid in the direction X1 to be stored inside the housing 52. It should be noted that, by lifting up the fingerprint-reading unit 54 in the direction Z1, the connector 54-6 is disconnected from the connector 53-3, thereby allowing the fingerprint-reading unit 54 to be removed from the fingerprint-detection-unit container unit 53-1.

Then, as shown in FIG. 12, a cord 72 having connectors 70 and 71 at respective ends thereof is used. The connector 70 is of a USB (universal serial bus) type, which is a general-purpose interface. The connector 71 is connected to the connector 54-8 of the fingerprint-reading unit 54, and the USB connector 70 is connected to a connector socket provided at the back panel of the computer body 21. By the use of the cord 72, the user can operate the fingerprint-reading unit 54 together with the computer.

In the following, the reason why the right-hand-side connector 54-7 is provided on the lower surface of the fingerprint-reading unit 54 in addition to the connector 54-6 will be described.

When the extension bay 24 is provided on the right-hand side of the computer body 21 (i.e., the side towards the direction X1) to receive a fingerprint-reading unit therein, the fingerprint-reading unit needs to stick out from the right-hand-side panel of the computer body 21. In order for the fingerprint-reading unit 54 to be used in this configuration, the fingerprint-reading unit 54 needs to have the right-hand-side connector 54-7. It should be noted that algorithms for identifying fingerprints are well known in the art, and one that is disclosed in Japanese Patent Laid-open Application No. 10-312459 may be employed in the present invention.

Heretofore, a description of the first embodiment has been given. Although identification checks in the first embodiment are made by employing fingerprints as an example of biological information, the present invention is not limited to use of fingerprints. Rather than relying on fingerprints, other biological information such as voice (voice patterns), retinal patterns, handwritings, or facial features may be detected for identification purposes. When voice is used as identification information, the fingerprint sensor 54-5 of the unit 54 of the extension device 50 as shown in FIG. 3 through FIG. 11 may be replaced by a voice-input means (such as a microphone). In this case, the shutter 54-1 is unnecessary. The fingerprint input unit 60 shown in FIG. 8 is then replaced by a voice-inputting unit, which transmits voice data to the notebook personal computer 20. In FIG. 8, the fingerprint-feature-extraction unit 62, the fingerprint-registration unit 63, and the fingerprint matching unit 64 are respectively replaced by the voice-pattern-feature-extraction unit 62, the voice-pattern-registration unit 63, and the voice-pattern matching unit 64. Further, the first embodiment of this variation may be configured such that the detection unit 54 (microphone) is detachable (FIG. 4), such that the right-hand-side connector 54-7 and the left-hand-side connector 54-6 are provided (FIG. 6), such that the detection unit 54 (microphone) can partially stick out from the information processing device (FIG. 9) or entirely stick out from the information processing device (FIG. 11), or such that the detection unit 54 (microphone) is connectable by a cable (FIG. 12), thereby adopting various configurations of the first embodiment described above.

When the retinal pattern is used as identification information, the fingerprint sensor 54-5 of the unit 54 of the extension device 50 as shown in FIG. 3 through FIG. 11 may be replaced by a retinal-pattern-input means (such as a CCD camera serving as an image-detection unit). In this case, the shutter 54-1 may be provided if necessary. The fingerprint input unit 60 shown in FIG. 8 is then replaced by a retinal-pattern-inputting unit, which transmits retinal-pattern data to the notebook personal computer 20. In FIG. 8, the fingerprint-feature-extraction unit 62, the fingerprint-registration unit 63, and the fingerprint matching unit 64 are respectively replaced by the retinal-pattern-feature-extraction unit 62, the retinal-pattern-registration unit 63, and the retinal-pattern matching unit 64. Further, the first embodiment of this variation may be configured such that the detection unit 54 (an image-detection unit such as a CCD camera) is detachable (FIG. 4), such that the right-hand-side connector 54-7 and the left-hand-side connector 54-6 are provided (FIG. 6), such that the detection unit 54 (an image-detection unit such as a CCD camera) can partially stick out from the information processing device (FIG. 9) or entirely stick out from the information processing device (FIG. 11), or such that the detection unit 54 (an image-detection unit such as a CCD camera) is connectable by a cable (FIG. 12), thereby adopting various configurations of the first embodiment described above.

When the handwriting is used as identification information, the fingerprint sensor 54-5 of the unit 54 of the extension device 50 as shown in FIG. 3 through FIG. 11 may be replaced by a touch-inputting means or a handwriting-inputting means (which is comprised of a touch panel such as a digitizer or an input-tablet plate alone or a combination of these and a pen-inputting means or stylus). In this case, the shutter 54-1 may be provided as necessary. The fingerprint input unit 60 shown in FIG. 8 is then replaced by a touch-inputting unit or a handwriting-inputting unit, which transmits handwriting-pattern data to the notebook personal computer 20. In FIG. 8, the fingerprint-feature-extraction unit 62, the fingerprint-registration unit 63, and the fingerprint matching unit 64 are respectively replaced by the handwriting-pattern-feature-extraction unit 62, the handwriting-pattern-registration unit 63, and the handwriting-pattern matching unit 64. Further, the first embodiment of this variation may be configured such that the detection unit 54 (a touch-inputting means or a handwriting-inputting means) is detachable (FIG. 4), such that the right-hand-side connector 54-7 and the left-hand-side connector 54-6 are provided (FIG. 6), such that the detection unit 54 (a touch-inputting means or a handwriting-inputting means) can partially stick out from the information processing device (FIG. 9) or entirely stick out from the information processing device (FIG. 11), or such that the detection unit 54.(a touch-inputting means or a handwriting-inputting means) is connectable by a cable (FIG. 12), thereby adopting various configurations of the first embodiment described above.

When facial features are used as identification information, the fingerprint sensor 54-5 of the unit 54 of the extension device 50 as shown in FIG. 3 through FIG. 11 may be replaced by an image-detection means (such as a CCD camera). In this case, the shutter 54-1 may be provided if necessary. The fingerprint input unit 60 shown in FIG. 8 is then replaced by an image-detection unit, which transmits detected-image data to the notebook personal computer 20. In FIG. 8, the fingerprint-feature-extraction unit 62, the fingerprint-registration unit 63, and the fingerprint matching unit 64 are respectively replaced by the facial-feature-extraction unit 62, the facial-pattern-registration unit 63, and the facial-pattern matching unit 64. Further, the first embodiment of this variation may be configured such that the detection unit 54 (an image-detection unit such as a CCD camera) is detachable (FIG. 4), such that the right-hand-side connector 54-7 and the left-hand-side connector 54-6 are provided (FIG. 6), such that the detection unit 54 (an image-detection unit such as a CCD camera) can partially stick out from the information processing device (FIG. 9) or entirely stick out from the information processing device (FIG. 11), or such that the detection unit 54 (an image-detection unit such as a CCD camera) is connectable by a cable (FIG. 12), thereby adopting various configurations of the first embodiment described above.

Moreover, the present invention is not limited to use of biological information for the purpose of identification check. As will be shown in FIG. 23, FIG. 25, and FIG. 27, which will be described later, identification information may be obtained from ID cards such as IC cards or magnetic cards, or may be obtained from a user when the user uses buttons to enter a password or an. ID number. In this case, the detection unit 54 shown in FIG. 3 through FIG. 5 may be replaced by an IC-card reader, a magnetic-card reader, or buttons such as on a keypad. Alternatively, such a reader or buttons may be provided on the detachable detection unit 54. By the same token, the first embodiment of this variation may be configured such that the right-hand-side connector 54-7 and the left-hand-side connector 54-6 are provided (FIG. 6), such that the detection unit 54 (an IC-card reader, a magnetic-card reader, or buttons such as on a keypad) can partially stick out from the information processing device (FIG. 9) or entirely stick out from the information processing device (FIG. 11), or-such that the detection unit 54 (an IC-card reader, a magnetic-card reader, or buttons such as on a keypad) is connectable by a cable (FIG. 12), thereby adopting various configurations of the first embodiment described above.

Second Embodiment

Figure 13:
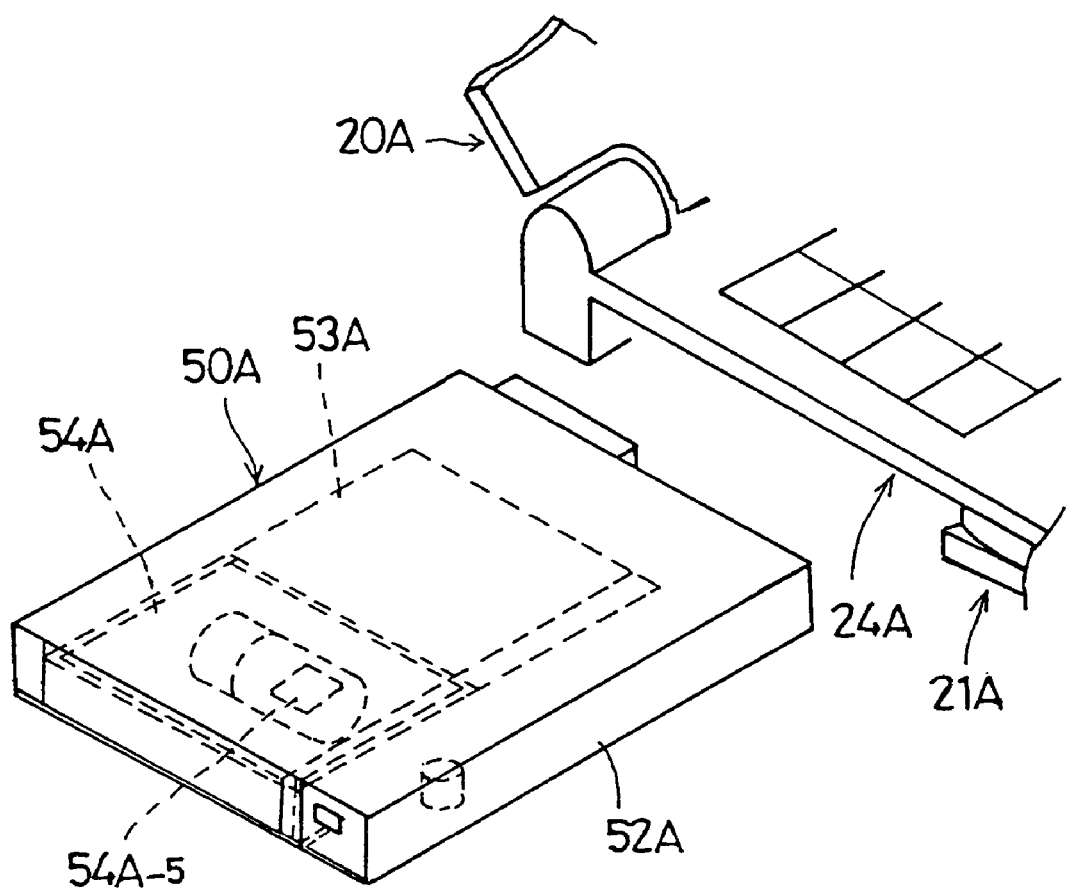
FIG. 13 is an illustrative drawing showing a fingerprint-reading extension device according to a second embodiment of the present invention.

FIG. 13 is an illustrative drawing showing an extension device having an identification-information-acquisition function or providing a security function (for example, a fingerprint-reading extension device 50A) according to a second embodiment of the present invention. The fingerprint-reading extension device 50A has the same configuration as the fingerprint-reading extension device 50 shown in FIG. 4, and is provided with a fingerprint-reading unit 54A exemplifying an identification-information-acquisition unit in place of the fingerprint-reading unit 54. In FIG. 13, fingerprints are used as an example of biological information serving as an example of identification information.

Figure 14:
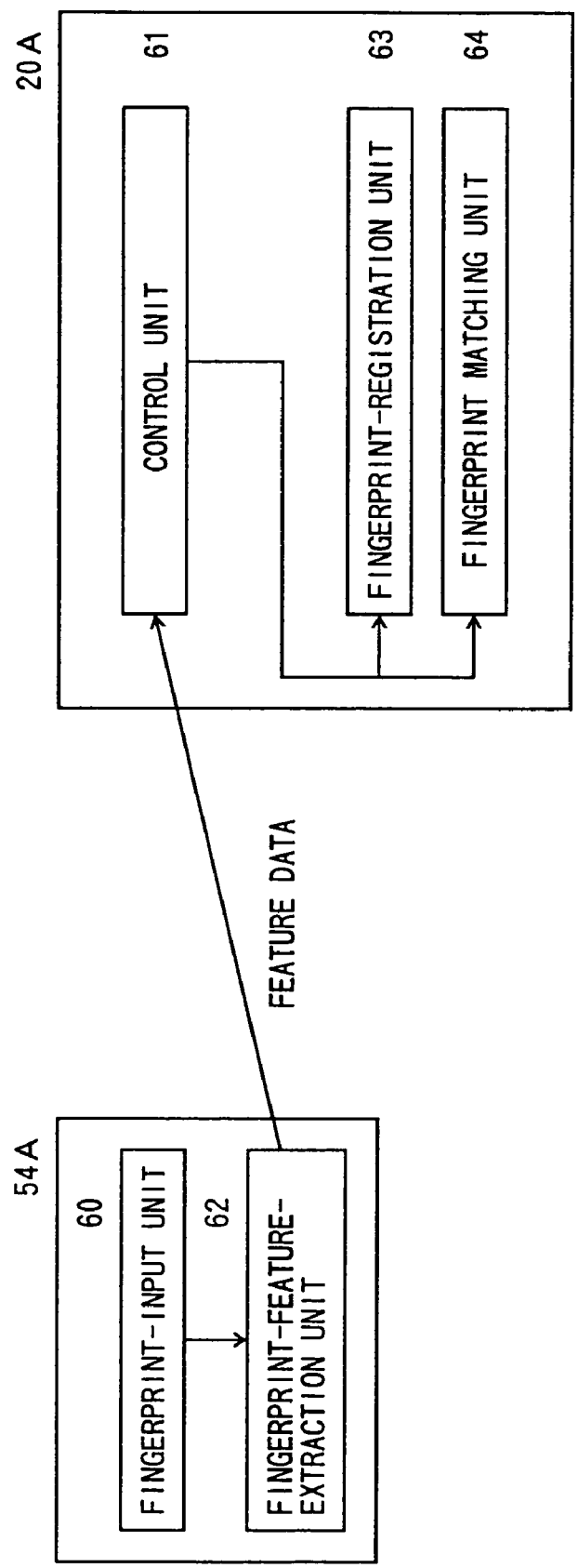
FIG. 14 is a block diagram showing functions of the fingerprint-reading unit of FIG. 13 and a notebook personal computer.

A comparison of FIG. 14 with FIG. 8 reveals that the fingerprint-reading unit 54A is provided with the fingerprint-feature-extraction unit 62 in addition to the fingerprint input unit 60, and the notebook personal computer 20A includes the control unit, the fingerprint-registration unit 63, and the fingerprint matching unit 64. The fingerprint-reading unit 54A reads fingerprints, and extracts fingerprint features from the read fingerprint data. The fingerprint-reading unit 54A supplies the fingerprint feature data to the notebook personal computer 20A, and the notebook personal computer 20A carries out a user identification process.

Third Embodiment

Figure 15:
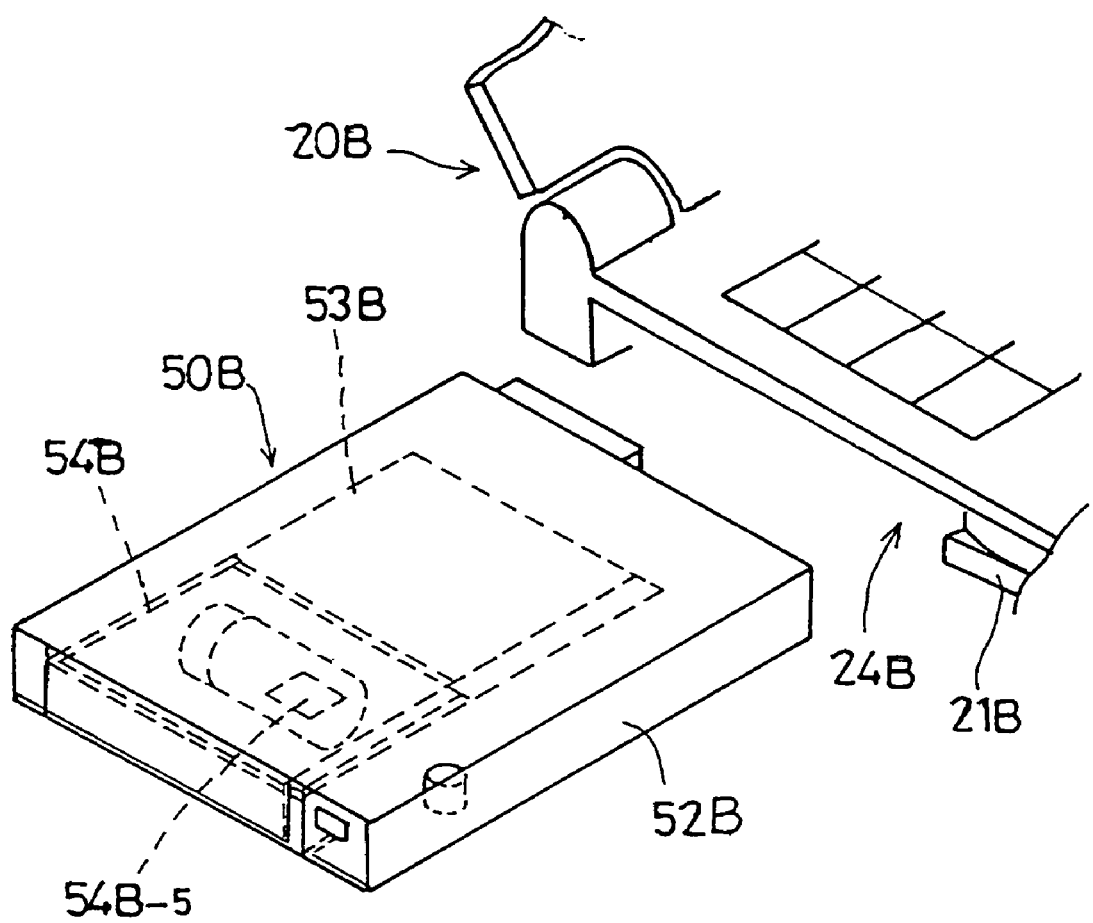
FIG. 15 is an illustrative drawing showing a fingerprint-reading extension device according to a third embodiment of the present invention

FIG. 15 is an illustrative drawing showing an extension device having an identification-information-acquisition function or providing a security function (for example, a fingerprint-reading extension device 50B) according to a third embodiment of the present invention. The fingerprint-reading extension device 50B has the same configuration as the fingerprint-reading extension device 50 shown in FIG. 4, and is provided with a fingerprint-reading unit 54B in place of the fingerprint-reading unit 54. In FIG. 15, fingerprints are used as an example of biological information serving as an example of identification information.

Figure 16:
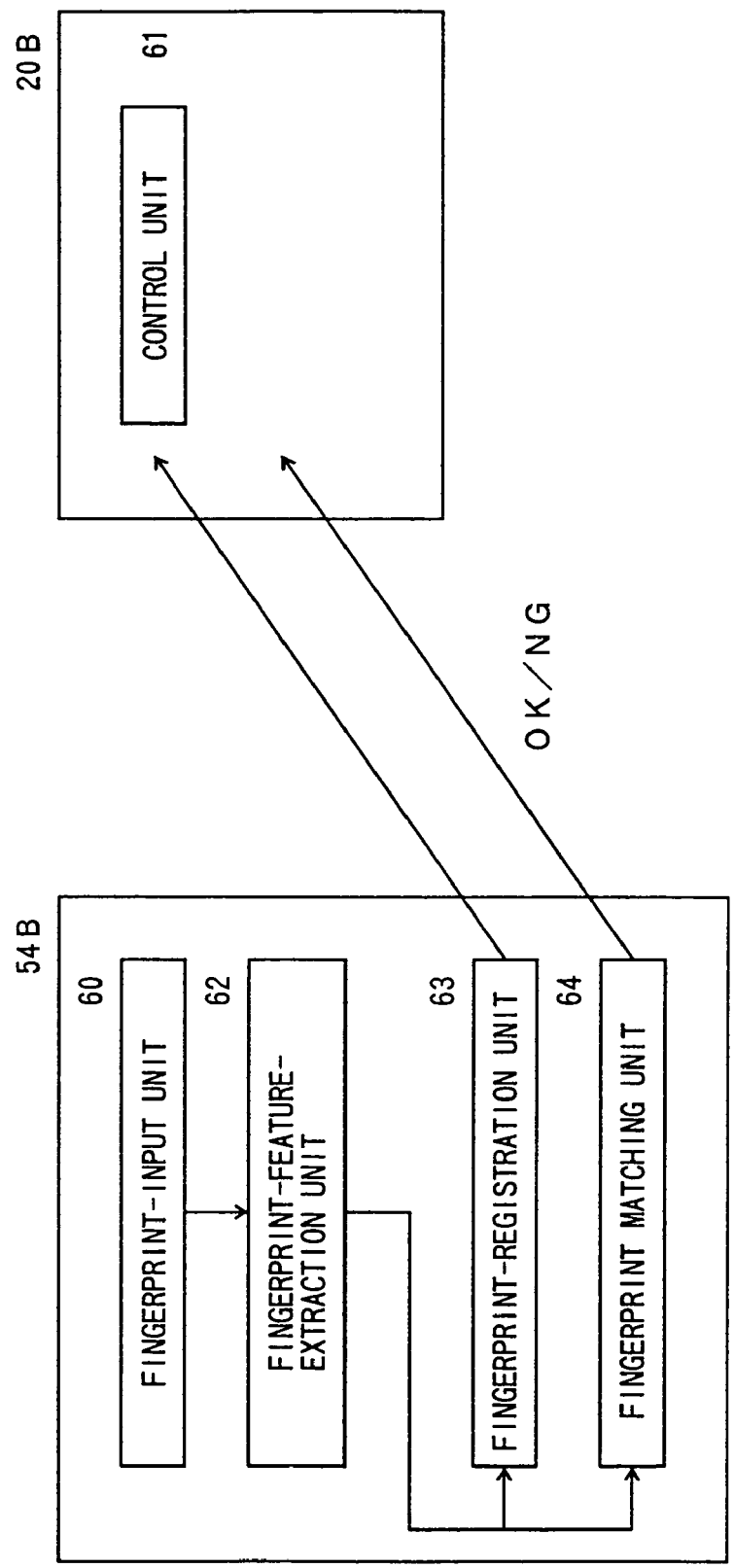
FIG. 16 is a block diagram showing functions of the fingerprint-reading unit of FIG. 15 and a notebook personal computer.

A comparison of FIG. 16 with FIG. 8 reveals that the fingerprint-reading unit 54B is provided with the fingerprint-feature-extraction unit 62, the fingerprint-registration unit 63, and the fingerprint matching unit 64 in addition to the fingerprint input unit 60. In this configuration, therefore, the fingerprint-reading unit 54B attends to all the processing from detecting fingerprints, extracting fingerprint features from the detected fingerprints, matching the extracted features with registered fingerprint data, to checking user identification. The fingerprint-reading unit 54A then supplies the identification-check results to the control unit 61 of the notebook personal computer 20B.

Heretofore, a description of the second and third embodiments has been given. Although identification checks in the second and third embodiments are made by employing fingerprints as an example of biological information, the present invention is not limited to use of fingerprints. Rather than relying on fingerprints, other biological information such as voice (voice patterns), retinal patterns, handwritings, or facial features may be detected for identification purposes. When voice is used as identification information, the fingerprint sensor 54A-5 or 54B-5 of the unit 54A or 54B of the extension device 50A or 50B as shown in FIG. 13 or FIG. 15 may be replaced by a voice-input means (such as a microphone). In this case, the shutter 54A-1 or 54B-1 is unnecessary. The fingerprint input unit 60 shown in FIG. 14 or 16 is then replaced by a voice-inputting unit, which transmits voice data to the notebook personal computer 20A or 20B. In FIG. 14 or 16, the fingerprint-feature-extraction unit 62, the fingerprint-registration unit 63, and the fingerprint matching unit 64 are respectively replaced by the voice-pattern-feature-extraction unit 62, the voice-pattern-registration unit 63, and the voice-pattern matching unit 64. Further, the second and third embodiments of this variation may be configured such that the detection unit 54A or 54B (microphone) is detachable. (FIG. 4, 13, or 15), such that the right-hand-side connector 54-7 and the left-hand-side connector 54-6 are provided (FIG. 6), such that the detection unit 54A or 54B (microphone) can partially stick out from the information processing device (FIG. 9) or entirely stick out from the information processing device (FIG. 11), or such that the detection unit 54A or 54B (microphone) is connectable by a cable (FIG. 12), thereby adopting various configurations of the first embodiment previously described.

When the retinal pattern is used as identification information, the fingerprint sensor 54A-5 or 54B-5 of the unit 54A or 54B of the extension device 50A or 50B as shown in FIG. 13 or FIG. 15 may be replaced by a retinal-pattern-input means (such as a CCD camera serving as an image-detection unit). In this case, the shutter 54A-1 or 54B-1 may be provided if necessary. The fingerprint input unit 60 shown in FIG. 14 or 16 is then replaced by a retinal-pattern-inputting unit, which transmits retinal-pattern data to the notebook personal computer 20A or 20B. In FIG. 14 or FIG. 16, the fingerprint-feature-extraction unit 62, the fingerprint-registration unit 63, and the fingerprint matching unit 64 are respectively replaced by the retinal-pattern-feature-extraction unit 62, the retinal-pattern-registration unit 63, and the retinal-pattern matching unit 64. Further, the second and third embodiments of this variation may be configured such that the detection unit 54A or 54B (an image-detection unit such as a CCD camera) is detachable (FIG. 4, 13, or 15), such that the right-hand-side connector 54-7 and the left-hand-side connector 54-6 are provided (FIG. 6), such that the detection unit 54A or 54B (an image-detection unit such as a CCD camera) can partially stick out from the information processing device (FIG. 9) or entirely stick out from the information processing device (FIG. 11), or such that the detection unit 54A or 54B (an image-detection unit such as a CCD camera) is connectable by a cable (FIG. 12), thereby adopting various configurations of the first embodiment previously described.

When the handwriting is used as identification information, the fingerprint sensor 54A-5 or 54B-5 of the unit 54A or 54B of the extension device 50A or 50B as shown in FIG. 13 or FIG. 15 may be replaced by a touch-inputting means or a handwriting-inputting means (which is comprised of a touch panel such as a digitizer or an input-tablet plate alone or a combination of these and a pen-inputting means or stylus). In this case, the shutter 54A-1 or 54B-1 may be provided as necessary. The fingerprint input unit 60 shown in FIG. 14 or FIG. 16 is then replaced by a touch-inputting unit or a handwriting-inputting unit, which transmits handwriting-pattern data to the notebook personal computer 20A or 20B. In FIG. 14 or FIG. 16, the fingerprint-feature-extraction unit 62, the fingerprint-registration unit 63, and the fingerprint matching unit 64 are respectively replaced by the handwriting-pattern-feature-extraction unit 62, the handwriting-pattern-registration unit 63, and the handwriting-pattern matching unit 64. Further, the second and third embodiments of this variation may be configured such that the detection unit 54A or 54B (a touch-inputting means or a handwriting-inputting means) is detachable (FIG. 4), such that the right-hand-side connector 54-7 and the left-hand-side connector 54-6 are provided (FIG. 6), such that the detection unit 54A or 54B (a touch-inputting means or a handwriting-inputting means) can partially stick out from the information processing device (FIG. 9) or entirely stick out from the information processing device (FIG. 11), or such that the detection unit 54A or 54B (a touch-inputting means or a handwriting-inputting means) is connectable by a cable (FIG. 12), thereby adopting various configurations of the first embodiment previously described.

When facial features are used as identification information, the fingerprint sensor 54A-5 or 54B-5 of the unit 54A or 54B of the extension device 50A or 50B as shown in FIG. 13 or FIG. 15 may be replaced by an image-detection means (such as a CCD camera). In this case, the shutter 54A-1 or 54B-1 may be provided if necessary. The fingerprint input unit 60 shown in FIG. 14 or FIG. 16 is then replaced by an image-detection unit, which transmits detected-image data to the notebook personal computer 20A or 20B. In FIG. 14 or FIG. 16, the fingerprint-feature-extraction unit 62, the fingerprint-registration unit 63, and the fingerprint matching unit 64 are respectively replaced by the facial-feature-extraction unit 62, the facial-pattern-registration unit 63, and the facial-pattern matching unit 64. Further, the second and third embodiments of this variation may be configured such that the detection unit 54A or 54B (an image-detection unit such as a CCD camera) is detachable (FIG. 4), such that the right-hand-side connector 54-7 and the left-hand-side connector 54-6 are provided (FIG. 6), such that the detection unit 54A or 54B (an image-detection unit such as a CCD camera) can partially stick out from the information processing device (FIG. 9) or entirely stick out from the information processing device (FIG. 11), or such that the detection unit 54A or 54B (an image-detection unit such as a CCD camera) is connectable by a cable (FIG. 12), thereby adopting various configurations of the first embodiment previously described.

Moreover, the present-invention is not limited to use of biological information for the purpose of identification check. As will be shown in FIG. 23, FIG. 25, and FIG. 27, which will be described later, identification information may be obtained from ID cards such as IC cards or magnetic cards, or may be obtained from a user when the user uses buttons to enter a password or an ID number. In this case, the detection unit 54A or 54B shown in FIG. 13 or FIG. 15 may be replaced by an IC-card reader, a magnetic-card reader, or buttons such as on a keypad. Alternatively, such a reader or buttons may be provided on the detachable detection unit 54A or 54B. By the same token, the second and third embodiments of this variation may be configured such that the right-hand-side connector 54-7 and the left-hand-side connector 54-6 are provided (FIG. 6), such that the detection unit 54A or 54B (an IC-card reader, a magnetic-card reader, or buttons such as on a keypad) can partially stick out from the information processing device (FIG. 9) or entirely stick out from the information processing device (FIG. 11), or such that the detection unit 54A or 54B (an IC-card reader, a magnetic-card reader, or buttons such as on a keypad) is connectable by a cable (FIG. 12), thereby adopting various configurations of the first embodiment previously described.

Fourth Embodiment

Figure 17:
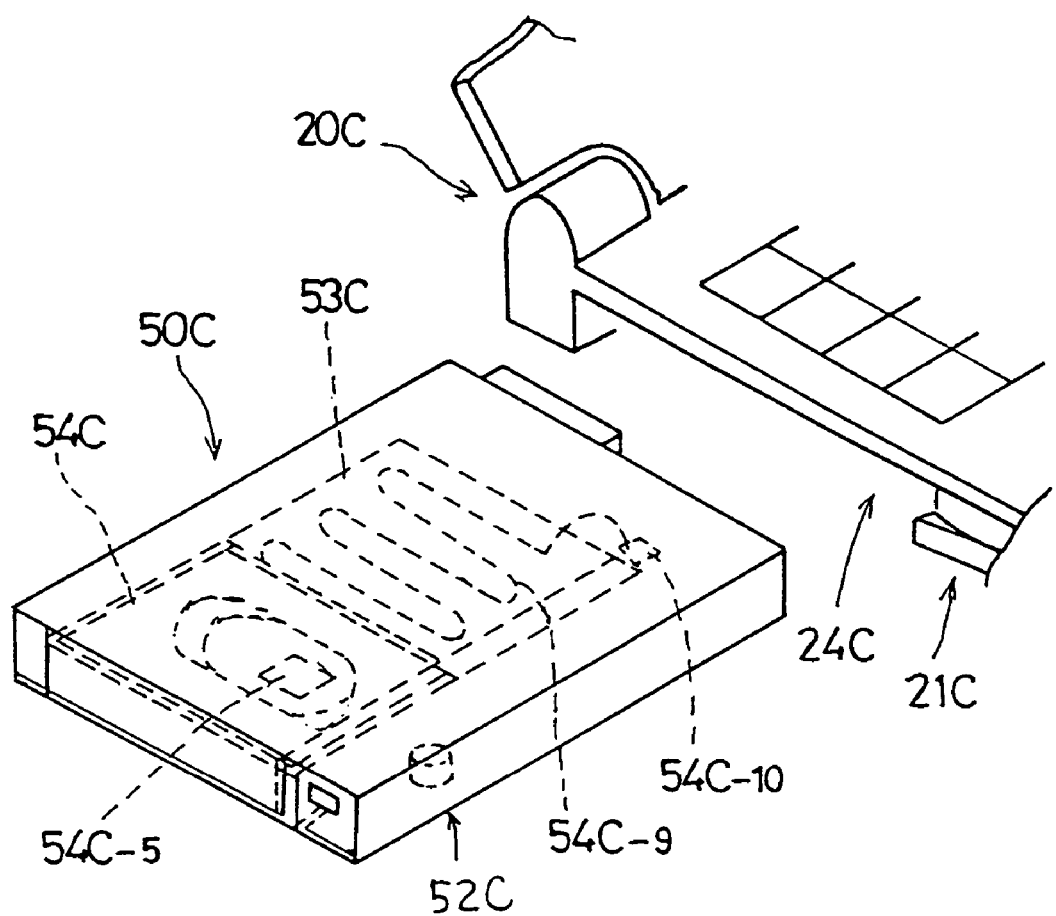
FIG. 17 is an illustrative drawing showing a fingerprint-reading extension device according to a fourth embodiment of the present invention
Figure 18:
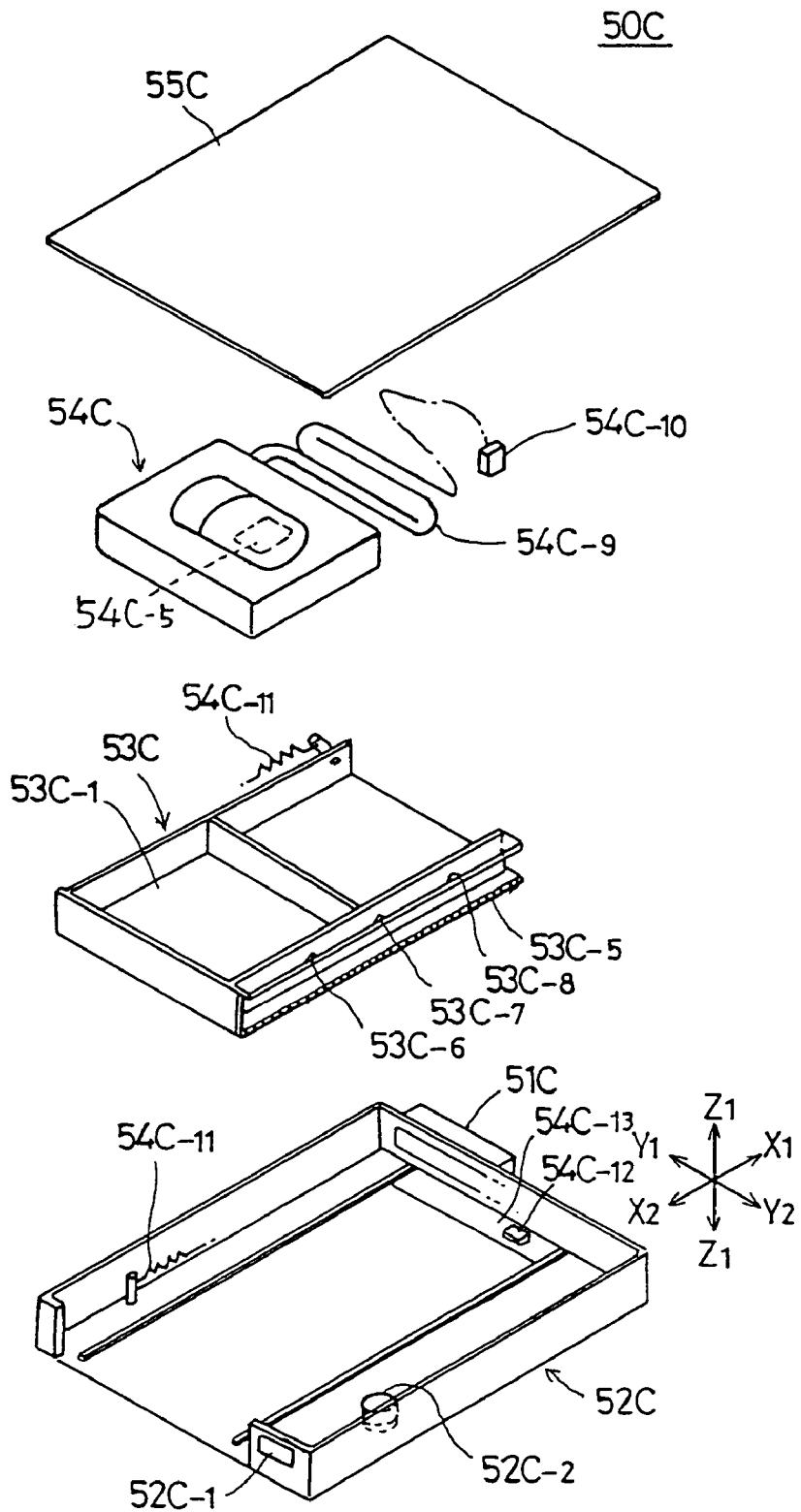
FIG. 18 is an exploded view of the fingerprint-reading extension device of FIG. 17.

FIG. 17 and FIG. 18 are illustrative drawings showing an extension device having an identification-information-acquisition function or providing a security function (for example, a fingerprint-reading extension device 50C) according to a fourth embodiment of the present invention. The fingerprint-reading extension device 50C has the same configuration as the fingerprint-reading extension device 50 shown in FIG. 4, and is provided with a fingerprint-reading unit 54C exemplifying an identification-information-acquisition unit in place of the fingerprint-reading unit 54. In FIG. 17 and FIG. 18, elements equivalent to those of FIG. 4 are referred to by the same reference numbers followed by a letter "C", and a description thereof will be omitted. In FIG. 17 and FIG. 18, fingerprints are used as an example of biological information serving as an example of identification information.

Figure 6B:
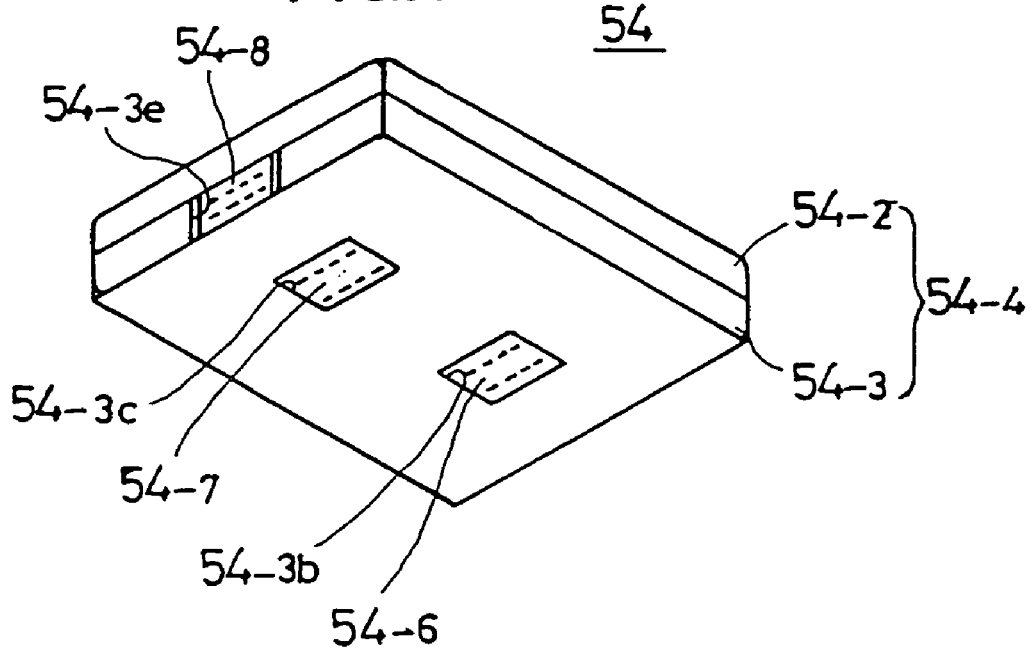
Figure 19A:
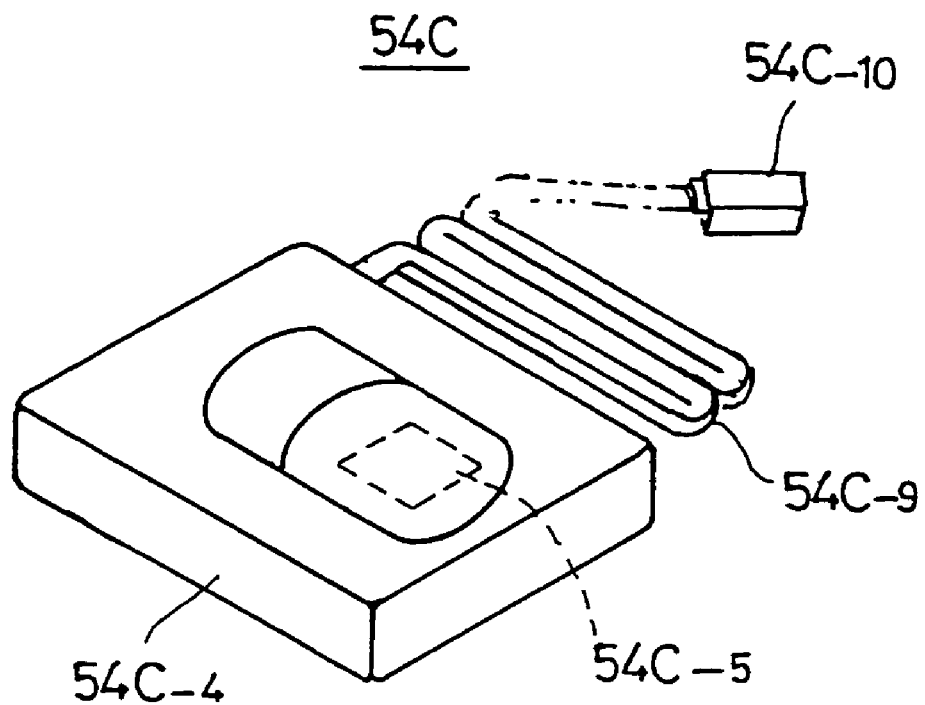
FIGS. 19A and 19B are illustrative drawings showing a fingerprint-reading unit shown in FIG. 18.
Figure 19B:
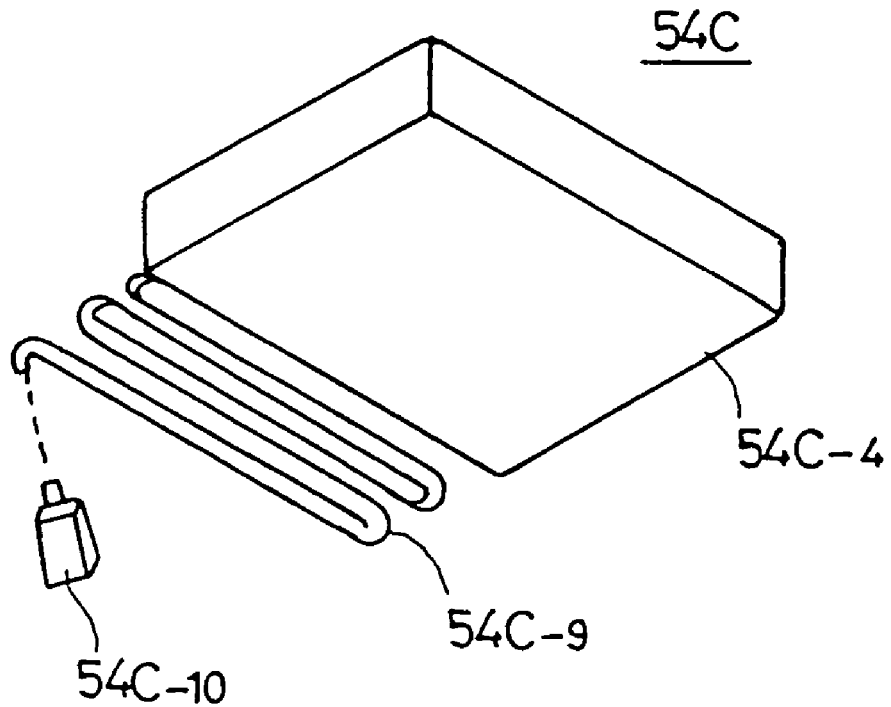
Figure 20:
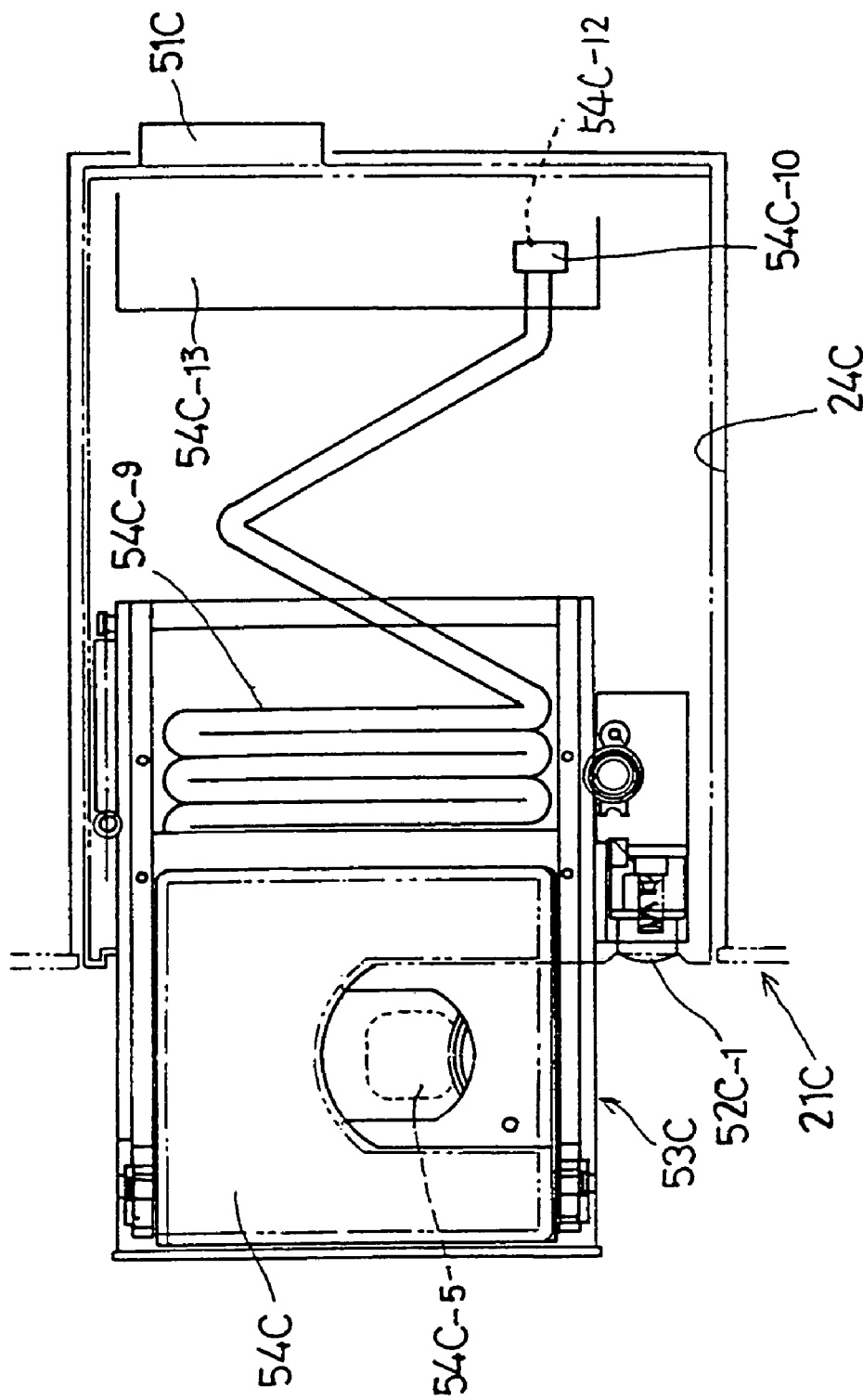
FIG. 20 is an illustrative drawing showing the way the fingerprint-reading unit is partly slid out from the notebook personal computer.

As shown in FIGS. 19A and 19B, the fingerprint-reading unit 54C has a cable 54C-9 extending from a side panel and having a USB connector 54C-10 attached to an end thereof. The fingerprint-reading unit 54C is not provided with the connectors 54-6, 54-7, and 54-8 as shown in FIG. 6B.

A cover 55C is easy to open or close. The fingerprint-reading unit 54C is contained in a fingerprint-detection-unit container unit 53C-1 of a tray 53C. The cable 54C-9 is folded to be stored in the tray 53C. A print board 54C-13 is provided at the back of a housing 52C, and has a connector 54C-12 fixedly mounted thereon. The connector 54C-12 is electrically connected to a connector 51C via the print board 54C-13. The USB connector 54C-10 at the end of the cable 54C-9 is connected to the connector 54C-12.

The fingerprint-reading extension device 50C is used and operated in much the same manner as the fingerprint-reading extension device 50 of FIG. 3.

When the notebook personal computer 20C is to be carried to outside the office, the fingerprint-reading extension device 50C is inserted into the extension bay 24C of the computer body 21C. The fingerprint-reading extension device 50C is carried together with the computer body 21C.

When the notebook personal computer 20C is operated outside the office, the operation button mechanism 52-1 is pressed once to have the fingerprint-reading unit 54C stick out from the extension bay 24. While the fingerprint-reading unit 54C is in this position, the user has his/her left-hand index finger read by the capacitance-based fingerprint sensor 54C-5. Further, as shown in FIG. 11 of the first embodiment, the fingerprint-reading unit may be so configured as to be able to stick out entirely from the notebook personal computer.

Figure 21:
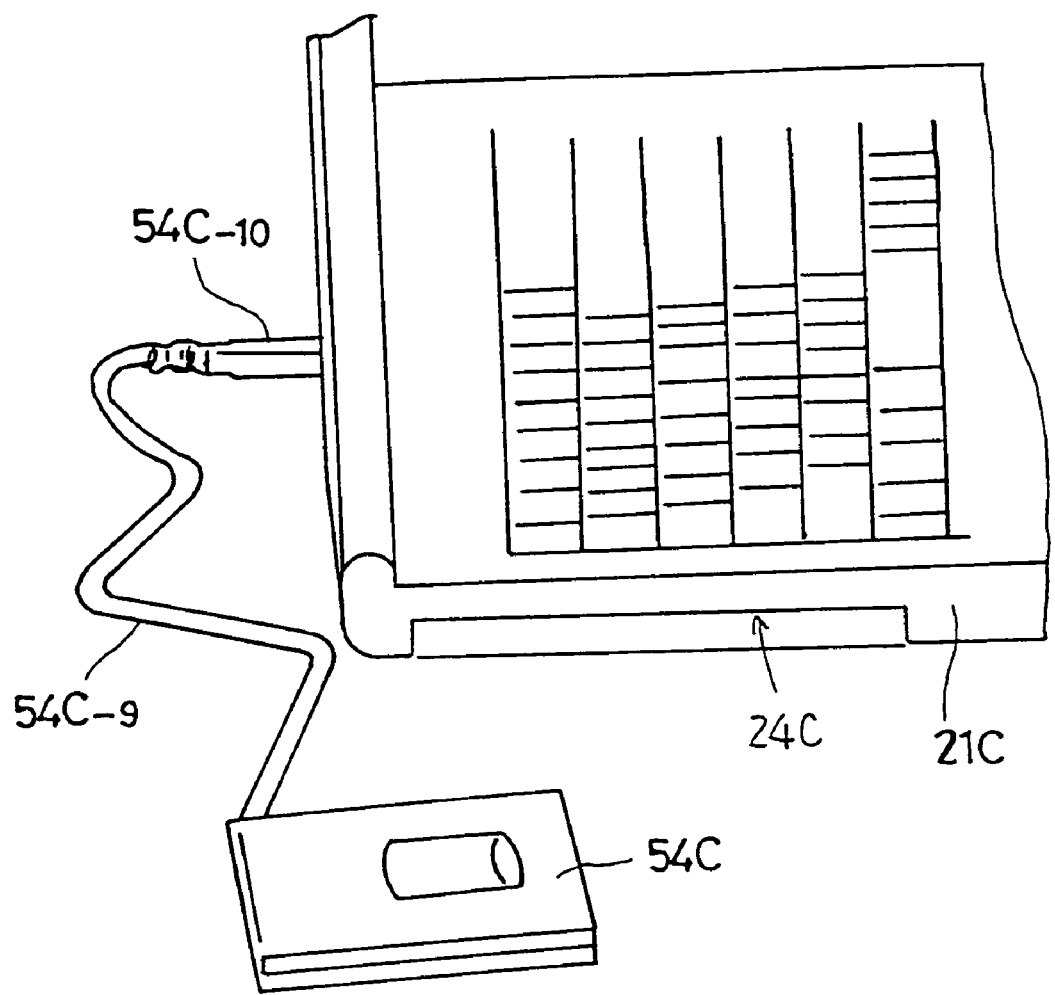
FIG. 21 is an illustrative drawing showing the fingerprint-reading unit connected to the notebook personal computer via a cable.

When the notebook personal computer 20C is operated on the office desk, the fingerprint-reading extension device 50C is taken out of the extension bay 24C of the notebook personal computer 20C. Then, the cover 55C is opened, and the USB connector 54C-10 is pulled off from the connector 54C-12 to detach the fingerprint-reading unit 54C from the tray 53C. Then, the USB connector 54C-10 is connected to the connector socket provided on the back panel of the computer body 21 as shown in FIG. 21. The fingerprint-reading unit 54C is then ready for use.

Since the fingerprint-reading unit 54C has its own cable 54C-9 attached thereto, there is no need to prepare a separate cable. This is convenient for the user.

The fingerprint-reading unit 54C and the notebook personal computer 20 may have a configuration as shown in FIG. 14 or a configuration as shown in FIG. 16. In the case of the configuration shown in FIG. 16, the fingerprint-reading unit 54C functions as a fingerprint identification unit.

Heretofore, a description of the fourth embodiment has been given. Although identification checks in the fourth-embodiment-are made by employing fingerprints as an example of biological information, the present invention is not limited to use of fingerprints. Rather than relying on fingerprints, other biological information such as voice (voice patterns), retinal patterns, handwritings, or facial features may be detected for identification purposes.

When voice is used as identification information, the fingerprint sensor 54C-5 of the unit 54C of the extension device 50C as shown in FIG. 17 through FIG. 21 may be replaced by a voice-input means (such as a microphone). In this case, the shutter 54C-1 is unnecessary. The voice-input means and the notebook personal computer 20 may be configured to relate to each other as shown in FIG. 8, FIG. 14, or FIG. 16. In this case, the fingerprint input unit 60 shown in FIG. 8, FIG. 14, and FIG. 16 is replaced by a voice-input unit, with the fingerprint-feature-extraction unit 62, the fingerprint-registration unit 63, and the fingerprint matching unit 64 respectively replaced by the voice-pattern-feature-extraction unit 62, the voice-pattern-registration unit 63, and the voice-pattern matching unit 64. Further, the fourth embodiment of this variation may be configured such that the detection unit 54C (microphone) is detachable (FIG. 19), such that the detection unit 54 (microphone) can partially stick out from the information processing device (FIG. 20) or entirely stick out from the information processing device, or such that the detection unit 54C (microphone) is connectable by a cable (FIG. 21), thereby adopting various configurations of the fourth embodiment described above.

When the retinal pattern is used as identification information, the fingerprint sensor 54C-5 of the unit 54C of the extension device 50C as shown in FIG. 17 through FIG. 21 may be replaced by a retinal-pattern-input means (such as a CCD camera serving as an image-detection unit). In this case, the shutter 54C-1 may be provided if necessary. The retinal-pattern-input means and the notebook personal computer 20 may be configured to relate to each other as shown in FIG. 8, FIG. 14, or FIG. 16. In this case, the fingerprint input unit 60 shown in FIG. 8, FIG. 14, and FIG. 16 is replaced by a retinal-pattern-input unit, with the fingerprint-feature-extraction unit 62, the fingerprint-registration unit 63, and the fingerprint matching unit 64 respectively replaced by the retinal-pattern-feature-extraction unit 62, the retinal-pattern-registration unit 63, and the retinal-pattern matching unit 64. Further, the fourth embodiment of this variation may be configured such that the detection unit 54C (an image-detection unit such as a CCD camera) is detachable (FIG. 19), such that the detection unit 54C (an image-detection unit such as a CCD camera) can partially stick out from the information processing device (FIG. 20) or entirely stick out from the information processing device, or such that the detection unit 54C (an image-detection unit such as a CCD camera) is connectable by a cable (FIG. 21), thereby adopting various configurations of the fourth embodiment described above.

When the handwriting is used as identification information, the fingerprint sensor 54C-5 of the unit 54C of the extension device 50C as shown in FIG. 17 through FIG. 21 may be replaced by a touch-inputting means or a handwriting-inputting means (which is comprised of a touch panel such as a digitizer or an input-tablet plate alone or a combination of these and a pen-inputting means or stylus). In this case, the shutter 54C-1 may be provided as necessary.

The touch-inputting means or the handwriting-inputting means and the notebook personal computer 20 may be configured to relate to each other as shown in FIG. 8, FIG. 14, or FIG. 16. In this case, the fingerprint input unit 60 shown in FIG. 8, FIG. 14, and FIG. 16 is replaced by a handwriting-pattern-input unit, with the fingerprint-feature-extraction unit 62, the fingerprint-registration unit 63, and the fingerprint matching unit 64 respectively replaced by the handwriting-pattern-feature-extraction unit 62, the handwriting-pattern-registration unit 63, and the handwriting-pattern matching unit 64. Further, the fourth embodiment of this variation may be configured such that the detection unit 54C (a touch-inputting means or a handwriting-inputting means) is detachable (FIG. 19), such that the detection unit 54C (a touch-inputting means or a handwriting-inputting means) can partially stick out from the information processing device (FIG. 20) or entirely stick out from the information processing device, or such that the detection unit 54 (a touch-inputting means or a handwriting-inputting means) is connectable by a cable (FIG. 21), thereby adopting various configurations of the fourth embodiment described above.

When facial features are used as identification information, the fingerprint sensor 54C-5 of the unit 54C of the extension device 50C as shown in FIG. 17 through FIG. 21 may be replaced by an image-detection means (such as a CCD camera). In this case, the shutter 54C-1 may be provided if necessary.

The image-detection means and the notebook personal computer 20 may be configured to relate to each other as shown in FIG. 8, FIG. 14, or FIG. 16. In this case, the fingerprint input unit. 60 shown in FIG. 8, FIG. 14, and FIG. 16 is replaced by an image-detection unit, with the fingerprint-feature-extraction unit 62, the fingerprint-registration unit 63, and the fingerprint matching unit 64 respectively replaced by the facial-feature-extraction unit 62, the facial-pattern-registration unit 63, and the facial-pattern matching unit 64. Further, the fourth embodiment of this variation may be configured such that the detection unit 54C (an image-detection unit such as a CCD camera) is detachable (FIG. 19), such that the detection unit 54C (an image-detection unit such as a CCD camera) can partially stick out from the information processing device (FIG. 20) or entirely stick out from the information processing device, or such that the detection unit 54C (an image-detection unit such as a CCD camera) is connectable by a cable (FIG. 21), thereby adopting various configurations of the fourth embodiment described above.

Moreover, the present invention is not limited to use of biological information for the purpose of identification check. As will be shown in FIG. 23, FIG. 25, and FIG. 27, which will be described later, identification information may be obtained from ID cards such as IC cards or magnetic cards, or may be obtained from a user when the user uses buttons to enter a password or an ID number. In this case, the detection unit 54C shown in FIG. 17 through FIG. 21 may be replaced by an IC-card reader, a magnetic-card reader, or buttons such as on a keypad. Alternatively, such a reader or buttons may be provided on the detachable detection unit 54C. By the same token, the fourth embodiment of this variation may be configured such that the detection unit 54C (an IC-card reader, a magnetic-card reader, or buttons such as on a keypad) can partially stick out from the information processing device (FIG. 20) or entirely stick out from the information processing device, or such that the detection unit 54C (an IC-card reader, a magnetic-card reader, or buttons such as on a keypad) is connectable by a cable (FIG. 21), thereby adopting various configurations of the fourth embodiment described above.

Fifth Embodiment

Figure 22:
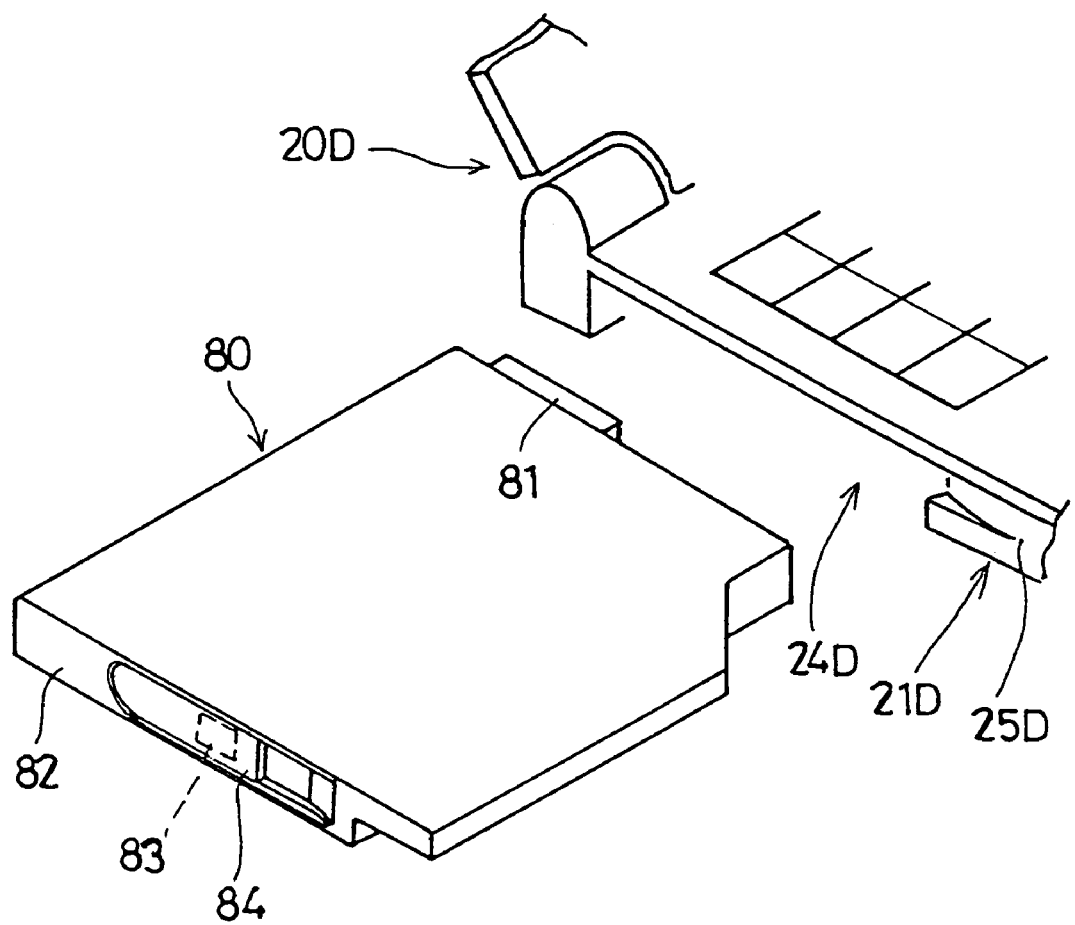
FIG. 22 is an illustrative drawing showing a fingerprint-reading extension device according to a fifth embodiment of the present invention.

FIG. 22 is an illustrative drawing showing an extension device having an identification-information-acquisition function or providing a security function (for example, a fingerprint-reading extension device 80) according to a fifth embodiment of the present invention. The fingerprint-reading extension device 80 has an outer surface shape that fits into an extension bay 24D of a notebook personal computer 20D. The fingerprint-reading extension device 80 has a capacitance-based fingerprint sensor 83 provided on a side panel 82 thereof. The capacitance-based fingerprint sensor 83, which exemplifies an identification-information-acquisition means, is covered with a shutter 84 most of the time. The side panel 82 is a surface that becomes a left-hand-side panel of the computer body 21D when the fingerprint-reading extension device 80 is inserted into the extension bay 24D. In FIG. 22, fingerprints are used as an example of biological information serving as an example of identification information.

The fingerprint-reading extension device 80 is operated while it is mounted in the extension bay 24D, exemplifying a container unit, of the notebook personal computer 20D. This provides good portability. The fingerprint-reading extension device 80 and the notebook personal computer 20D may have a configuration equivalent to that shown in FIG. 8.

When the notebook personal computer 20D is operated, the user opens the shutter 84 by sliding it in the direction Y1 with his/her left-hand index finger, and places the index finger on the capacitance-based fingerprint sensor 83.

The capacitance-based fingerprint sensor 84 reads the fingerprint of the index finger. The fingerprint data is then sent to the computer body 21 via a connector 81. The computer body 21 extracts features of the fingerprint, and matches the extracted fingerprint features with registered fingerprint data so as to check identification of the user. If the user is authorized, the notebook personal computer 20 can be activated. If the user is not authorized, the user cannot activate the notebook personal computer 20 even if he/she tries. This ensures security.

The fingerprint-reading extension device 80 and the notebook personal computer 20D may have a configuration equivalent to that of FIG. 14 or that of FIG. 16.

Sixth Embodiment

Figure 23:
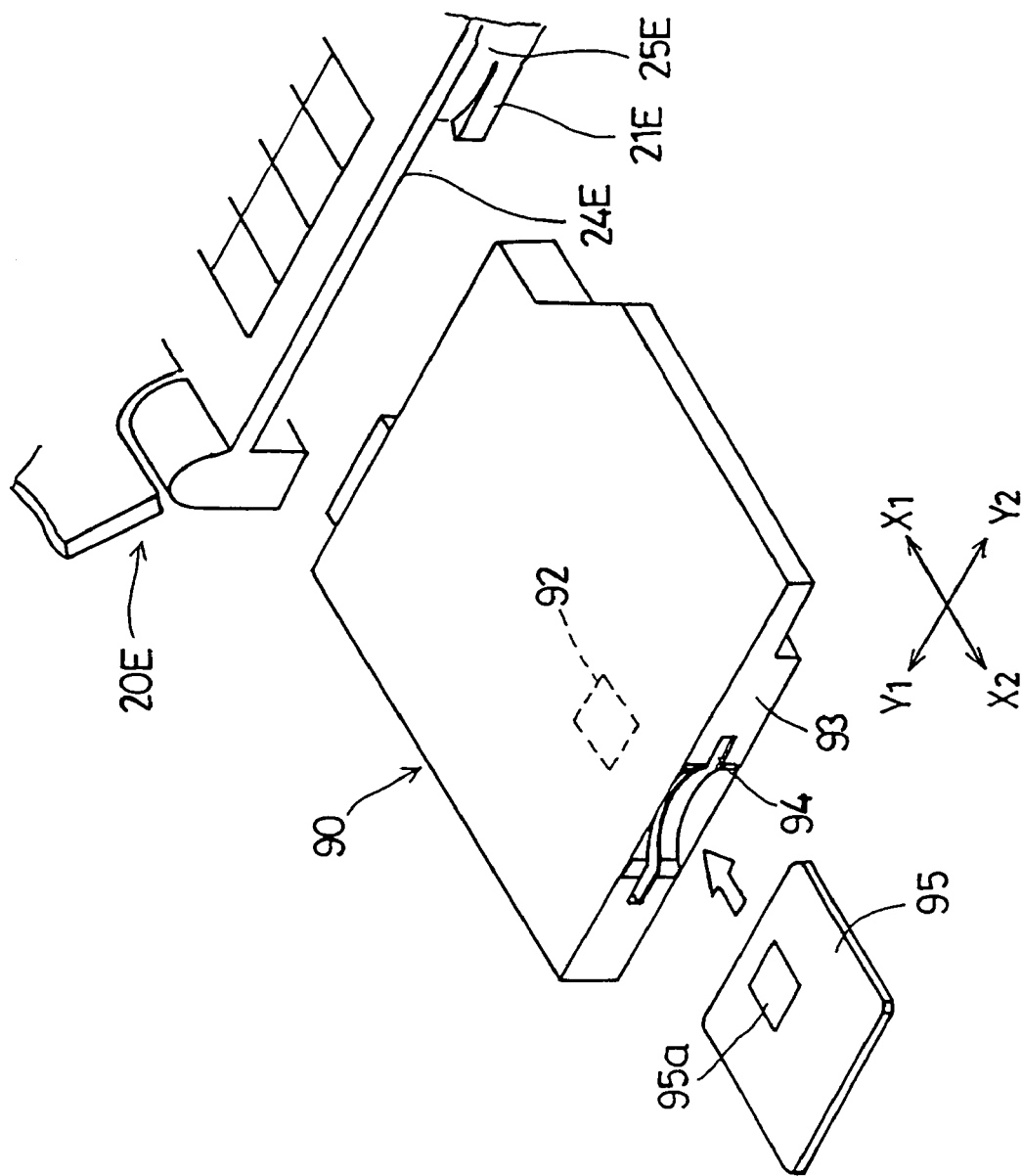
FIG. 23 is an illustrative drawing showing an IC-card-reader extension device according to a sixth embodiment of the present invention.

FIG. 23 is an illustrative drawing showing an IC-card-reader extension device 90 according to a sixth embodiment of the present invention. The IC-card-reader extension device 90 reads an ID card that serves as an ID card. The IC-card-reader extension device 90 includes an IC-card-reader head 92 exemplifying an identification-information-input means, and has an opening 94 provided on a side panel 93 for receiving an IC card. An IC card 95 includes therein an IC chip 95a, which contains information about the user. In FIG. 23, an IC card is used as an example of identification information.

The IC-card-reader extension device 90 is operated while it is set in an extension bay 24E, exemplifying a container unit, of a notebook personal computer 20E. The IC-card-reader extension device 90 thus provides desirable portability.

Figure 24:
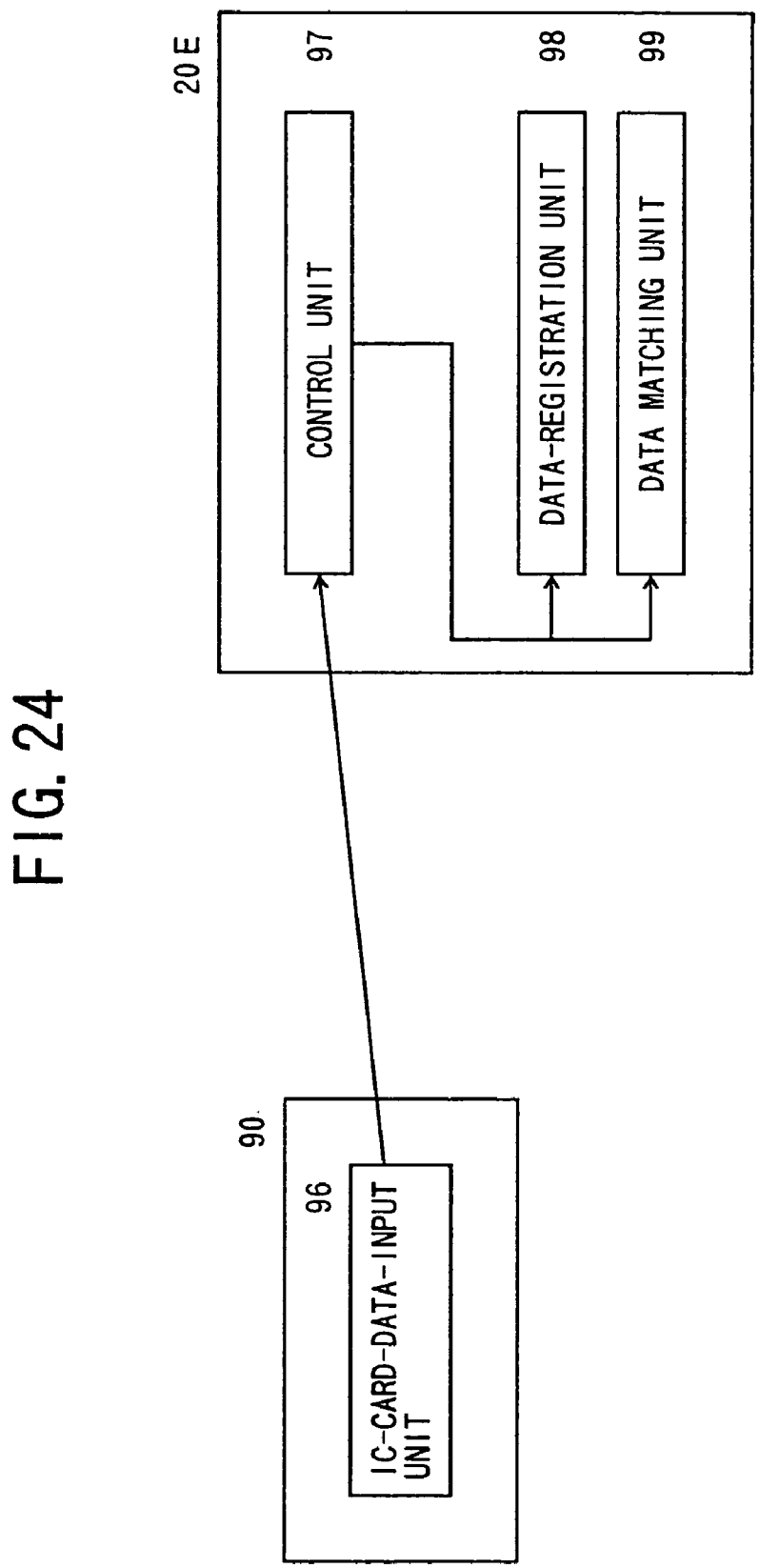
FIG. 24 is a block diagram showing functions of the IC-card-reader extension device of FIG. 23 and a notebook personal computer.

The IC-card-reader extension device 90 and the notebook personal computer 20E have a configuration as shown in FIG. 24. The IC-card-reader extension device 90 includes an IC-card-data-input unit 96. The notebook personal computer 20E includes a control unit 97, a data-registration unit 98 for storing registered data of the user, and a data matching unit 99 for matching the data of the IC-card-data-input unit 96 with the data of the data-registration unit 98.

When the notebook personal computer 20E is to be operated, the IC card 95 is inserted into the opening 94.

The IC-card-reader head 92 reads data of the IC card 95, and the data is transferred to the computer body 21E. The notebook personal computer 20E matches the data of the card with registered data so as to check identification of the user. If the user is authorized, the notebook personal computer 20E can be activated. If the user is not authorized, the user cannot activate the notebook personal computer 20E even if he/she tries to do so. This ensures security.

Seventh Embodiment

Figure 25:
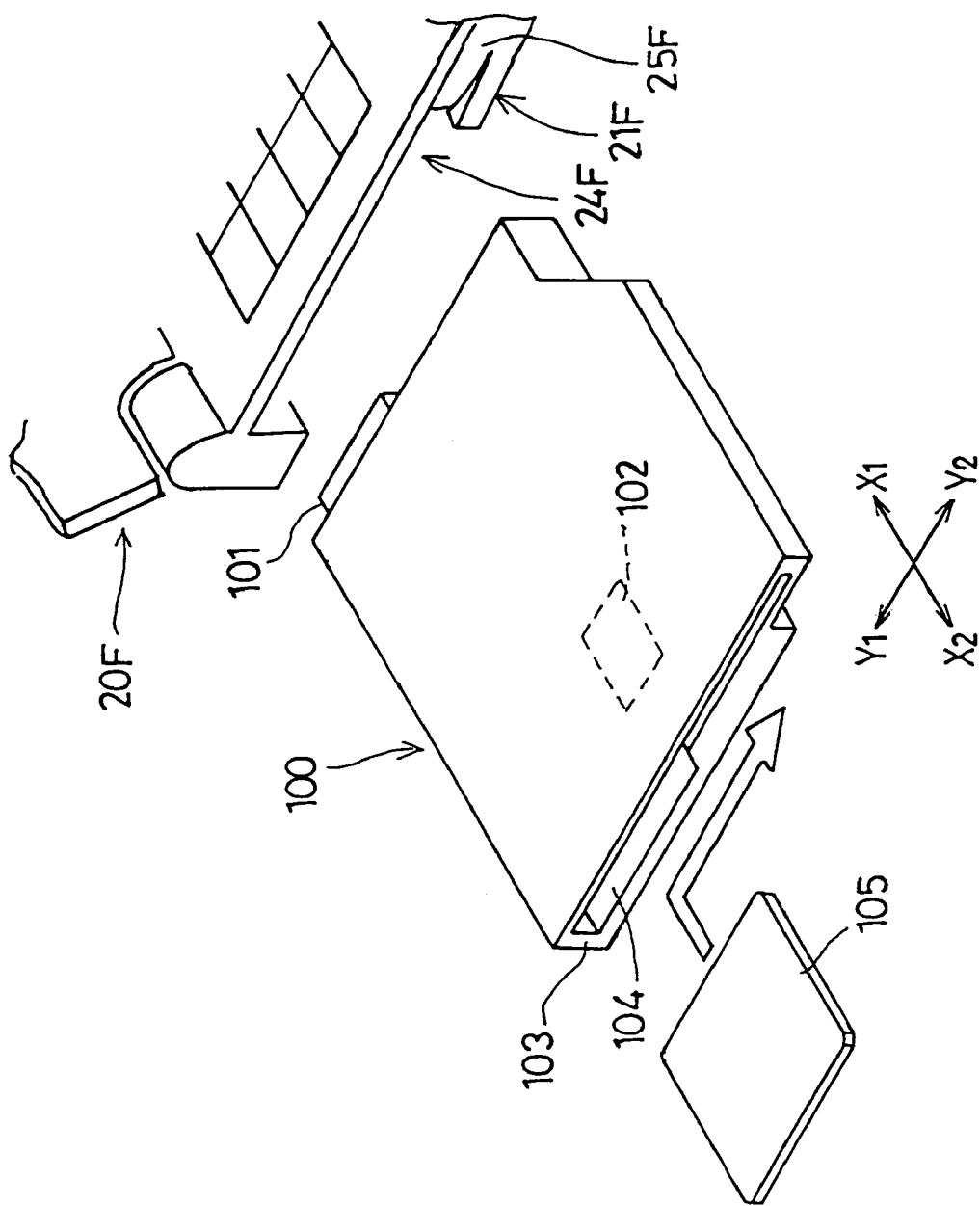
FIG. 25 is an illustrative drawing showing a magnetic-card-reader extension device according to a seventh embodiment of the present invention.

FIG. 25 is an illustrative drawing showing a magnetic-card-reader extension device 100 according to a seventh embodiment of the present invention. The magnetic-card-reader extension device 100 reads a magnetic card that serves as an ID card. The magnetic-card-reader extension device 100 includes a magnetic-card-reader head 102 exemplifying an identification-information-acquisition means, and has an opening 104 provided in a side panel 103 for receiving a magnetic card. A magnetic card 105 records therein information about the user. In FIG. 25, a magnetic card is used as an example of identification information.

The magnetic-card-reader extension device 100 is operated while it is set in an extension bay 24F, exemplifying a container unit, of a notebook personal computer 20F. The magnetic-card-reader extension device 100 thus provides desirable portability.

Figure 26:
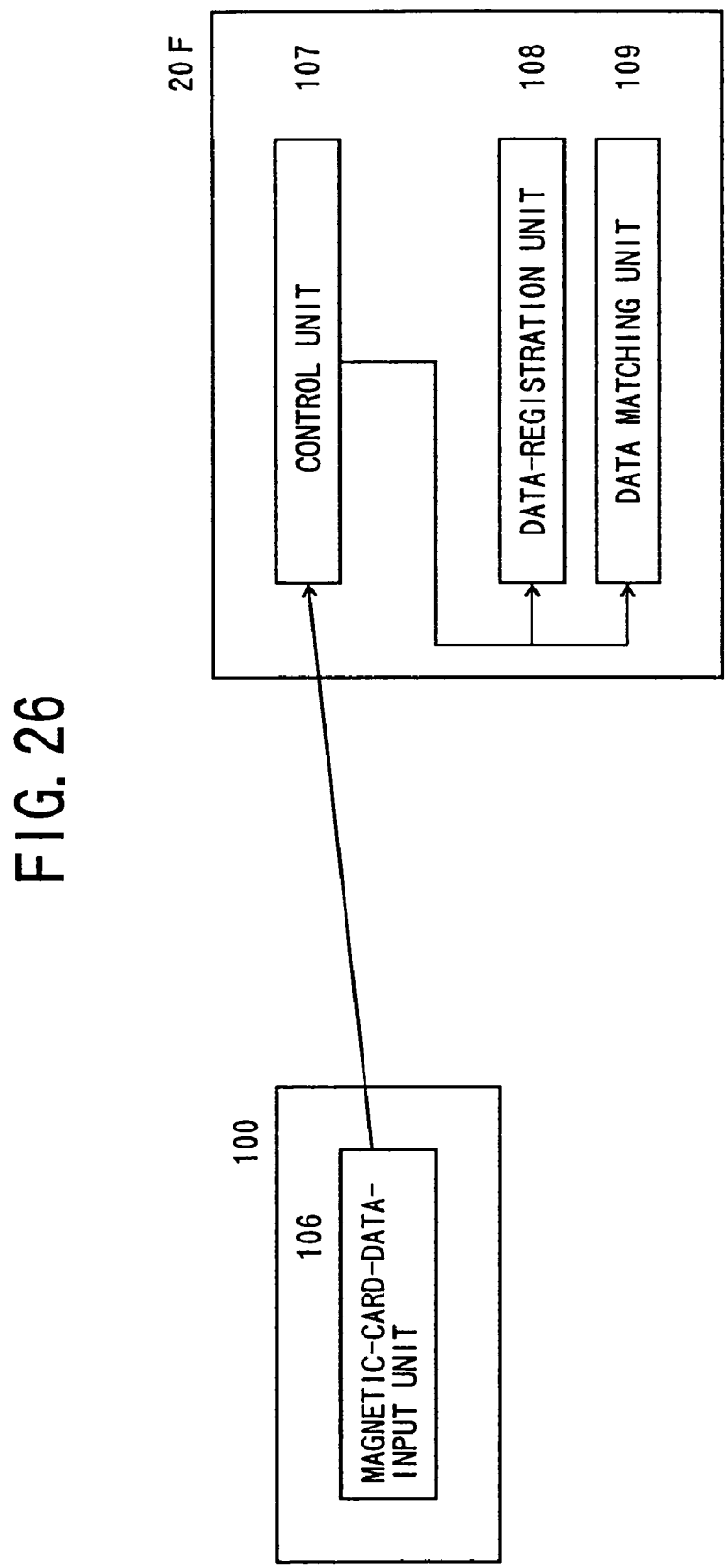
FIG. 26 is a block diagram showing functions of the magnetic-card-reader extension device of FIG. 25 and a notebook personal computer.

The magnetic-card-reader extension device 100 and the notebook personal computer 20F have a configuration as shown in FIG. 26. The magnetic-card-reader extension device 100 includes a magnetic-card-data-input unit 106. The notebook personal computer 20F includes a control unit 107, a data-registration unit 108 for storing registered data of the user, and a data matching unit 109 for matching the data of the magnetic-card-data-input unit 106 with the data of the data-registration unit 108.

When the notebook personal computer 20F is to be operated, the magnetic card 105 is inserted into the opening 104, and is slid through the opening 104 in the direction Y2.

The magnetic-card-reader head 102 reads data of the magnetic card 105, and the data is transferred to the computer body 21F. The notebook personal computer 20F matches the data of the card with registered data so as to check identification of the user. If the user is authorized, the notebook personal computer 20F can be activated. If the user is not authorized, the user cannot activate the notebook personal computer 20F even if he/she tries to do so. This ensures security.

Eighth Embodiment

Figure 27:
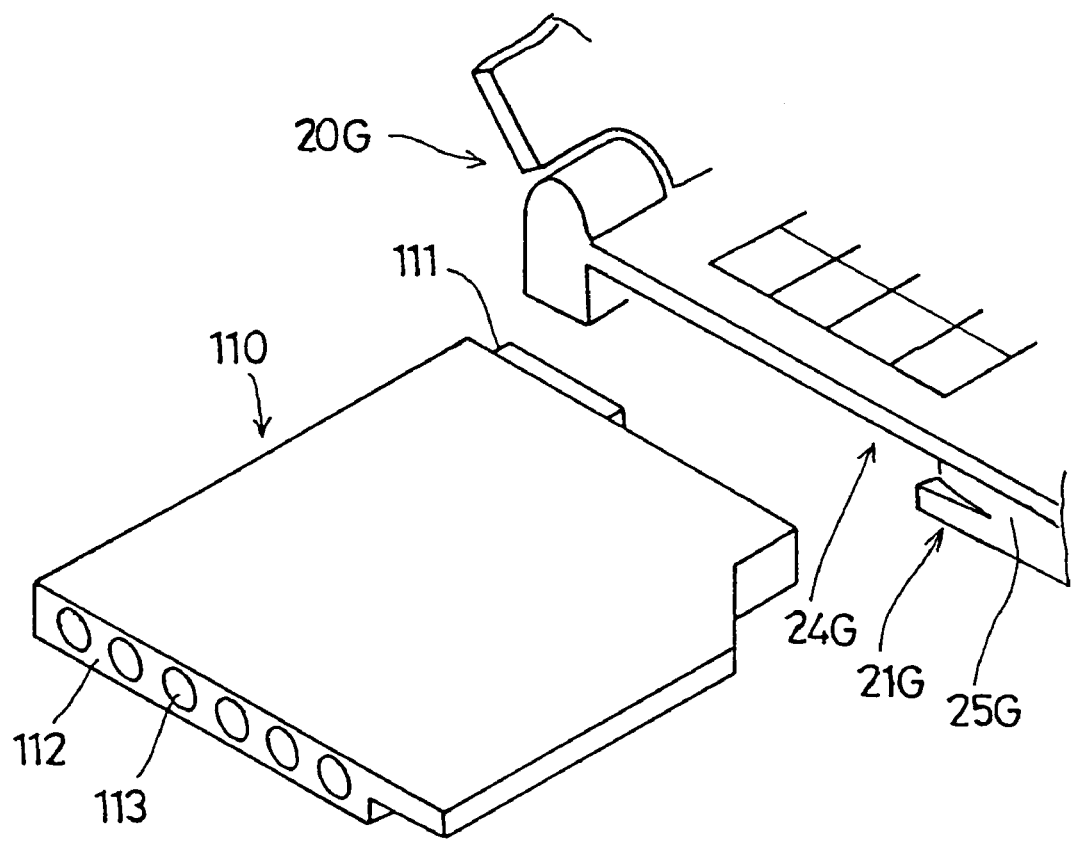
FIG. 27 is an illustrative drawing showing a PIN-input extension device according to an eighth embodiment of the present invention.

FIG. 27 is an illustrative drawing showing a PIN-input extension device 110 exemplifying an identification-information-acquisition means according to an eighth embodiment of the present invention. The PIN-input extension device 110 includes a button unit 113 comprised of a plurality of buttons provided on a side panel 112 facing the direction X2. The plurality of buttons are arranged in the direction Y1–Y2.

The PIN-input extension device 110 is operated while it is set in an extension bay 24G, exemplifying a container unit, of a notebook personal computer 20G. The PIN-input extension device 110 thus provides desirable portability. In FIG. 27, a password, a PIN code, an ID code, etc., may be used as an example of identification information.

Figure 28:
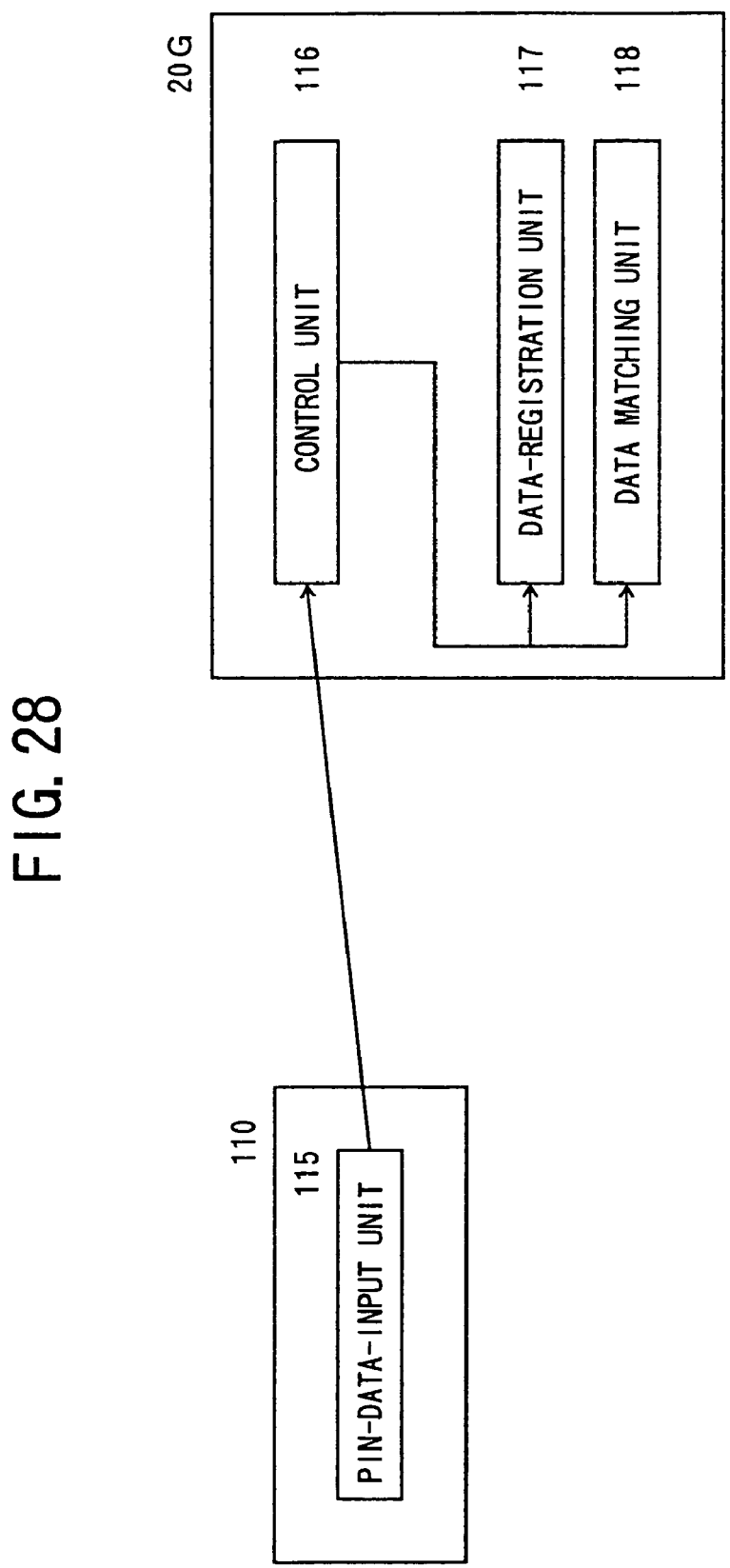
FIG. 28 is a block diagram showing functions of the PIN-code-input extension device of FIG. 27 and a notebook personal computer.

The PIN-input extension device 110 and the notebook personal computer 20G have a configuration as shown in FIG. 28. The PIN-input extension device 110 includes a PIN-data-input unit 115. The notebook personal computer 20G includes a control unit 116, a data-registration unit 117 for storing registered data of the user, and a data matching unit 118 for matching the data of the PIN-data-input unit 115 with the data of the data-registration unit 117.

When the user is going to use the notebook personal computer 20G, the user operates the button unit 113 to enter his/her PIN (personal identification number) code (or a password, an ID code, or the like). Then, the PIN data is transferred to the computer body 21G. The notebook personal computer 20G matches the entered PIN code with the registered PIN code so as to check identification of the user. If the user is authorized, the notebook personal computer 20G can be activated. If the user is not authorized, the user cannot activate the notebook personal computer 20G even if he/she tries to do so. This ensures security.

The extension devices 50, 80, 90, 100, and 110 described above may be inserted into an extension bay that is provided in extension bay housing where the extension bay housing is provided at the bottom of the computer body so as to have about half the extension of the computer body in a direction from the front end to the back end. Alternatively, the extension devices 50, 80, 90, 100, and 110 may be inserted into an extension bay that is provided in an extension unit where the extension unit has about the same plan-view shape and size as the computer body, and has the computer placed thereon.

If a desktop-type computer has an extension bay, one of the extension devices 50, 80, 90, 100, and 110 may be inserted into such an extension bay.

The above embodiments have been described with reference to a case in which a notebook-type personal computer having an extension bay is used. As pointed out in the above passage, however, a bay may be provided in a docking station or an extension unit connected to a notebook personal computer, and the device of the present invention may be inserted into such a bay. The present invention is not limited to any particular one of these configurations. The docking station is disclosed in Japanese Patent Laid-open Application No. 10-133778 and Japanese Patent Laid-open Application No. 9-6475. Such a docking station is sometimes referred to as a function-extension device of a notebook personal computer. A typical docking station includes one or more peripheral devices that are not provided as a built-in device in the notebook personal computer. While the notebook personal computer is easy to carry around because of its portability, the notebook personal computer when used in office is connected to the docking station to provide functionality compatible to that of a desktop personal computer or to allow a user to use the notebook personal computer like using a desktop personal computer. In a typical configuration, the notebook personal computer is placed on the docking station, or is connected to the docking station by attaching the back panel of the computer to the docking station positioned behind the computer.

In other words, the terminology "extension bay" or "extension bay of an information-processing device" is used in this specification and claims not only to refer to an extension bay of a main body of an information processing device but also to refer to an extension bay of a function-extension unit, a docking station, or the like that is used together with the information processing device. It should be noted that there is a device called an extension-bay housing or a docking bay, which serves only as a bay and does not provide any additional functions. Such a device is used together with a personal computer. The terminology "extension bay" or "extension bay of an information-processing device" used in this specification and claims is also intended to cover such a device. When the docking station, the function-extension unit, the extension-bay housing, or the docking bay is combined together with an information-processing device, the single combined mass may be referred to as an information processing device. The terminology "information processing device" may be also used to refer to the docking station, the function-extension unit, the extension-bay housing, or the docking bay itself.

The docking station and the function-extension unit possess are equipped with a memory unit, and attend to information processing in one way or another. The extension-bay housing and the docking bay also attend to information processing when provided with a proper unit therein. Because of this, the terminology "information processing device" should be construed as including peripheral devices relating to information processing.

Ninth Embodiment

Figure 29:
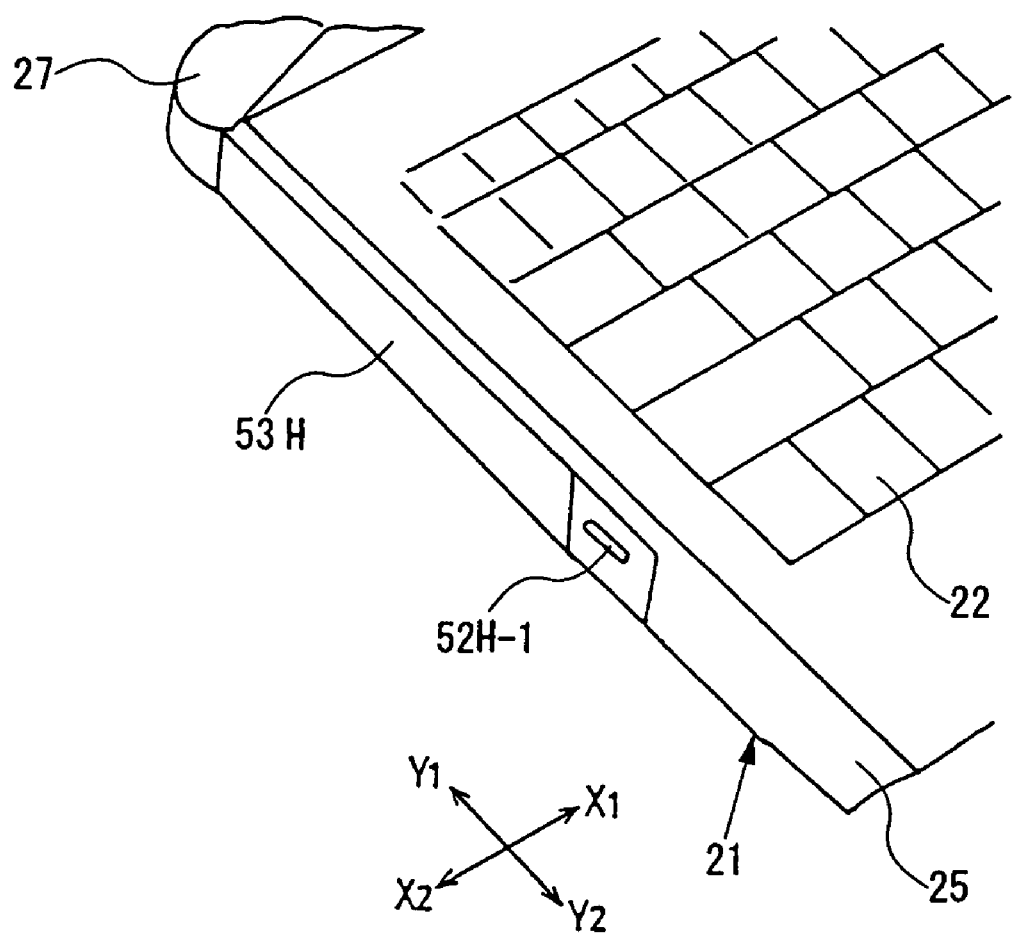
FIG. 29 is an illustrative drawing showing a fingerprint-reading unit stored in an information processing device according to a ninth embodiment of the present invention.
Figure 30:
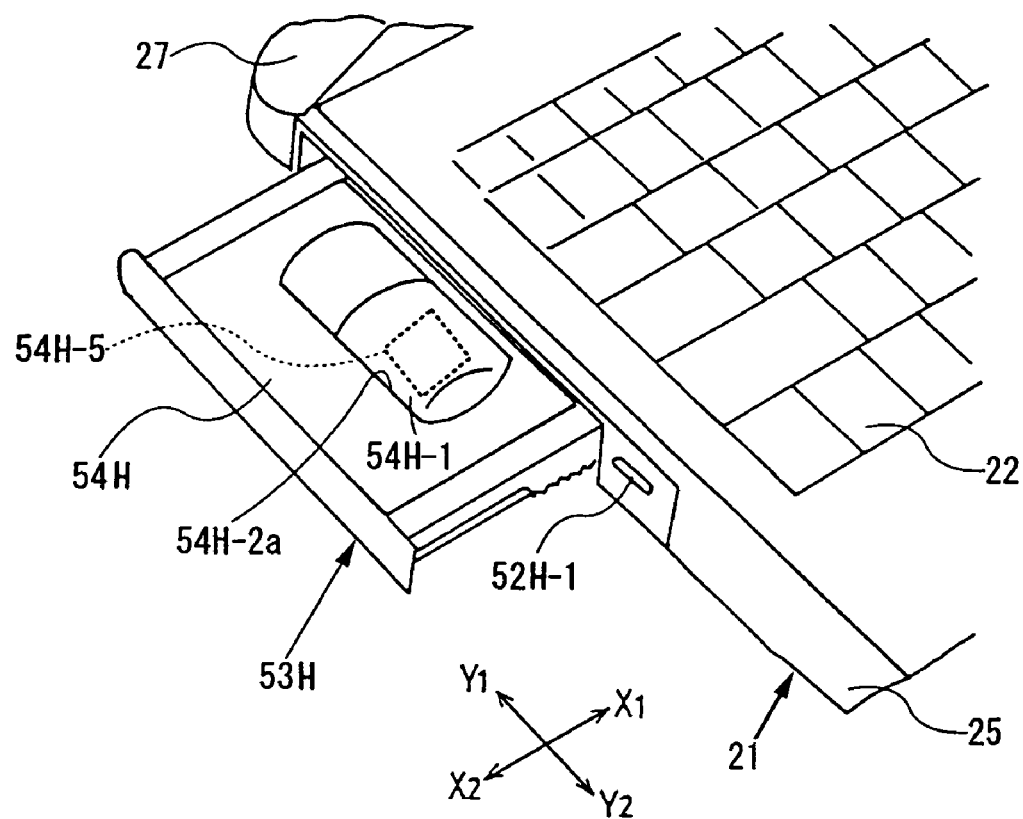
FIG. 30 is an illustrative drawing showing the fingerprint-reading unit sticking out from the information processing device according to the ninth embodiment of the present invention.
Figure 31:
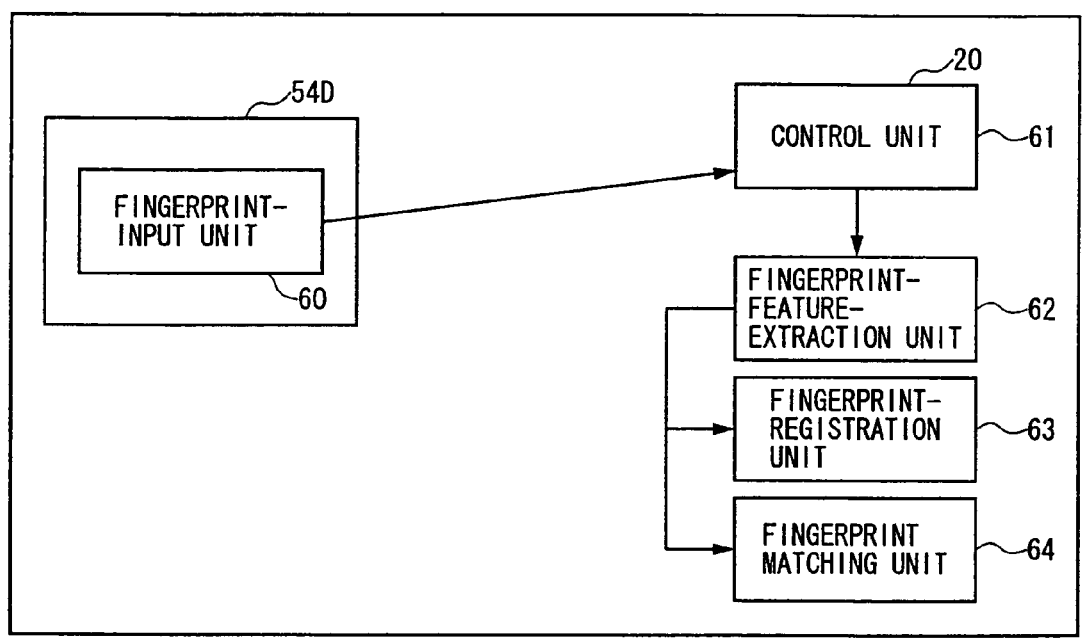
FIG. 31 is a block diagram showing relations between the fingerprint-reading unit and the information processing device shown in FIG. 29 and FIG. 30.

FIG. 29 through FIG. 31 are illustrative drawings showing the notebook personal computer 20 serving as an information-processing device having an identification-information-acquisition function or providing a security function according to a ninth embodiment of the present invention. In this embodiment, the information-processing device is referred to as a notebook personal computer for the sake of convenience of explanation, but includes a portable terminal, a portable information-processing device, etc. Further, the terminology "computer" means a device equipped with a processor of one type or another, a device equipped with an information processing function, a device for performing actions (storing data, communicating, etc.) relating to information processing of one type or another, etc.

In FIG. 29 through FIG. 30, the notebook personal computer 20 includes the computer body 21 and the liquid-crystal-display unit 27 serving as a display unit that can be swung open to show a display screen. (In FIG. 29 and FIG. 30, the liquid-crystal-display unit 27 is only partially shown, but is the same in its entirety as that of FIG. 2.) A direction X1–X2 corresponds to the width of the notebook personal computer 20. A direction Y1–Y2 corresponds to the depth of the notebook personal computer 20. The computer body 21, which exemplifies a case or housing, has the keyboard portion 22 provided on an upper surface thereof and serving as an input unit, and has a CPU or a processor (not shown) contained therein.

An identification-information-acquisition device or a security device (e.g., fingerprint-detection device) according to the ninth embodiment is not detachably provided in the extension bay as in the first embodiment, but is fixedly provided in the information processing device. As shown in FIG. 29 and FIG. 30, this configuration includes a tray 53H exemplifying a sliding unit provided in the computer body 21 serving as a case or housing, and further includes a fingerprint-reading unit 54H provided on the tray 53H.

The information-processing device has an operation-button mechanism 52H-1 on the side panel thereof. This mechanism exemplifies an operation means.

FIG. 29 is an illustrative drawing showing the computer body 21 (case or housing) having the fingerprint-reading unit 54H exemplifying an identification-information-acquisition unit encased therein. FIG. 30 is an illustrative drawing showing the fingerprint-reading unit 54H sticking out from the computer body 21 (case or housing). By operating the operation button 52H-1, the device is brought from the condition as shown in FIG. 29 to the condition as shown in FIG. 30. The sliding function of the tray 53H is provided by mechanisms of the damper 52-2 and the guide rails 52-3 and 52-4 as shown in FIG. 5, FIG. 10, and FIG. 11. In order to return from the condition of FIG. 30 to the condition of FIG. 29, the user simply pushes the tray 53H in the direction X1.

The fingerprint-reading unit 54H has a capacitance-based fingerprint sensor 54H-5 provided thereon. The capacitance-based fingerprint sensor 54H-5 serving as an identification-information-acquisition unit is covered by a shutter. 54H-1 when it is not used, and is exposed by sliding the shutter 54H-1 in the direction Y1.

The capacitance-based fingerprint sensor 54H-5 may be FPS100 Solid-State Fingerprint Sensor manufactured by Veridicom.

In the following, relation between the fingerprint-reading unit 54H and the notebook personal computer 20 will be explained.

As shown in FIG. 31, the fingerprint-reading unit 54H includes the fingerprint input unit 60.

The notebook personal computer 20 includes the control unit 61, the fingerprint-feature-extraction unit 62 for extracting fingerprint features from the image data supplied from the fingerprint input unit 60, the fingerprint-registration unit 63 having fingerprint data registered therein of an index finger of the user's left hand, and the fingerprint matching unit 64 for matching the fingerprint data supplied from the fingerprint-feature-extraction unit 62 with the fingerprint data of the fingerprint-registration unit 63. Namely, the fingerprint-reading unit 54H detects a fingerprint without the processing of detected data, whereas the notebook personal computer 20 attends to the data processing for checking if the user is authorized.

When a user takes the notebook personal computer 20 with him/her to outside the office, the fingerprint-reading extension device 50 is inserted into the extension bay 24 of the computer body 21, and the connector 51 is connected to the connector provided on the back wall of the extension bay 24.

In this arrangement, the fingerprint-reading extension device 50 is encased in the computer body 21, so that the fingerprint-reading unit 54 is now an integral part of the notebook personal computer 20. All that needs to be done is to carry the notebook personal computer 20, with no need to carry a separate fingerprint-reading unit. This provides better portability compared with the configuration of FIG. 1 in which the card-type fingerprint identification device 1 has to be carried separately from the notebook personal computer 10.

When a user takes the notebook personal computer 20 with him/her to outside the office, the fingerprint-reading unit 54H is push into the computer body 21 as shown in FIG. 29.

In this arrangement, the fingerprint-reading unit 54H is encased in the computer body 21, so that the fingerprint-reading unit 54H is now an integral part of the notebook personal computer 20. All that needs to be done is to carry the notebook personal computer 20, with no need to carry a separate fingerprint-reading unit. This provides better portability compared with the configuration of FIG. 1 in which the card-type fingerprint identification device 1 has to be carried separately from the notebook personal computer 10.

When the notebook personal computer 20 is to be operated, the user pushes the operation button 52-1.

In response, the tray 53H slides in the direction X2 to stick out from the side panel of the computer body 21. As a result, as shown in FIG. 30, the opening 54-2a of the fingerprint-reading unit 54H is exposed outside the computer body 21, allowing the shutter 54H-1 to be open manually.

A user opens the shutter 54H-1 by sliding it in the direction Y1 with the left-hand index finger, and places the index finger on the capacitance-based fingerprint sensor 54H-5.

The capacitance-based fingerprint sensor 54H-5 reads the fingerprint of the index finger. The fingerprint data is then sent to control unit 61 (FIG. 30) of the computer body 21. There, extraction of fingerprint features and matching of the extracted fingerprint data with the registered fingerprint data ensue so as to check identification.

After the notebook personal computer 20 is activated, the tray 53H is push in the direction X1 to store the fingerprint-reading unit 54H inside the notebook personal computer 20. In this stored position, the fingerprint-reading unit 54H does not encumber handling of the notebook personal computer 20.

Heretofore, the ninth embodiment of the present invention has been described. As described above, the sliding of the tray 53H is achieved by employing the mechanisms of the first embodiment. Further, the first embodiment employed such a configuration that the fingerprint-reading unit 54 H could switch positions between partially sticking out from the computer body 21 (FIG. 9) or entirely sticking out from the computer body 21 (FIG. 11). This configuration may be employed in the ninth embodiment as well.

Moreover, the first embodiment adopted a configuration in which the fingerprint-reading unit 54H is detachable from the tray 53. The ninth embodiment may adopt this feature as well, and, also may be configured such that the fingerprint-reading unit 54H is fixed on the tray 53H. Further, the ninth embodiment may employ a configuration in which the fingerprint-reading unit 54 is connectable by a cable (FIG. 12) as in the first embodiment. In such a case, the mode of use as shown in FIG. 12 may be appropriate.

In the ninth embodiment described above, although identification checks are made by employing fingerprints as an example of biological information, the present invention is not limited to use of fingerprints. Rather than relying on fingerprints, other biological information such as voice (voice patterns), retinal patterns, handwritings, or facial features may be detected for identification purposes. When voice is used as identification information, the fingerprint sensor 54H-5 of the unit 54 as shown in FIG. 29 and FIG. 30 may be replaced by a voice-input means (such as a microphone). In this case, the shutter 54H-1 is unnecessary. The fingerprint input unit 60 shown in FIG. 31 is then replaced by a voice-inputting unit, which transmits voice data to the notebook personal computer 20. In FIG. 31, the fingerprint-feature-extraction unit 62, the fingerprint-registration unit 63, and the fingerprint matching unit 64 are respectively replaced by the voice-pattern-feature-extraction unit 62, the voice-pattern-registration unit 63, and the voice-pattern matching unit 64. Further, this variation of the ninth embodiment may be configured such that the detection unit 54 (microphone) is detachable, such that the detection unit 54 (microphone) can partially stick out from the information processing device or entirely stick out from the information processing device (FIG. 11), or such that the detection unit 54 (microphone) is connectable by a cable (FIG. 12), thereby adopting various configurations of the first through ninth embodiments described above.

When the retinal pattern is used as identification information, the fingerprint sensor 54H-5 of the unit 54 as shown in FIG. 29 and FIG. 30 may be replaced by a retinal-pattern-input means (such as a CCD camera serving as an image-detection unit). In this case, the shutter 54H-1 may be provided if necessary. The fingerprint input unit 60 shown in FIG. 31 is then replaced by a retinal-pattern-inputting unit, which transmits retinal-pattern data to the notebook personal computer 20. In FIG. 31, the fingerprint-feature-extraction unit 62, the fingerprint-registration unit 63, and the fingerprint matching unit 64 are respectively replaced by the retinal-pattern-feature-extraction unit 62, the retinal-pattern-registration unit 63, and the retinal-pattern matching unit 64. Further, this variation of the ninth embodiment may be configured such that the detection unit 54H (an image-detection unit such as a CCD camera) is detachable (FIG. 4), such that the detection unit 54H (an image-detection unit such as a CCD camera) can partially stick out from the information processing device (FIG. 9) or entirely stick out from the information processing device (FIG. 11), or such that the detection unit 54H (an image-detection unit such as a CCD camera) is connectable by a cable (FIG. 12), thereby adopting various configurations of the first through ninth embodiments described above.

When the handwriting is used as identification information, the fingerprint sensor 54H-5 of the unit 54H as shown in FIG. 29 through FIG. 31 may be replaced by a touch-inputting means or a handwriting-inputting means (which is comprised of a touch panel such as a digitizer or an input-tablet plate alone or a combination of these and a pen-inputting means or stylus). In this case, the shutter 54H-1 may be provided as necessary. The fingerprint input unit 60 shown in FIG. 31 is then replaced by a touch-inputting unit or a handwriting-inputting unit, which transmits handwriting-pattern data to the notebook personal-computer 20. In FIG. 31, the fingerprint-feature-extraction unit 62, the fingerprint-registration unit 63, and the fingerprint matching unit 64 are respectively replaced by the handwriting-pattern-feature-extraction unit 62, the handwriting-pattern-registration unit 63, and the handwriting-pattern matching unit 64. Further, this variation of the ninth embodiment may be configured such that the detection unit 54H (a touch-inputting means or a handwriting-inputting means) is detachable (FIG. 4), such that the detection unit 54H (a touch-inputting means or a handwriting-inputting means) can partially stick out from the information processing device (FIG. 9) or entirely stick out from the information processing device (FIG. 11), or such that the detection unit 54H (a touch-inputting means or a handwriting-inputting means) is connectable by a cable (FIG. 12), thereby adopting various configurations of the first through ninth embodiments described above.

When facial features are used as identification information, the fingerprint sensor 54H-5 of the unit 54H as shown in FIG. 29 through FIG. 31 may be replaced by an image-detection means (such as a CCD camera). In this case, the shutter 54H-1 may be provided if necessary. The fingerprint input unit 60 shown in FIG. 31 is then replaced by an image-detection unit, which transmits detected-image data to the notebook personal computer 20. In FIG. 31, the fingerprint-feature-extraction unit 62, the fingerprint-registration unit 63, and the fingerprint matching unit 64 are respectively replaced by the facial-feature-extraction unit 62, the facial-pattern-registration unit 63, and the facial-pattern matching unit 64. Further, this variation of the ninth embodiment may be configured such that the detection unit 54H (an image-detection unit such as a CCD camera) is detachable (FIG. 4), such that the detection unit 54H (an image-detection unit such as a CCD camera) can partially stick out from the information processing device (FIG. 9) or entirely stick out from the information processing device (FIG. 11), or such that the detection unit 54H (an image-detection unit such as a CCD camera) is connectable by a cable (FIG. 12), thereby adopting various configurations of the first through ninth embodiments described above.

Moreover, the present invention is not limited to use of biological information for the purpose of identification check. As was shown in FIG. 23, FIG. 25, and FIG. 27 previously described, identification information may be obtained from ID cards such as IC cards or magnetic cards, or may be obtained from a user when the user uses buttons to enter a password, an ID number, a PIN code, etc. In this case, the detection unit 54H shown in FIG. 30 may be replaced by an IC-card reader, a magnetic-card reader, or buttons such as on a keypad. Alternatively, such a reader or buttons may be provided on the detachable detection unit 54. By the same token, the ninth embodiment of this variation may be configured such that the detection unit 54 (an IC-card reader, a magnetic-card reader, or buttons such as on a keypad) can partially stick out from the information processing device (FIG. 9) or entirely stick out from the information processing device (FIG. 11), or such that the detection unit 54 (an IC-card reader, a magnetic-card reader, or buttons such as on a keypad) is connectable by a cable (FIG. 12), thereby adopting various configurations of the first through ninth embodiments described above.

Tenth Embodiment

Figure 32:
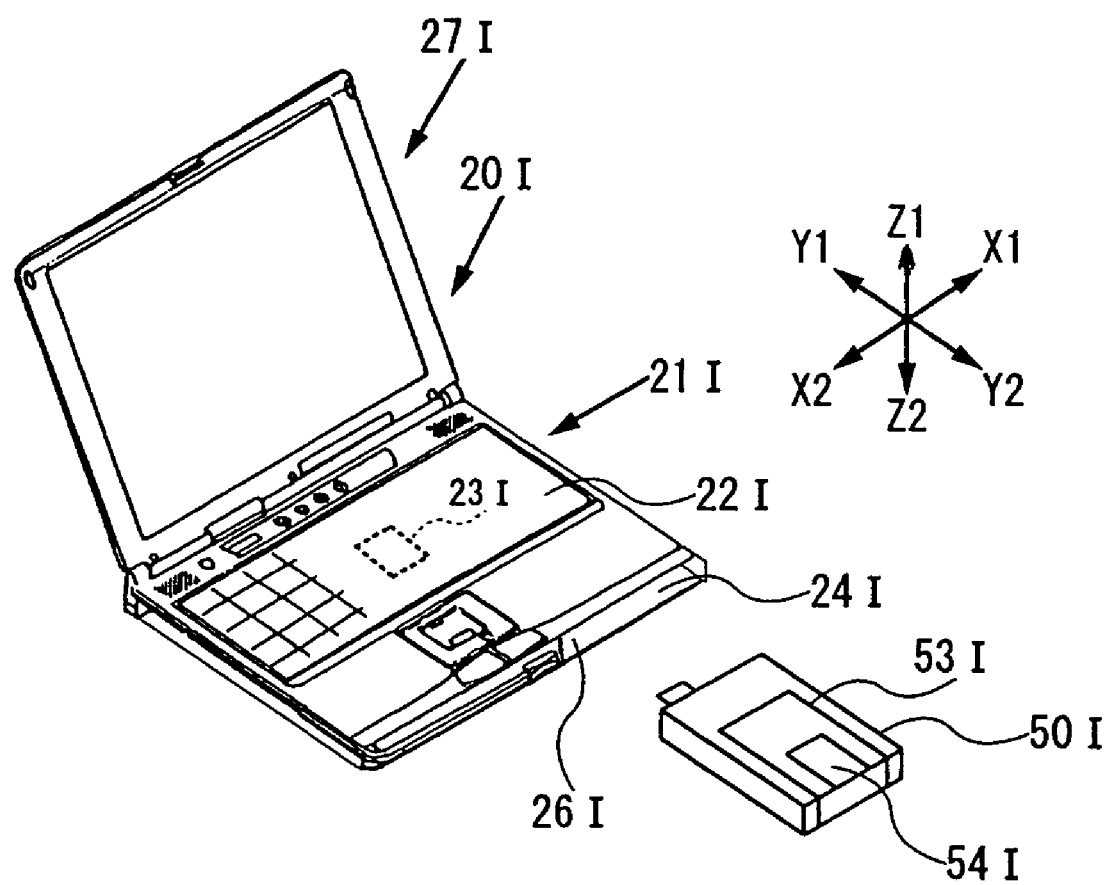
FIG. 32 is an illustrative drawing showing an extension device of another embodiment of the present invention together with a notebook personal computer.
Figure 33:
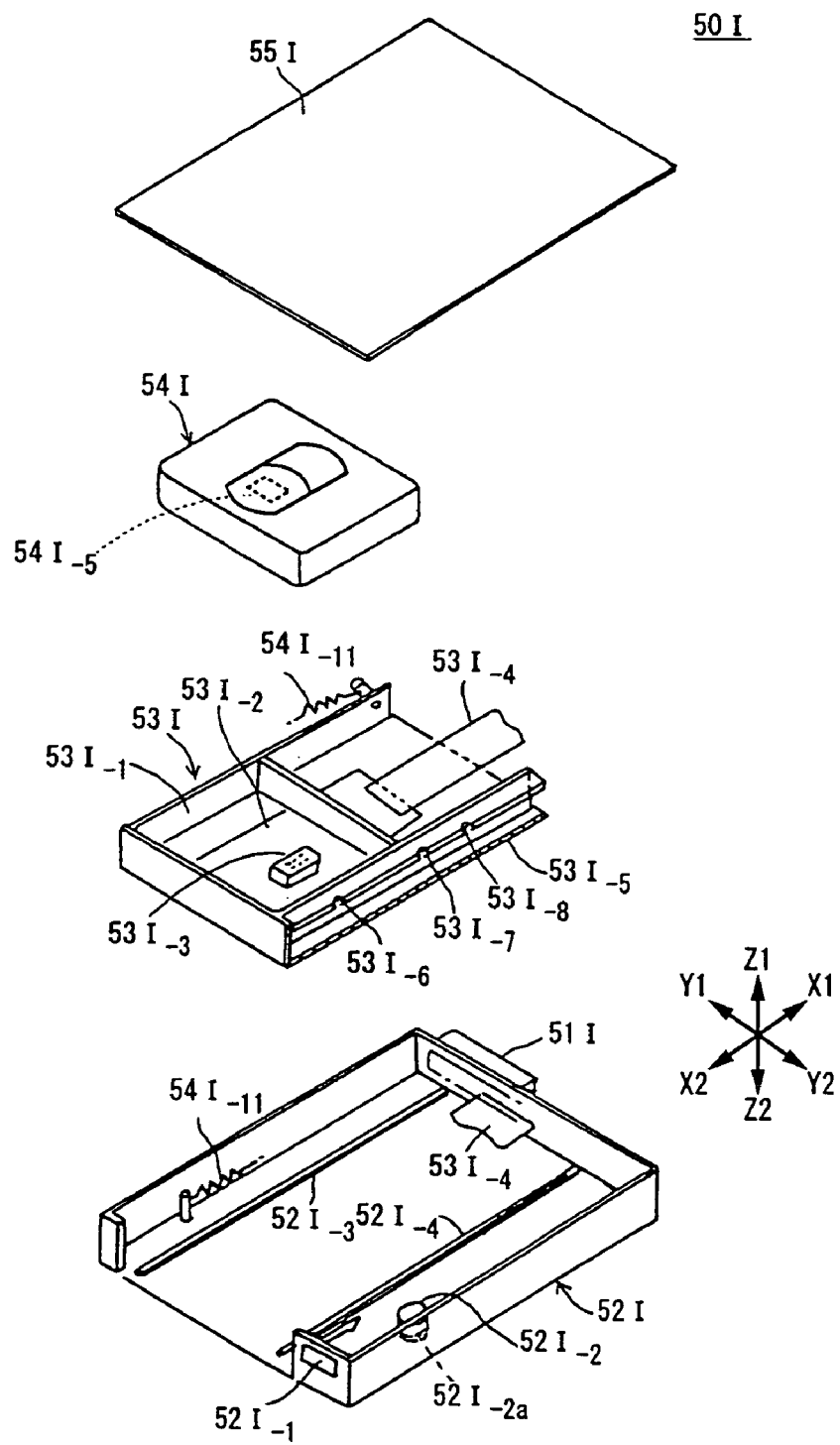
FIG. 33 is an exploded view of the fingerprint-reading extension device.
Figure 34A:
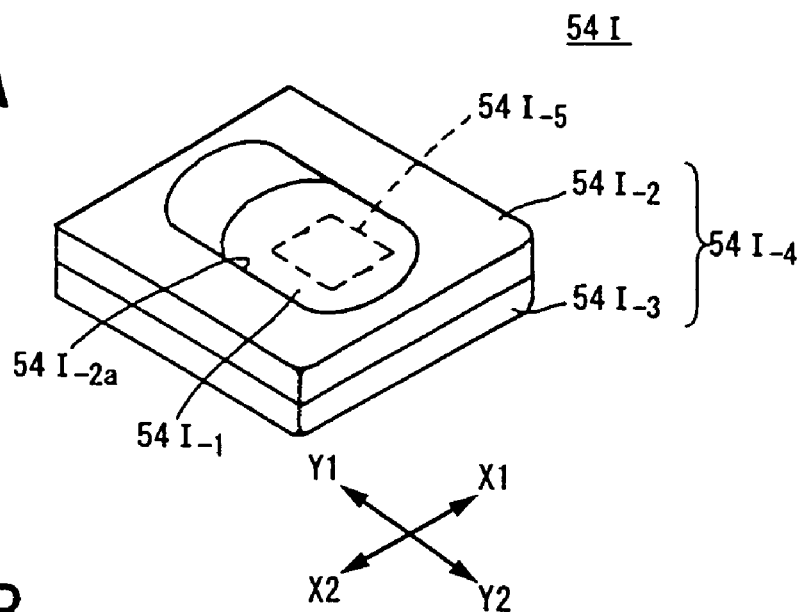
FIGS. 34A and 34B are isometric views of a fingerprint-reading unit shown in FIG. 33.
Figure 34B:
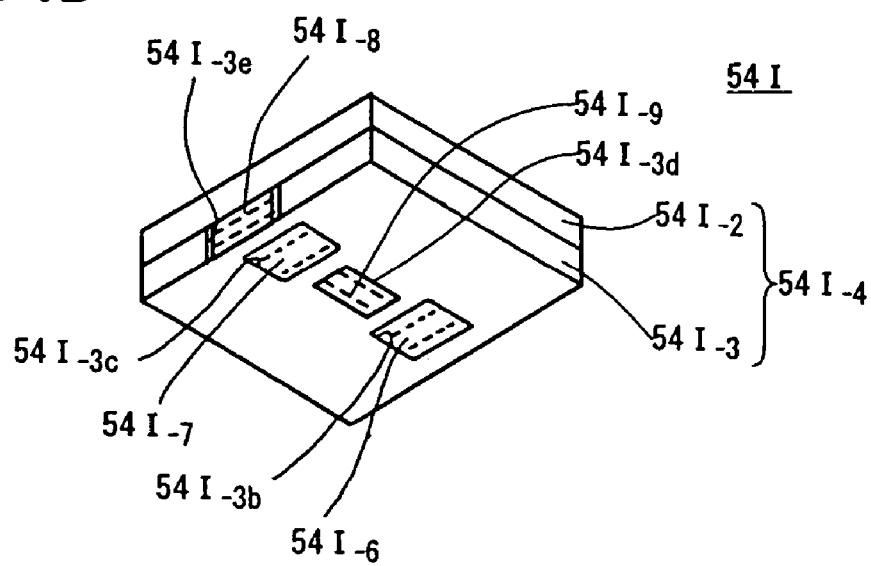

FIG. 32 through FIG. 34 are illustrative drawings showing an extension device (e.g., fingerprint-reading extension device 50I) having an identification-information-acquisition function or providing a security function according to a tenth embodiment of the present invention. As an example of an identification-information-acquisition unit, a fingerprint-reading unit 54I is provided. In FIG. 32 through FIG. 34, elements that correspond to counterpart elements shown in FIG. 2 through FIG. 6 are referred to by the same numerals with an additional suffix I, and a description thereof will be omitted. In FIGS. 32 through 34, fingerprints are used as an example of biological information that serves for identification purposes among other types of information.

In FIG. 32, a notebook personal computer 20I includes a computer body 21I and a liquid-crystal-display unit 27I serving as a display unit that can be swung open to show a display screen. A direction X1–X2 corresponds to the width of the notebook personal computer 20I. A direction Y1–Y2 corresponds to the depth of the notebook personal computer 20I, and a direction Z1–Z2 corresponds to the height of the notebook personal computer 20I. The computer body 21I has a keyboard portion 22I provided on an upper surface thereof and serving as an input unit, and has a CPU 23I or a processor contained therein. At the bottom of the computer body 21I, an extension bay 24I is formed. In contrast with the notebook personal computer 20 shown in FIG. 2, the notebook personal computer 20I of FIG. 32 has the extension bay 24I formed on the right-hand side thereof (i.e., the side toward the direction X1), and an opening 26I of the extension bay 24I is provided on the front side of the computer body 21I facing the user. In this embodiment, namely, the opening 26I is provided on the side toward the direction Y2. It should be noted that the opening 24I would suffice if it is provided on the front side that faces the user, and may be provided on the left-hand side (i.e., the side toward the direction X2) rather than on the right-hand side.

In association with the notebook personal computer 20I, extension devices are provided, which include the extension floppy drive 30, the extension CD-ROM drive 40, the extension device (e.g., the fingerprint-reading extension device 50, 50A, 50B, 50C, or 50D) having an identification-information-acquisition means or providing a security function according to the first through fourth embodiments, the fingerprint-reading extension device 80 (or fingerprint-identification-check extension device) according to the fifth embodiment, the IC-card-reader extension device 90 (or IC-card-identification-check extension device) according to the sixth embodiment, the magnetic-card-reader extension device 100 (or magnetic-card-identification-check extension device) according to the seventh embodiment, and the PIN-input extension device 110 (or PIN-identification-check extension device) according to the eighth embodiment. In FIG. 32, an extension device can be inserted into the extension bay 24I from the opening 26I. A detailed configuration of the fingerprint-reading extension device 50I is shown in FIG. 33. Further, details of the configuration of the fingerprint-reading unit 54I are shown in FIG. 34. The fingerprint-reading unit 54I, which exemplifies an identification-information-acquisition unit, has a front-side connector 54I-9 provided on a bottom surface thereof between a left-hand-side connector 54I-6 and a right-hand-side connector 54I-7. As shown in FIG. 34, an opening 54I-3d is also provided. The arrangement of these connectors makes it possible to mount the fingerprint-reading extension device 50 or 50I in the left-hand-side bay or the right-hand-side bay of the notebook personal computer 20 as shown in FIG. 2, FIG. 3, and FIG. 4 as well as to mount the fingerprint-reading extension device 50 or 50I in the front bay that faces the user. When the fingerprint-reading extension device 50I is mounted in the front bay as shown in FIG. 32, the shutter 54I-1 is preferably arranged such as to open in the same direction as the direction in which the tray 53I slides out and slides in. Namely, since the tray 53I extends from the keyboard 22I toward the user, it provides better manipulability for the user if the shutter 54I-1 opens in the direction Y1 rather than in the direction X1–X2 shown in FIG. 32. Alternatively, the shutter mechanisms may be removed all together. Even in this case, however, the front-side connector 54I-9 may be provided.

Accordingly, the fingerprint-reading unit 54I of FIG. 34 is mounted on the tray 53I at a 90° angle relative to the fingerprint-reading unit 54 of the configuration of FIG. 4. In this case, the connector 53I-3 shown in FIG. 33 is connected to the front-side connector 54I-9 shown in FIG. 34. When the fingerprint-reading unit 54I of FIG. 34 is mounted on the tray 53 of FIG. 4, the left-hand-side connector 54I-6 is connected to the connector 53-3.

If the fingerprint-reading unit 54I can be mounted on the tray 53 at the 90° angle as in the configuration shown in FIG. 32 through FIG. 34, the fingerprint-reading unit 54I is preferably designed to have the same extension along the X1–X2 direction and along the Y1–Y2 direction, and the tray 53 or 53I is also preferably designed to have a matching container shape. Further, it is preferable that the fingerprint-reading unit 54I and the notebook personal computer 20 are configured to relate to each other as shown in FIG. 8, FIG. 14, or FIG. 16.

Heretofore, the tenth embodiment of the present invention has been described. Although identification checks in the tenth embodiment are made by employing fingerprints as an example of biological information, the present invention is not limited to use of fingerprints. Rather than relying on fingerprints, other biological information such as voice (voice patterns), retinal patterns, handwritings, or facial features may be detected for identification purposes.

When voice is used as identification information, the fingerprint sensor 54I-5 of the unit 54I of the extension device 50I as shown in FIG. 33 and FIG. 34 may be replaced by a voice-input means (such as a microphone). In this case, the shutter 54I-1 is unnecessary. The voice-input means and the notebook personal computer 20 may be configured to relate to each other as shown in FIG. 8, FIG. 14, or FIG. 16. In this case, the fingerprint input unit 60 shown in FIG. 8, FIG. 14, and FIG. 16 is replaced by a voice-input unit, with the fingerprint-feature-extraction unit 62, the fingerprint-registration unit 63, and the fingerprint matching unit 64 respectively replaced by the voice-pattern-feature-extraction unit 62, the voice-pattern-registration unit 63, and the voice-pattern matching unit 64. Further, the tenth embodiment of this variation may be configured such that the detection unit 54I (microphone) is detachable (FIG. 19), such that the detection unit 54I (microphone) can partially stick out from the information processing device (FIG. 20) or entirely stick out from the information processing device, or such that the detection unit 54I (microphone) is connectable by a cable (FIG. 21), thereby adopting various configurations of the fourth embodiment previously described.

When the retinal pattern is used as identification information, the fingerprint sensor 54I-5 of the unit 54I of the extension device 50I as shown in FIG. 32 through FIG. 34 may be replaced by a retinal-pattern-input means (such as a CCD camera serving as an image-detection unit). In this case, the shutter 54I-1 may be provided if necessary. The retinal-pattern-input means and the notebook personal computer 20 may be configured to relate to each other as shown in FIG. 8, FIG. 14, or FIG. 16. In this case, the fingerprint input unit 60 shown in FIG. 8, FIG. 14, and FIG. 16 is replaced by a retinal-pattern-input unit, with the fingerprint-feature-extraction unit 62, the fingerprint-registration unit 63, and the fingerprint matching unit 64 respectively replaced by the retinal-pattern-feature-extraction unit 62, the retinal-pattern-registration unit 63, and the retinal-pattern matching unit 64. Further, the tenth embodiment of this variation may be configured such that the detection unit 54I (an image-detection unit such as a CCD camera) is detachable (FIG. 19), such that the detection unit 54I (an image-detection unit such as a CCD camera) can partially stick out from the information processing device (FIG. 20) or entirely stick out from the information processing device, or such that the detection unit 54I (an image-detection unit such as a CCD camera) is connectable by a cable (FIG. 21), thereby adopting various configurations of the fourth embodiment previously described.

When the handwriting is used as identification information, the fingerprint sensor 54I-5 of the unit 54I of the extension device 50I as shown in FIG. 32 through FIG. 34 may be replaced by a touch-inputting means or a handwriting-inputting means (which is comprised of a touch panel such as a digitizer or an input-tablet plate alone or a combination of these and a pen-inputting means or stylus). In this case, the shutter 54I-1 may be provided as necessary.

The touch-inputting means or the handwriting-inputting means and the notebook personal computer 20 may be configured to relate to each other as shown in FIG. 8, FIG. 14, or FIG. 16. In this case, the fingerprint input unit 60 shown in FIG. 8, FIG. 14, and FIG. 16 is replaced by a handwriting-pattern-input unit, with the fingerprint-feature-extraction unit 62, the fingerprint-registration unit 63, and the fingerprint matching unit 64 respectively replaced by the handwriting-pattern-feature-extraction unit 62, the handwriting-pattern-registration unit 63, and the handwriting-pattern matching unit 64. Further, the tenth embodiment of this variation may be configured such that the detection unit 54I (a touch-inputting means or a handwriting-inputting means) is detachable (FIG. 19), such that the detection unit 54I (a touch-inputting means or a handwriting-inputting means) can partially stick out from the information processing device (FIG. 20) or entirely stick out from the information processing device, or such that the detection unit 54I (a touch-inputting means or a handwriting-inputting means) is connectable by a cable (FIG. 21), thereby adopting various configurations of the fourth embodiment previously described.

When facial features are used as identification information, the fingerprint sensor 54I-5 of the unit 54I of the extension device 5IC as shown in FIG. 32 and FIG. 33 may be replaced by an image-detection means (such as a CCD camera). In this case, the shutter 54I-1 may be provided if necessary.

The image-detection means and the notebook personal computer 20I may be configured to relate to each other as shown in FIG. 8, FIG. 14, or FIG. 16. In this case, the fingerprint input unit 60 shown in FIG. 8, FIG. 14, and FIG. 16 is replaced by an image-detection unit, with the fingerprint-feature-extraction unit 62, the fingerprint-registration unit 63, and the fingerprint matching unit 64 respectively replaced by the facial-feature-extraction unit 62, the facial-pattern-registration unit 63, and the facial-pattern matching unit 64. Further, the tenth embodiment of this variation may be configured such that the detection unit 54I (an image-detection unit such as a CCD camera) is detachable (FIG. 19), such that the detection unit 54I (an image-detection unit such as a CCD camera) can partially stick out from the information processing device (FIG. 20) or entirely stick out from the information processing device, or such that the detection unit 54I (an image-detection unit such as a CCD camera) is connectable by a cable (FIG. 21), thereby adopting various configurations of the fourth embodiment previously described.

Moreover, the present invention is not limited to use of biological information for the purpose of identification check. As was shown in FIG. 23, FIG. 25, and FIG. 27 previously described, identification information may be obtained from ID cards such as IC cards or magnetic cards, or may be obtained from a user when the user uses buttons to enter a password, an ID number, a PIN code, etc. In this case, the detection unit 54I shown in FIG. 32 may be replaced by an IC-card reader, a magnetic-card reader, or buttons such as on a keypad. Alternatively, such a reader or buttons may be provided on the detachable detection unit 54I. By the same token, the tenth embodiment of this variation may be configured such that the detection unit 54I (an IC-card reader, a magnetic-card reader, or buttons such as on a keypad) can partially stick out from the information processing device (FIG. 20) or entirely stick out from the information processing device, or such that the detection unit 54I (an IC-card reader, a magnetic-card reader, or buttons such as on a keypad) is connectable by a cable (FIG.

21), thereby adopting various configurations of the fourth embodiment previously described.

Further, the present invention is not limited to these embodiments, but various variations and modifications may be made without departing from the scope of the present invention.

The present application is based on Japanese priority application No. 11-231957 filed on Aug. 18, 1999, with the Japanese Patent Office, the entire contents of which are hereby incorporated by reference.

What is claimed is:

1. An identification-information-acquisition device to be detachably mounted as an extension device, which has such a configuration as to be mounted in a container portion of an information processing device, and which includes a carrier unit that moves from a position where said carrier unit is encased in the container portion to a position where said carrier unit is situated outside the container portion, said identification-information-acquisition device comprising an identification-information-acquisition unit which receives identification information, wherein the carrier unit can encase said identification-information-acquisition unit and move said identification-information-acquisition unit while encased within said carrier unit from a position within said container portion to a position where the identification information can be entered in said identification-information-acquisition unit when said identification-information-acquisition device is mounted on the carrier unit, wherein said identification-information-acquisition unit is configured to be detachable from the carrier unit in a state of being capable of receiving the identification information.

2. The identification-information-acquisition device as claimed in claim 1, wherein said identification-information-acquisition unit includes a biological-information-acquisition unit for acquiring biological information.

3. The identification-information-acquisition device as claimed in claim 2, wherein said biological information includes one of fingerprints, retinal patterns, voice, handwritings, and facial features.

4. An identification-information-acquisition device to be detachably mounted in an information processing device, which includes a carrier unit that moves from a position where the carrier unit is encased in the information processing device to a position where the carrier unit is exposed outside the information processing device, said identification-information-acquisition device comprising an identification-information-acquisition unit which receives identification information, wherein the carrier unit can encase said identification-information-acquisition unit and move said identification-information-acquisition unit while encased within said carrier unit from a position within said container portion to a position where the identification information can be entered in said identification-information-acquisition unit when said identification-information-acquisition device is mounted on the carrier unit, wherein said identification-information-acquisition unit is configured to be detachable from the carrier unit in a state of being capable of receiving the identification information.

5. The identification-information-acquisition device as claimed in claim 4, wherein said identification-information-acquisition unit includes a biological-information-acquisition unit for acquiring biological information.

6. The identification-information-acquisition device as claimed in claim 5, wherein said biological information includes one of fingerprints, retinal patterns, voice, handwritings, and facial features.

* * * * *